(12) United States Patent
Olson

(10) Patent No.: US 7,815,876 B2
(45) Date of Patent: Oct. 19, 2010

(54) REACTOR PUMP FOR CATALYZED HYDROLYTIC SPLITTING OF CELLULOSE

(76) Inventor: David A. Olson, 1708 Roberts Dr., Albert Lea, MN (US) 56007

(*) Notice: Subject to any disclaimer, the term of this patent is extended or adjusted under 35 U.S.C. 154(b) by 350 days.

(21) Appl. No.: 11/931,436

(22) Filed: Oct. 31, 2007

(65) Prior Publication Data
US 2008/0107574 A1    May 8, 2008

Related U.S. Application Data

(60) Provisional application No. 60/942,380, filed on Jun. 6, 2007, provisional application No. 60/856,596, filed on Nov. 3, 2006.

(51) Int. Cl.
*B01J 8/08* (2006.01)
*C08B 1/00* (2006.01)
*C13K 1/02* (2006.01)
*F02B 33/04* (2006.01)

(52) U.S. Cl. .......................... 422/232; 422/233; 127/1; 127/2; 127/23; 127/24; 127/25; 127/27; 127/28; 127/37; 127/43; 127/63; 127/65; 127/71; 123/66

(58) Field of Classification Search .................. 422/232, 422/233; 208/164; 127/37, 43, 63, 65, 67, 127/71, 1, 2, 23, 24, 25, 27, 28; 123/66
See application file for complete search history.

(56) References Cited

U.S. PATENT DOCUMENTS

| 1,578,609 | A | 3/1926 | Mason |
| 3,251,653 | A | 5/1966 | Aditya |
| 3,743,582 | A | 7/1973 | Atsuo et al. |

(Continued)

OTHER PUBLICATIONS

International Search Report and Written Opinion in co-pending International Application No. PCT/US2009/031823, mailed Aug. 17, 2009 (12 pages).

(Continued)

*Primary Examiner*—Walter D Griffin
*Assistant Examiner*—Huy-Tram Nguyen
(74) *Attorney, Agent, or Firm*—Pauly, Devries Smith & Deffner, L.L.C.

(57) ABSTRACT

The reactor pump for hydrolytic splitting of cellulose is configured to pump cellulose, under high pressure, with low availability of sugar into a reactor. The reactor has an upstream transition segment connected to a downstream reaction chamber. The transition segment has an inlet that is smaller than the outlet. The inner walls taper outward. The chamber has an inlet that is larger than the discharge outlet. The inner walls taper inward. The transition segment outlet has an area that is substantially the same as the area of the chamber inlet. Back pressure in the chamber forms a cellulose plug within the inlet of the transition segment. The plug stops cellulose from escaping out the inlet. High pressure pumping forms a cellulose plug within the discharge outlet of the chamber. The plug slows downstream movement of the cooking cellulose giving the cellulose time to cook. Cooking cellulose begins to breakdown under heat and the injection of acid, if required. The outer surface of the plug is cooked faster than the inner core and in the process the faster cooking portion of the plug becomes a liquefied slurry. The slurry lies between the inwardly tapering chamber walls and the less cooked inner core. The slurry slides faster towards the discharge outlet than does the inner core. As the slurry moves downstream in the chamber, the surface of the inner core moves to the walls and in turn is liquefied. Cellulose may be pre-treated prior to entry in the reactor by the addition of water and a weak acid such as sulfuric or ammonium. The cellulose may be granulated to provide more surface area to assist break down in the reactor.

15 Claims, 36 Drawing Sheets

U.S. PATENT DOCUMENTS

| | | | |
|---|---|---|---|
| 3,930,799 A | 1/1976 | Eweson | |
| 3,935,022 A | 1/1976 | Sihtola | |
| 3,937,647 A | 2/1976 | Backstrum et al. | |
| 3,937,845 A | 2/1976 | Han et al. | |
| 3,939,286 A | 2/1976 | Jelks | |
| 3,940,492 A | 2/1976 | Ehnstrom | |
| 3,954,497 A | 5/1976 | Friese | |
| 3,955,486 A | 5/1976 | Strommer | |
| 3,956,065 A | 5/1976 | Idaszak et al. | |
| 3,960,663 A | 6/1976 | Tamura et al. | |
| 3,961,913 A | 6/1976 | Brenneman et al. | |
| 3,970,712 A | 7/1976 | Friese | |
| 3,972,775 A | 8/1976 | Wilke et al. | |
| 3,980,521 A | 9/1976 | Amotz et al. | |
| 3,981,800 A | 9/1976 | Ort | |
| 3,983,002 A | 9/1976 | Ohya et al. | |
| 3,989,763 A | 11/1976 | Fujii et al. | |
| 3,990,904 A | 11/1976 | Friese et al. | |
| 3,990,944 A | 11/1976 | Gauss et al. | |
| 3,990,945 A | 11/1976 | Huff et al. | |
| 3,993,252 A | 11/1976 | Ito et al. | |
| 3,994,780 A | 11/1976 | Klass et al. | |
| 4,000,032 A | 12/1976 | Bergstrom et al. | |
| 4,001,452 A | 1/1977 | Williams | |
| 4,002,525 A | 1/1977 | Baierl | |
| 4,002,528 A | 1/1977 | Laakso | |
| 4,005,010 A | 1/1977 | Lunt | |
| 4,008,053 A | 2/1977 | Brenneman et al. | |
| 4,009,075 A | 2/1977 | Hoge | |
| 4,009,286 A | 2/1977 | Moll et al. | |
| 4,011,137 A | 3/1977 | Thompson et al. | |
| 4,016,353 A | 4/1977 | Goheen et al. | |
| 4,018,620 A | 4/1977 | Penque | |
| 4,023,982 A | 5/1977 | Knauth | |
| 4,025,356 A | 5/1977 | Nyman et al. | |
| 4,025,398 A | 5/1977 | Haselden | |
| 4,026,678 A | 5/1977 | Livingston | |
| 4,028,132 A | 6/1977 | Litt | |
| 4,029,515 A | 6/1977 | Kiminki et al. | |
| 4,032,407 A | 6/1977 | Scott et al. | |
| 4,032,412 A | 6/1977 | Hoppe et al. | |
| 4,035,430 A | 7/1977 | Dwyer et al. | |
| 4,036,939 A | 7/1977 | Duhayon et al. | |
| 4,038,481 A | 7/1977 | Antrim et al. | |
| 4,040,953 A | 8/1977 | Ort | |
| 4,043,764 A | 8/1977 | Loas | |
| 4,048,018 A | 9/1977 | Coughlin et al. | |
| 4,050,899 A | 9/1977 | Grube et al. | |
| 4,053,645 A | 10/1977 | Jelks | |
| 4,059,231 A | 11/1977 | Neu | |
| 4,063,903 A | 12/1977 | Beningson et al. | |
| 4,064,015 A | 12/1977 | Nyiri et al. | |
| 4,070,232 A | 1/1978 | Funk | |
| 4,071,399 A | 1/1978 | Prough | |
| 4,072,538 A | 2/1978 | Fahn et al. | |
| 4,076,623 A | 2/1978 | Golston | |
| 4,079,837 A | 3/1978 | Grube et al. | |
| 4,080,260 A | 3/1978 | Chao | |
| 4,088,528 A | 5/1978 | Berger et al. | |
| 4,089,745 A | 5/1978 | Antrim et al. | |
| 4,093,516 A | 6/1978 | Lang | |
| 4,093,548 A | 6/1978 | Sterkenburg et al. | |
| 4,094,650 A | 6/1978 | Koh et al. | |
| 4,094,740 A | 6/1978 | Lang | |
| 4,094,742 A | 6/1978 | Bellamy | |
| 4,095,956 A | 6/1978 | Holmes | |
| 4,098,464 A | 7/1978 | Niedner et al. | |
| 4,100,016 A | 7/1978 | Diebold et al. | |
| 4,101,080 A | 7/1978 | Schmidt | |
| 4,102,745 A | 7/1978 | Thompson et al. | |
| 4,104,113 A | 8/1978 | Sherman et al. | |
| 4,104,463 A | 8/1978 | Antrim et al. | |
| 4,105,467 A | 8/1978 | Buckl et al. | |
| 4,105,647 A | 8/1978 | O'Farrell et al. | |
| 4,106,627 A | 8/1978 | Watanabe et al. | |
| 4,111,743 A | 9/1978 | Ronnholm | |
| 4,113,185 A | 9/1978 | Marsh et al. | |
| 4,118,204 A | 10/1978 | Eakman et al. | |
| 4,124,440 A | 11/1978 | Sherman | |
| 4,125,063 A | 11/1978 | Jelks | |
| 4,127,447 A | 11/1978 | Griffith et al. | |
| 4,132,595 A | 1/1979 | Hebeda et al. | |
| 4,133,966 A | 1/1979 | Pretzer et al. | |
| 4,135,888 A | 1/1979 | Waltrip | |
| 4,136,207 A | 1/1979 | Bender | |
| 4,137,094 A | 1/1979 | Hughes | |
| 4,137,134 A | 1/1979 | Suominen et al. | |
| 4,138,290 A | 2/1979 | McMullen et al. | |
| 4,140,443 A | 2/1979 | Olson | |
| 4,142,913 A | 3/1979 | McCorsley, III et al. | |
| 4,142,941 A | 3/1979 | Weber et al. | |
| 4,144,080 A | 3/1979 | McCorsley, III et al. | |
| 4,145,532 A | 3/1979 | Franks et al. | |
| 4,152,119 A | 5/1979 | Schulz | |
| 4,155,806 A | 5/1979 | Mannbro et al. | |
| 4,155,884 A | 5/1979 | Hughes | |
| 4,160,695 A | 7/1979 | Dietrichs et al. | |
| 4,161,429 A | 7/1979 | Baiel et al. | |
| 4,163,687 A | 8/1979 | Mamers et al. | |
| 4,164,396 A | 8/1979 | Jones | |
| 4,168,391 A | 9/1979 | Slinkard et al. | |
| 4,168,988 A | 9/1979 | Riehm et al. | |
| 4,172,037 A | 10/1979 | Golston | |
| 4,174,997 A | 11/1979 | Richter | |
| 4,179,018 A | 12/1979 | Miller | |
| 4,193,837 A | 3/1980 | Wyss et al. | |
| 4,196,282 A | 4/1980 | Franks et al. | |
| 4,199,371 A | 4/1980 | Regnault et al. | |
| 4,201,596 A | 5/1980 | Church et al. | |
| 4,203,376 A | 5/1980 | Hood | |
| 4,209,591 A | 6/1980 | Hendriks | |
| 4,211,371 A | 7/1980 | Hotimsky | |
| 4,211,574 A | 7/1980 | McCorsley, III et al. | |
| 4,211,669 A | 7/1980 | Eakman et al. | |
| 4,214,947 A | 7/1980 | Berger | |
| 4,217,178 A | 8/1980 | Katzen et al. | |
| 4,220,721 A | 9/1980 | Emert et al. | |
| 4,221,609 A | 9/1980 | Hughes | |
| 4,224,410 A | 9/1980 | Pemberton et al. | |
| 4,226,638 A | 10/1980 | Pfeiffer | |
| 4,227,964 A | 10/1980 | Kerr et al. | |
| 4,229,183 A | 10/1980 | Eneroth et al. | |
| 4,233,407 A | 11/1980 | Seebeck et al. | |
| 4,234,391 A | 11/1980 | Seader | |
| 4,235,707 A | 11/1980 | Burke, Jr. | |
| 4,235,965 A | 11/1980 | Walon | |
| 4,236,961 A | 12/1980 | Green | |
| 4,237,110 A | 12/1980 | Forster et al. | |
| 4,237,226 A | 12/1980 | Grethlein | |
| 4,239,906 A | 12/1980 | Antrim et al. | |
| 4,239,924 A | 12/1980 | Pretzer et al. | |
| 4,242,454 A | 12/1980 | Muller et al. | |
| 4,242,455 A | 12/1980 | Muller et al. | |
| 4,243,750 A | 1/1981 | Muller et al. | |
| 4,246,221 A | 1/1981 | McCorsley, III | |
| 4,251,231 A | 2/1981 | Baird | |
| 4,256,541 A | 3/1981 | Muller et al. | |
| 4,264,352 A | 4/1981 | Houser | |
| 4,265,736 A | 5/1981 | Thayer | |
| 4,266,027 A | 5/1981 | Muller et al. | |
| 4,266,029 A | 5/1981 | Branner-Jørgensen | |
| 4,266,981 A | 5/1981 | Tsao et al. | |
| 4,272,383 A | 6/1981 | McGrew | |
| 4,274,911 A | 6/1981 | Kroneld et al. | |

| | | | | | | |
|---|---|---|---|---|---|---|
| 4,277,634 A | 7/1981 | Walker | | 4,427,584 A | 1/1984 | LeGrand et al. |
| 4,279,663 A | 7/1981 | Burroughs et al. | | 4,428,798 A | 1/1984 | Zudkevitch et al. |
| 4,280,880 A | 7/1981 | Vora et al. | | 4,432,805 A | 2/1984 | Nuuttila et al. |
| 4,280,961 A | 7/1981 | Schneider et al. | | 4,436,586 A | 3/1984 | Elore |
| 4,281,063 A | 7/1981 | Tsao et al. | | 4,440,734 A | 4/1984 | Kougioumoutzakis |
| 4,287,303 A | 9/1981 | Dahlberg et al. | | 4,442,210 A | 4/1984 | Dessau et al. |
| 4,287,304 A | 9/1981 | Muller et al. | | 4,443,543 A | 4/1984 | Rogers et al. |
| 4,288,550 A | 9/1981 | Ishida et al. | | 4,443,544 A | 4/1984 | Rogers et al. |
| 4,292,140 A | 9/1981 | Kawasaki et al. | | 4,445,906 A | 5/1984 | Riemann et al. |
| 4,292,406 A | 9/1981 | Ljungdahl et al. | | 4,447,534 A | 5/1984 | Moebus et al. |
| 4,304,649 A | 12/1981 | Han et al. | | 4,451,566 A | 5/1984 | Spencer |
| 4,306,884 A | 12/1981 | Roth | | 4,454,358 A | 6/1984 | Kummer et al. |
| 4,306,942 A | 12/1981 | Brush et al. | | 4,455,198 A | 6/1984 | Zudkevitch et al. |
| 4,308,106 A | 12/1981 | Mannfeld | | 4,456,750 A | 6/1984 | Marttala et al. |
| 4,309,254 A | 1/1982 | Dahlstrom et al. | | 4,460,687 A | 7/1984 | Ehnström |
| 4,310,629 A | 1/1982 | Muller et al. | | 4,461,648 A | 7/1984 | Foody |
| 4,316,748 A | 2/1982 | Rugg et al. | | 4,468,256 A | 8/1984 | Hinger |
| 4,316,956 A | 2/1982 | Lützen | | 4,470,851 A | 9/1984 | Paszner et al. |
| 4,317,880 A | 3/1982 | Heady | | 4,472,501 A | 9/1984 | Takasawa et al. |
| 4,321,106 A | 3/1982 | Burkhard et al. | | 4,477,569 A | 10/1984 | Schneider et al. |
| 4,321,150 A | 3/1982 | McMullen | | 4,478,644 A * | 10/1984 | Berger et al. .................... 127/1 |
| 4,321,328 A | 3/1982 | Hoge | | 4,480,737 A | 11/1984 | Jamgochian et al. |
| 4,322,023 A | 3/1982 | Olson | | 4,490,469 A | 12/1984 | Kirby et al. |
| 4,326,032 A | 4/1982 | Grove | | 4,497,896 A | 2/1985 | Assarsson et al. |
| 4,326,036 A | 4/1982 | Hayes | | 4,497,967 A | 2/1985 | Wan |
| 4,329,433 A | 5/1982 | Seebeck et al. | | 4,503,079 A | 3/1985 | King et al. |
| 4,330,625 A | 5/1982 | Miller et al. | | 4,506,012 A | 3/1985 | Reed |
| 4,334,026 A | 6/1982 | Chynoweth et al. | | 4,511,433 A | 4/1985 | Tournier et al. |
| 4,335,207 A | 6/1982 | Heady | | 4,511,656 A | 4/1985 | Gong |
| 4,337,315 A | 6/1982 | Fukushima et al. | | 4,515,892 A | 5/1985 | Chen et al. |
| 4,341,353 A | 7/1982 | Hamilton et al. | | 4,517,298 A | 5/1985 | Tedder |
| 4,342,830 A | 8/1982 | Holloway | | 4,517,391 A | 5/1985 | Schuster |
| 4,342,831 A | 8/1982 | Faber et al. | | 4,520,105 A | 5/1985 | Sinner et al. |
| 4,346,113 A | 8/1982 | Faust et al. | | 4,522,726 A | 6/1985 | Berry et al. |
| 4,347,137 A | 8/1982 | Dick, Jr. | | 4,522,920 A | 6/1985 | Thorsson et al. |
| 4,348,487 A | 9/1982 | Goldstein et al. | | 4,529,699 A | 7/1985 | Gerez et al. |
| 4,349,416 A | 9/1982 | Brandt et al. | | 4,540,495 A | 9/1985 | Holloway |
| 4,349,628 A | 9/1982 | English et al. | | 4,540,664 A | 9/1985 | Johnson et al. |
| 4,350,765 A | 9/1982 | Chibata et al. | | 4,547,226 A | 10/1985 | Milch et al. |
| 4,350,766 A | 9/1982 | Mehlberg | | 4,553,977 A | 11/1985 | Fry |
| 4,355,108 A | 10/1982 | Gaddy et al. | | 4,556,430 A | 12/1985 | Converse et al. |
| 4,356,266 A | 10/1982 | Muller et al. | | 4,556,432 A | 12/1985 | Erckel et al. |
| 4,358,536 A | 11/1982 | Thorsson et al. | | 4,559,109 A | 12/1985 | Lee et al. |
| 4,359,534 A | 11/1982 | Kurtzman et al. | | 4,561,860 A | 12/1985 | Gulley et al. |
| 4,361,651 A | 11/1982 | Keim | | 4,564,595 A | 1/1986 | Neves |
| 4,362,601 A | 12/1982 | Morita | | 4,567,145 A | 1/1986 | Faber et al. |
| 4,366,032 A | 12/1982 | Mikitenko et al. | | 4,568,495 A | 2/1986 | Frihart |
| 4,368,268 A | 1/1983 | Gong | | 4,568,644 A | 2/1986 | Wang et al. |
| 4,370,172 A | 1/1983 | Gueissaz | | 4,576,609 A | 3/1986 | Hageman et al. |
| 4,374,702 A | 2/1983 | Turbak et al. | | 4,578,353 A | 3/1986 | Assarsson et al. |
| 4,376,163 A | 3/1983 | Ehnström | | 4,591,386 A * | 5/1986 | Rugg et al. .................... 127/1 |
| 4,379,028 A | 4/1983 | Berg et al. | | 4,597,866 A | 7/1986 | Couillard |
| 4,384,897 A | 5/1983 | Brink | | 4,604,352 A | 8/1986 | Zeikus et al. |
| 4,385,118 A | 5/1983 | Muller et al. | | 4,607,797 A | 8/1986 | Enikolopow et al. |
| 4,393,136 A | 7/1983 | Cheetham | | 4,608,245 A | 8/1986 | Gaddy et al. |
| 4,395,543 A | 7/1983 | Wang et al. | | 4,612,286 A | 9/1986 | Sherman et al. |
| 4,399,000 A | 8/1983 | Tedder | | 4,615,742 A | 10/1986 | Wright |
| 4,400,241 A | 8/1983 | Braithwaite et al. | | 4,626,321 A | 12/1986 | Grethlein et al. |
| 4,400,470 A | 8/1983 | Zeikus et al. | | 4,631,115 A | 12/1986 | Berg et al. |
| 4,401,510 A | 8/1983 | Olson et al. | | 4,642,287 A | 2/1987 | Inoi et al. |
| 4,402,792 A | 9/1983 | Horst et al. | | 4,650,689 A | 3/1987 | Hedrick |
| 4,403,034 A | 9/1983 | Rogers et al. | | 4,652,526 A | 3/1987 | Hsu |
| 4,407,458 A | 10/1983 | Hotimsky | | 4,668,340 A | 5/1987 | Sherman |
| 4,407,955 A | 10/1983 | Muller et al. | | 4,671,351 A | 6/1987 | Rappe |
| 4,409,032 A | 10/1983 | Paszner et al. | | 4,681,935 A | 7/1987 | Forss et al. |
| 4,409,329 A | 10/1983 | Silver | | 4,683,063 A | 7/1987 | Rice |
| 4,413,058 A | 11/1983 | Arcuri et al. | | 4,690,903 A | 9/1987 | Chen et al. |
| 4,416,698 A | 11/1983 | McCorsley, III et al. | | 4,692,167 A | 9/1987 | Levasseur |
| 4,420,561 A | 12/1983 | Chen et al. | | 4,701,414 A | 10/1987 | van Dijken et al. |
| 4,421,856 A | 12/1983 | Muller et al. | | 4,706,903 A | 11/1987 | Brink et al. |
| 4,421,939 A | 12/1983 | Kiff et al. | | 4,708,746 A | 11/1987 | Hinger |
| 4,425,433 A | 1/1984 | Neves | | 4,746,610 A | 5/1988 | Smith |
| 4,427,453 A | 1/1984 | Reitter | | 4,752,579 A | 6/1988 | Arena et al. |

| | | |
|---|---|---|
| 4,753,181 A | 6/1988 | Sosnowski |
| 4,764,276 A | 8/1988 | Berry et al. |
| 4,769,112 A | 9/1988 | Wheldon |
| 4,769,141 A | 9/1988 | Couillard |
| 4,774,006 A | 9/1988 | Kaufmann |
| 4,778,881 A * | 10/1988 | Nieuwenhuis et al. ...... 536/119 |
| 4,792,408 A | 12/1988 | Titmas |
| 4,797,360 A | 1/1989 | Doelle |
| 4,840,903 A | 6/1989 | Wu |
| 4,844,351 A | 7/1989 | Holloway |
| 4,857,145 A | 8/1989 | Villavicencio |
| 4,859,211 A | 8/1989 | Moore |
| 4,876,196 A | 10/1989 | Salzbrunn et al. |
| 4,880,473 A | 11/1989 | Scott et al. |
| 4,886,751 A | 12/1989 | Thorsson |
| 4,889,805 A | 12/1989 | Da Silva Telles et al. |
| 4,891,133 A | 1/1990 | Colvin, Jr. |
| 4,894,066 A | 1/1990 | Castelli |
| 4,897,497 A | 1/1990 | Fitzpatrick |
| 4,908,067 A | 3/1990 | Just |
| 4,952,503 A | 8/1990 | Granstedt |
| 4,952,504 A | 8/1990 | Pavilon |
| 4,961,826 A | 10/1990 | Grethlein et al. |
| 4,974,781 A | 12/1990 | Placzek |
| 4,985,355 A | 1/1991 | Millichip |
| 4,995,943 A | 2/1991 | Rehberg |
| 5,000,000 A | 3/1991 | Ingram et al. |
| 5,009,672 A | 4/1991 | Ruffo et al. |
| 5,028,539 A | 7/1991 | Ingram et al. |
| 5,030,069 A | 7/1991 | Olson |
| 5,036,005 A | 7/1991 | Tedder |
| 5,037,663 A | 8/1991 | Dale |
| 5,047,332 A | 9/1991 | Chahal |
| 5,063,156 A | 11/1991 | Glassner et al. |
| 5,094,690 A | 3/1992 | Zikeli et al. |
| 5,104,419 A | 4/1992 | Funk |
| 5,123,962 A | 6/1992 | Komuro et al. |
| 5,124,004 A | 6/1992 | Grethlein et al. |
| 5,125,977 A | 6/1992 | Grohmann et al. |
| 5,134,944 A | 8/1992 | Keller et al. |
| 5,135,861 A | 8/1992 | Pavilon |
| 5,160,581 A | 11/1992 | Titmas |
| 5,162,516 A | 11/1992 | Ingram et al. |
| 5,182,199 A | 1/1993 | Hartley |
| 5,184,780 A | 2/1993 | Wiens |
| 5,188,673 A | 2/1993 | Clausen et al. |
| 5,196,069 A | 3/1993 | Cullingford et al. |
| 5,198,074 A | 3/1993 | Villavicencio et al. |
| 5,204,262 A | 4/1993 | Meiering et al. |
| 5,221,357 A | 6/1993 | Brink |
| 5,231,017 A | 7/1993 | Lantero et al. |
| 5,250,100 A | 10/1993 | Armbristor |
| 5,258,293 A | 11/1993 | Lynd et al. |
| 5,266,337 A | 11/1993 | Bärwald et al. |
| 5,348,871 A | 9/1994 | Scott et al. |
| 5,361,994 A | 11/1994 | Holloway |
| 5,366,558 A | 11/1994 | Brink |
| 5,371,207 A | 12/1994 | Zhuang |
| 5,407,817 A | 4/1995 | Lightsey et al. |
| 5,411,594 A | 5/1995 | Brelsford |
| 5,424,202 A | 6/1995 | Ingram et al. |
| 5,424,417 A | 6/1995 | Torget et al. |
| 5,478,439 A | 12/1995 | De La Bruniere et al. |
| 5,482,846 A | 1/1996 | Ingram et al. |
| 5,487,989 A | 1/1996 | Fowler et al. |
| 5,508,183 A | 4/1996 | Scott et al. |
| 5,536,325 A | 7/1996 | Brink |
| 5,538,637 A | 7/1996 | Hester et al. |
| 5,543,511 A | 8/1996 | Bergfeld et al. |
| 5,554,520 A | 9/1996 | Fowler et al. |
| 5,562,777 A | 10/1996 | Farone et al. |
| 5,571,703 A | 11/1996 | Chieffalo et al. |
| 5,580,389 A | 12/1996 | Farone et al. |
| 5,597,714 A | 1/1997 | Farone et al. |
| 5,608,105 A | 3/1997 | Fitzpatrick |
| 5,620,877 A | 4/1997 | Farone et al. |
| 5,628,830 A | 5/1997 | Brink |
| 5,677,154 A | 10/1997 | Van Draanen et al. |
| 5,753,474 A | 5/1998 | Ramey |
| 5,769,934 A | 6/1998 | Ha et al. |
| 5,779,164 A | 7/1998 | Chieffalo et al. |
| 5,834,095 A | 11/1998 | Dutkiewicz et al. |
| 5,837,506 A | 11/1998 | Lynd et al. |
| 5,879,637 A | 3/1999 | Titmas |
| 5,916,780 A | 6/1999 | Foody et al. |
| 5,932,456 A | 8/1999 | Van Draanen et al. |
| 5,972,118 A | 10/1999 | Hester et al. |
| 5,975,439 A | 11/1999 | Chieffalo et al. |
| 5,981,237 A * | 11/1999 | Meagher et al. ............... 435/99 |
| 6,007,636 A | 12/1999 | Lightner |
| 6,063,204 A | 5/2000 | Hester et al. |
| 6,090,595 A | 7/2000 | Foody et al. |
| 6,251,643 B1 | 6/2001 | Hansen et al. |
| 6,267,309 B1 | 7/2001 | Chieffalo et al. |
| 6,333,181 B1 | 12/2001 | Ingram et al. |
| 6,432,276 B1 | 8/2002 | Lightner |
| 6,509,180 B1 | 1/2003 | Verser et al. |
| 6,779,983 B1 | 8/2004 | Olson |
| 6,846,657 B2 | 1/2005 | Heikkilaet et al. |
| 6,900,267 B2 | 5/2005 | Royer et al. |
| 6,927,048 B2 | 8/2005 | Verser et al. |
| 7,600,707 B2 | 10/2009 | Wingerson |
| 2003/0171495 A1 * | 9/2003 | Royer et al. ................ 525/242 |
| 2004/0231661 A1 | 11/2004 | Griffin et al. |
| 2006/0141584 A1 | 6/2006 | Litzen et al. |
| 2006/0154352 A1 | 7/2006 | Foody et al. |

OTHER PUBLICATIONS

Non-Final Office Action mailed Jan. 15, 2010 in co-pending U.S. Appl. No. 12/020,228, entitled "Reactor Pump for Catalyzed Hydrolytic Splitting of Cellulose," (17 pages).

Ho, Mae-Wan, "Ethanol from Cellulose Biomass Not Sustainable nor Environmentally Benign", *Institute of Science in Society, ISIS Press Release*, Mar. 15, 2006, pp. 1-7.

Kovarik, Bill, "Henry Ford, Charles F. Kettering and the Fuel of the Future", *Automotive History Review*, No. 32, p. 7-27, Reproduced on the Web at: http://www.radford.edu~wkovarik/papers/fuel.html, 1998, pp. 1-35.

Savage, Neil, "Switchgrass to Gas?", *Technology Review* Feb. 22, 2006, 4 pages.

Steinhagen, Peter, "Thermal Conductive Properties of Wood, Green or Dry, from -40 ° to +100 ° C : A Literature Review", *USDA Forest Service General Technical Report*, FPL-9, *U.S. Department of Agriculture* 1977, 14 pages.

"Ethanol from Cellulose: Too Good to be True?", http://www.daviesand.com/Perspectives/Forest Products/Ethanol May 25, 2000, 3 pages.

"Cellulose Ethanol is ready to Go", *Iogen Corporation* http://www.iogen.ca/ Oct. 31, 2006, 1 page.

"Chemistry for the Atmosphere", *National Interuniversitario Consortium, INCA Conference Acknowledgments to Processes and Chemical Produtti Cleaned Up* w/English translation of pp. 1-2; Sep. 2, 2004, 22 pages.

"Ethanol Production Nearly 4 Billion Gallons", *Sci Tech* http://www.scitechinfo.com/node/1629 Oct. 31, 2006, pp. 1-2.

"First Vehicle Fleet to Use Cellulose Ethanol", *Government of Canada*, 2004/74 National Resources Canada, Press Release Dec. 15, 2004, 4 pages.

"Iogen Producing World's First Cellulose Ethanol Fuel", *BBI International, Latest News* from www.bbibiofuels.com Oct. 31, 2006, 2 pages.

"Producing Cellulose Ethanol in Germany Study", *Sci Tech* Jan. 22, 2006, 2 pages.

"Transport Energy Policy & Clean Fuels Technology Conference: Brussels", *Hart World Refining Fuels Conferences, Brussels*, May 30, 2006, pp. 1-6.

"Volkswagen, Shell and Iogen to Study Feasibility of Producing Cellulose Ethanol in Germany", *Geek Mirror* Jan. 8, 2006, 6 pages.

"Volkswagen, Shell, Iogen to Study Cellulose Ethanol Production in Germany", *IHS Energy* http://petrochemical.ihs.com/news-06Q1/iogen-ethanol-cellulose-germany.jsp Feb. 9, 2006, 2 pages.

* cited by examiner

REACTOR PUMP FOR CATALYZED HYDROLYTIC SPLITTING OF CELLULOSE

CROSS REFERENCE TO RELATED APPLICATIONS

This application claims the benefit of U.S. Provisional Patent Application Ser. No. 60/942,380 filed Jun. 6, 2007 and U.S. Provisional Patent Application Ser. No. 60/856,596 filed Nov. 3, 2006 and hereby incorporates the foregoing U.S. Provisional Patent Applications by this reference.

FIELD OF THE TECHNOLOGY

The field of the technology relates to a reactor pump for catalyzed hydrolytic splitting of cellulose.

BACKGROUND

Ethanol is an important fuel. In general, ethanol can be produced from cellulose in a two step process, sometimes referred to as biomass conversion. The first step hydrolyzes cellulose to sugar. The sugar is then fermented in the second step to form ethanol. The method and apparatus of this specification relates to the first step—the hydrolysis of cellulose. More specifically, the method and apparatus relates to splitting the outer husk of cellulose material. The split, outer husk is then further refined in successive stages, whereby the combination of stages converts the cellulose to sugar.

The fermentation of the sugar to ethanol is well understood. Hydrolysis of the cellulose is, however, the Achilles heel in the process of making ethanol. To achieve overall profitability from ethanol production the ratio of the energy content of the ethanol to the energy used for producing the ethanol must be high. Many approaches have been used to accomplish this level of efficient production of ethanol. However, the production of ethanol continues to be highly subsidized indicating that it has not yet achieved a high level of profitability. There are many factors contributing to this. One factor is the use of high value, high cost feedstock such as corn, which has high level of available sugar. Another is the cost of transportation of the feedstock to an ethanol production plant that is remote from the feedstock production site.

Corn and other high value sources of cellulose are used due to the difficulty of converting other sources of cellulose such as wood, wood chips, saw dust, lumber, newspaper, cardboard, sugar cane, and ground straw into sugar. The other sources of cellulose have a relatively low level of available sugar. These sources contain not only cellulose, but also lignin and hemi-cellulose which must be separated from the cellulose before sugar is available for fermentation. The method and apparatus disclosed in this specification efficiently carries out the first task of splitting the raw cellulose so further refining in subsequent stages results in a high sugar yield at a low energy cost with greater profitability than the methods and apparatus available today.

Transportation of the raw cellulose bearing material from its geographical source to the location of an ethanol production plant is costly. The ethanol production process could be made more profitable if the production of sugar from cellulose was located at the source of the cellulose. Cellulose could be granulated and converted on site to sugar. The unwanted by-products from conversion, which may represent up to 50% of the weight of the unprocessed cellulose, could also be disposed of on site. The cost of shipping to a distant ethanol production plant for fermentation to ethanol would thereby be significantly reduced.

Alternatively, the entire ethanol plant could be sited at a large, long term source of cellulose and the resultant ethanol piped to users.

But regardless of what approach is taken, the reactor pump efficiently carries out its task of splitting the cellulose husks. And it is compact, scalable, and meets the needs of the conventional ethanol plant or a plant located at the source of the cellulose.

SUMMARY

The reactor pump 1 is an integrated combination of a reactor 7 and a pump 5. It is a first stage reactor in a multi-stage process of converting cellulose to sugar for fermentation into ethanol. Several embodiments of the reactor pump 1 are described in this specification. Each of the embodiments use pressure and heat to hydrolyze biomass in a reactor. Acid may also be used in the process of breaking down the cellulose to a liquefied slurry. In limited cases water may be introduced into the reaction chamber 7a.

Steam and heat have long been used as the energy to accelerate the break down of organic matter in a vessel, such as a pressure cooker. Typically, the organic matter is cellulose in foodstuff. The foodstuff is mixed with water in a vessel, the vessel is tightly closed, and the closed vessel is subjected to a source of heat energy. To some extent the heat energy alone causes the cellulose to break down into a less solid mass. If enough heat is delivered to the cooking cellulose, the water in the pressure cooker changes phase, turns to steam, and the pressure rises. As a result, the high pressure accelerates the break down of the cellulose. However, the energy delivered to the pressure cooker comes from a single source.

The reactor pump 1 on the other hand, delivers energy from two sources. The first source comes from outside the surface of the reactor 7. The heat energy on the outside surface of the reactor is indirectly transferred into the reaction chamber 7a in a manner similar to the pressure cooker. However, the second source is produced by the constant high compression forcing the feedstock 15 into the inlet 7b of a cone shaped reaction chamber 7a. The constant high compression force alone produces heat in the reaction chamber 7a.

The inlet 7b of the reaction chamber 7a is an opening with a relatively large area as compared to its smaller discharge outlet 7c. The cone shaped reaction chamber 7a is heated to a temperature that causes the cellulose feedstock 15 on the outside of the compressed feedstock—a plug 27—to breakdown into a downstream flowing liquefied mass. The liquefied portion of the feedstock plug 27 moves downstream between the interior wall of the reaction chamber 7a and the more solid plug 27. It does so at a faster rate than the solid portion of the plug 27. As the liquefied mass moves downstream near the discharge valve 7c there is a drop in pressure as compared to the pressure upstream in the reaction chamber 7a. The liquefied feedstock exits the reaction chamber 7a through the discharge valve 7c, the solid plug 27 continues to be compressed against the cone shaped chamber 7a, and the outer surface of the plug 27 continues to liquefy.

An embodiment of the reactor pump 1 for catalyzed hydrolytic splitting of cellulose, is comprised:

(a) a pump 5 comprised of (i) a pumping chamber 5a having a feedstock opening 5e for receiving feedstock 15; (ii) a cylinder 13 configured to extend from an upstream opening 5c to a downstream end 5d of the pumping chamber 5a; (iii) the extending cylinder 13 configured to compress the feedstock 15 in the pumping chamber 5a against compressed feedstock 15 in a reactor 7; (iv) the cylinder 13, upon reaching the downstream end 5d, configured to retract from the downstream end 5d to the upstream opening 5c; and (v) the cylinder 13 configured to cyclically continue its extension and retraction;

(b) a reactor 7 comprised of a transition segment 25 and a reaction chamber 7a, (i) the transition segment 25 located between the downstream end 5d of the pumping chamber 5a and the inlet 7b of a reaction chamber 7a; (ii) the transition segment 25 having an inlet 25a smaller than the outlet 25b; (iii) the reaction chamber 7a having an inlet 7b substantially the same size as the outlet 25b of the transition segment 25 and a discharge outlet 7c smaller than the inlet 7b of the reaction chamber 7a; (iv) the reactor 7 having a means for heating the compressed feedstock 15 in the reaction chamber 7a; and (c) whereby the compressed feedstock 15 in the transition segment 25 and the reaction chamber 7a forms a feedstock plug 27, the feedstock plug 27 cooks as the plug 27 moves downstream under pumping pressure of the pump 5a, and the cooked portion of the plug 27 exits the discharge outlet 7c as a liquefied slurry.

Another embodiment of the reactor pump 1 for catalyzed hydrolytic splitting of cellulose, comprises:

(a) a pump 5 comprised of (i) a pumping chamber 5a having a feedstock opening 5e for receiving feedstock 15; (ii) a gate 6 upstream from the downstream end 5d of the pumping chamber 5a, the gate 6 configured to cyclically open and close; (iii) a cylinder 13 configured to cyclically extend and retract from an upstream opening 5c of the pumping chamber 5a to the downstream end 5d of the pumping chamber 5a; (iv) the cylinder 13 configured to compress feedstock 15 in the pumping chamber 5a against the closed gate 6; (v) the gate 6 configured to open upon the occurrence of an event, the event selected from the group consisting of a pre-set level of pressure on the closed gate 6, a pre-set position of the extending cylinder 13 within the pumping chamber 5a, expiration of a pre-set period of time, or any combination of the foregoing; (vi) the cylinder 13 configured to compress the feedstock 15 against compressed feedstock 15 in a transition segment 25 and the reaction chamber 7a; (vii) the cylinder 13 configured to retract when the gate 6 closes;

(b) a reactor 7 comprised of a transition segment 25 and a reaction chamber 7a, (i) the transition segment 25, located between the downstream end 5d of the pumping chamber 5a and the inlet 7b of a reaction chamber 7a; (ii) the transition segment 25 having an inlet 25a smaller than the outlet 25b; (iii) the reaction chamber 7a having an inlet 7b substantially the same size as the outlet 25b of the transition segment 25 and a discharge outlet 7c smaller than the inlet 7b of the reaction chamber 7a; (iv) the reactor 7 having a means for heating the compressed feedstock 15 in the reaction chamber 7a;

(c) whereby the compressed feedstock 15 in the transition segment 25 and the reaction chamber 7a forms a feedstock plug 27, the feedstock plug 27 cooks as the plug 27 moves downstream under pumping pressure of the pump 5a, and the cooked portion of the plug 27 exits the discharge outlet 7c as a liquefied slurry.

The interior of the reactor 7 is comprised of one or more segments selected from the group consisting of a straight segment 7j, inwardly tapered segment 7k, outwardly tapered segment 7o, convex segment 7l, U-elbow segment 7m, concave segment 7q, exit plug segment 7p, connector segment 7r, or any combination of the foregoing segments.

A charging chamber 2 that opens into the feedstock opening 5e. The feedstock 15 is comprised of (a) cellulose material selected from the group consisting of wood, logs, wood chips, lumber, newspaper, cardboard, corn fiber, corn cob, sugar cane, straw, switch grass, or any combination thereof; (b) water; and (c) acid. The acid is selected from the group consisting of sulfuric, hydrochloric, ammonium, or any combination of the foregoing.

The reactor pump has an adjustable pressure relief valve 10 on the reaction chamber discharge outlet 7c for automatic discharge of cooked feedstock when a pre-set pressure level within the reaction chamber 7a is reached and it has a throttle valve 9 for changing the cook time 16 of the feedstock 15. There is also a means for injecting steam and acid into the reaction chamber 7a. The reactor pump is configured for continuous discharge of a liquefied slurry of conversion product.

An embodiment of the reactor pump 1 for catalyzed hydrolytic splitting of cellulose is comprised of:

(a) a means for high pressure pumping of feedstock 15 into a reactor 7;

(b) a reactor 7 comprised of a transition segment 25 and a reaction chamber 7a, (i) the transition segment 25, located between the downstream end 5d of the pumping chamber 5a and the inlet 7b of a reaction chamber 7a; (ii) the transition segment 25 having an inlet 25a smaller than the outlet 25b; (iii) the reaction chamber 7a having an inlet 7b substantially the same size as the outlet 25b of the transition segment 25 and a discharge outlet 7c smaller than the inlet 7b of the reaction chamber 7a; (iv) the reactor 7 having a means for heating the compressed feedstock 15 in the reaction chamber 7a;

(c) whereby the compressed feedstock 15 in the transition segment 25 and the reaction chamber 7a forms a feedstock plug 27, the feedstock plug 27 cooks as the plug 27 moves downstream under pumping pressure of the pump 5a, and the cooked portion of the plug 27 exits the discharge outlet 7c as a liquefied slurry.

An embodiment of a catalyzed hydrolytic process for splitting cellulose, comprises the steps of: (a) pumping 5 feedstock 15 against compressed feedstock 15 in a reactor 7 to form a feedstock plug 27 moving downstream from an inlet 25a to a discharge outlet 7c of the reactor 7; (c) subjecting the feedstock plug 27 to a constellation of physical things selected from the group consisting of pressure, heat, steam, water, acid, or any combination thereof; (d) cooking the plug 27 within the reactor 7; (e) opening the discharge outlet 7c to rapidly reduce the pressure in the reaction chamber 7a upon the occurrence of an event, the event selected from the group consisting of reaching a pre-set pressure level in the reaction chamber 7a, expiration of a pre-set period of time, or any combination of the foregoing; and (f) whereby the outer surface of the cellulose is broken down to a liquefied slurry of cooked feedstock.

The process also includes the steps of (i) comparing the downstream pressure on the upstream end of the feedstock plug 27 and the back pressure in the reaction chamber 7b and (ii) equalizing them if they are not equal. The process furthermore includes the steps of subjecting (i) the feedstock 15 to a pressure of up to about 2000 psi and (ii) the reaction chamber 7a to a temperature of up to about 1000° Fahrenheit.

Preparation of the feedstock 15 is comprised of the steps of: (i) grinding the cellulose; (ii) the cellulose selected from the group consisting of wood, logs, wood chips, lumber, newspaper, cardboard, corn fiber, corn cob, sugar cane, straw, switch grass, or any combination thereof; (iii) mixing acid with water to form an aqueous solution of acid; (iv) the acid selected from the group consisting of sulfuric, hydrochloric, ammonium, or any combination thereof; (v) mixing the cellulose and the aqueous solution of acid to form the feedstock 15; and (vi) granulating the formed feedstock 15. The feedstock 15 is mixed at about 20% to about 50% by weight of granular cellulose with about 78% to about 48% by weight of water, and about 2% by weight of acid. Acid may also be introduced to the compressed feedstock 15 in the reactor 7.

A plug 27 of compressed feedstock 15 is formed by the steps of: (i) using high pressure to ram the feedstock 15 into a reactor 7, the reactor having an inlet 25a and a discharge outlet 7c that are small relative to the interior of the reactor 7 and (ii) holding the compressed feedstock 15 in the reactor 7 for a pre-set period of cook time 16 to allow conversion of the feedstock 15 to a liquefied slurry. Cooking the feedstock plug 27 comprises the steps of heating the cooking feedstock plug 27 by the means selected from the group consisting of injecting steam directly into the reactor 7, heating the outer surface of the reactor 7 to indirectly heat the cooking feedstock plug 27, flowing a heated substrate through a jacket 29d surrounding the outer surface of the reactor 7, or any combination of the foregoing.

Compressing the feedstock 15 may be accomplished by the steps of (i) extending a cylinder 13 against feedstock 15 in a pumping chamber 5a to compress the feedstock 15 against a closed gate 6; (ii) opening the gate 6 upon the occurrence of an event selected from the group consisting of expiration of a pre-set time period, reaching a pre-set level of pressure on the upstream face of the gate 6, and extension of the cylinder to a pre-set position; (iii) retracting the cylinder 13 after the occurrence of a selected event; and (iv) continuing the cycle of extension and retraction of the cylinder 13.

An embodiment of a reactor pump 1 for catalyzed hydrolytic splitting of cellulose is comprised of a pump 5 and a reactor 7. The pump 5 and the reactor 7 can be configured as an integral single reactor pump unit. Or in the alternative, the pump 5 can be a stand-alone unit and the reactor 7 can be a separate stand-alone unit. Nevertheless, the pump 5 and the reactor 7 are each highly unique and they work together like a hand in a glove.

Both the pump 5 and the reactor 7 are configured to meet their specialized functions. The pump 5 is configured to supply very highly compressed feedstock 15 into the reaction chamber 7a. It accomplishes its task by pumping a nearly continuous supply of the very highly compressed feedstock 15 into the reaction chamber 7a using a high pressure ram 4. The pressure can range up to about 2000 psi. The reaction chamber 7a is configured to cook the feedstock 15 at a temperature up to about 1000° Fahrenheit, inject steam and/or acid into the reaction chamber 7a when necessary, provide heat from a source outside the reaction chamber 7a, and provide heat from the ram 4 pressure. The cooking process tears the outer husk of the feedstock 15 apart and thereby converts the feedstock 15 to liquefied slurry, which is further converted in subsequent stages to form ethanol.

The elements of the pump 5a are: (i) a pumping chamber 5a having a feedstock opening 5e for receiving feedstock 15; (ii) a gate 6 upstream from the downstream end of the pumping chamber 5a, the gate 6 configured to cyclically open and close; (iii) a cylinder 13 configured to cyclically extend and retract from an upstream opening 5c of the pumping chamber 5a to the downstream end 5d of the pumping chamber 5a; (iv) the cylinder 13 configured to compress feedstock 15 in the pumping chamber 5a against the closed gate 6; (v) the gate 6 configured to open upon the occurrence of an event, the event selected from the group consisting of a pre-set level of pressure on the closed gate 6, a pre-set position of the extending cylinder 13 within the pumping chamber 5a, expiration of a pre-set period of time, or any combination of the foregoing; (vi) the cylinder 13 configured to continue its extension beyond the open gate 6 to the downstream end 5d (located at the inlet 25a of the transition segment 25) of the pumping chamber 5a and to compress the feedstock 15 against compressed feedstock 15 already in a transition segment 25; (vii) the cylinder 13 configured to retract when it reaches the downstream end 5d of the pumping chamber 5a; (viii) the gate 6 configured to close when the main hydraulic cylinder 13 retracts just past the open gate 6; and (ix) the cylinder 13 configured to continue its retraction to the end of its travel.

Another embodiment is comprised of a reactor 7 having: (i) a transition segment 25, located between the downstream end 5d of the pumping chamber 5a and the inlet 7b of a reaction chamber 7a of the reactor 7; (ii) the transition segment 25 having an inlet 25a that is smaller than the outlet 25b; (iii) the reaction chamber 7a comprised of an inlet 7b substantially the same size as the outlet 25b of the transition segment 25; (iv) a discharge outlet 7c smaller than the inlet 7b of the reaction chamber 7a; (v) the compressed feedstock 15 in the transition segment 25 compressed against the compressed feedstock 15 in the reaction chamber 7a; (vi) the reactor 7 having a means for heating the compressed feedstock 15 in the reaction chamber 7a to form a feedstock plug 27; (vii) the compression of the feedstock 15 in the transition segment 25 against the feedstock plug 27 in the reaction chamber 7a moving the feedstock plug 27 from the inlet 7b to the discharge outlet 7c; (viii) the moving feedstock plug 27 cooking during its downstream movement in the reaction chamber 7a; and (ix) a means for discharging a liquefied slurry of cooked feedstock 15.

An embodiment of the transition segment 25 is comprised of (i) a cone shaped interior having a plurality of sides, (ii) the inlet 25a having a downward positioned—V-shape, and (iii) the plurality of sides transitioning from the inlet 25a to a larger outlet 25b.

An embodiment of the interior of the reaction chamber 7a has a shape selected from the group consisting of a cone segment 7n, long straight segment 7j, mid-length straight segment 7j, short straight segment 7j, inwardly tapered segment 7k, inwardly tapered segment 7k having a plurality of converging inside walls 7i, outwardly tapered segment 7o, outwardly tapered segment 7o having a plurality of diverging inside walls, convex segment 7l, U-elbow segment 7m, exit plug segment 7p, concave segment 7q, connector segment 7r, or any combination of the foregoing segments. The segments may have varying diameters among and within the segments and may have varying lengths. The inlet 25a of the reactor 7 is larger than the discharge outlet 7c regardless of the shape, length, or number of segments of the reactor 7.

An embodiment of the reactor pump has a directional control valve 3 for extending and retracting the cylinder 13.

Another embodiment of the reactor pump 1 is comprised of a gate 6 and has (i) downward positioned V-shaped planar faces for mating with a downward positioned V-shaped bottom of the pumping chamber 5a and (ii) a bevel 6d on the bottom of the gate 6. An embodiment of the reactor pump 1 has (i) a feed hopper 14 for receiving feedstock 15, the hopper 14 having an open bottom sitting atop the opening of a charging chamber 2 and (ii) the charging chamber 2 having an open bottom in line with the feedstock opening 5e in the pumping chamber 5a.

A further embodiment has a pumping chamber 5b lined with stainless steel, a gate 6 comprised of zirconium, and interior walls of the reaction chamber 7b comprised of zirconium.

Embodiments of the feedstock 15 are comprised of (a) cellulose material selected from the group consisting of wood, logs, wood chips, lumber, newspaper, cardboard, corn fiber, corn cob, sugar cane, straw, switch grass, or any combination thereof; (b) water; and (c) acid selected from the group consisting of sulfuric, hydrochloric, ammonium, or any combination thereof. The acid is in an aqueous solution of about 0.5% to about 10% sulfuric acid. The feedstock 15 may be comprised of about 2% by weight of acid, about 20% by weight of granular cellulose, and less than about 78% by weight of water. In an embodiment of the feedstock the cellulose material comprises less than about 50% of the feedstock. The cellulose may be granulated before or after the water and acid are added to the cellulose.

The reactor pump 1 has a means for discharging cooked feedstock 15. The means comprises an adjustable pressure relief valve 10 on the discharge outlet 7c of the reaction chamber 7a that automatically discharges cooked feedstock when a pre-set pressure level within the reaction chamber 7a is reached.

An embodiment also includes a throttle valve 9 for changing the cook time of the feedstock 15. The throttle valve 9 has a movable internal piston 9a that is movable within the discharge outlet 7c of the reactor 7. To increase the cook time 16, the piston 9a is moved upstream to a selected point within the discharge outlet 7c. To decrease the cook time 16 the piston 9a is moved downstream to a selected point within the discharge outlet 7c.

Other embodiments have a means for injecting steam into the reaction chamber 7a and a means for injecting acid into the reaction chamber 7a. The means for injecting steam and the means for injecting acid are comprised of independently controlled injector ports through the outer and inner walls of the reactor 7. The reactor pump 1 is capable of liquefying the feedstock 15 into a slurry without the introduction of acid into the reaction chamber 7a. However, some cellulose may be particularly difficult to process and the addition of acid in the reaction chamber 7a can catalyze the reaction.

Embodiments of the reactor pump can be configured for continuous or semi-continuous operation.

An embodiment of the reactor for catalyzed hydrolytic splitting of cellulose, comprises: (a) a means for high pressure pumping of feedstock 15 into a reaction chamber 7a and (b) a reactor 7 comprised of (i) the transition segment 25 connected to a downstream reaction chamber; (ii) the transition segment 25 having an inlet 25a that is smaller than its outlet 25b; (iii) the reaction chamber 7a comprised of an inlet 7b substantially the same size as the outlet 25b of the transition segment 25; (iv) a discharge outlet 7c smaller than the inlet 7b of the reaction chamber 7a; (v) compressed feedstock 15 in the transition segment 25 compressed against compressed feedstock 15 in the reaction chamber 7a; (vi) the reactor 7 having a means for heating the compressed feedstock 15 in the reaction chamber 7a to form a feedstock plug 27; (vii) the compression of the feedstock 15 in the transition segment 25 against the feedstock plug 27 in the reaction chamber 7a moving the feedstock plug 27 from the inlet 7b to the discharge outlet 7c; (viii) the moving feedstock plug 27 cooking during its downstream movement in the reaction chamber 7a; (ix) a means for discharging a liquefied slurry of cooked feedstock 15; and (x) the reactor 7 configured for continuous operation.

An embodiment of a catalyzed hydrolytic process for splitting cellulose, comprises the steps of: (a) supplying feedstock 15; (b) dispensing the feedstock 15 into a pump 5; (c) pumping 5 the feedstock 15 against a closed gate 6 to compress the feedstock 15; (d) opening the gate 6 upon the occurrence of an event, the event selected from the group consisting of reaching a pre-set level of pressure on the closed gate 6, reaching a pre-set position of an extending cylinder 13 within a pumping chamber 5a, expiration of a pre-set period of time, anything else, or any combination of the foregoing; (e) pumping 5 the feedstock 15 while the gate 6 is opening; (f) pumping 5 the compressed feedstock 15 against compressed feedstock 15 in a reaction chamber 7a after the gate 6 is fully opened, thereby moving the compressed feedstock downstream; (g) forming a plug 27 of compressed feedstock 15 within the reaction chamber 7a by the downstream movement of the compressed feedstock from an inlet 7b that is larger than a discharge outlet 7c of the reaction chamber 7a; (h) subjecting the plug 27 in the reaction chamber 7a to a constellation of physical things selected from the group consisting of pressure, heat, steam, acid, or any combination thereof; (i) cooking the plug 27 within the reaction chamber 7a during its downstream movement while it is subjected to the selected physical things; (j) opening the discharge outlet 7c upon the occurrence of an event, the event selected from the group consisting of reaching a pre-set pressure level in the reaction chamber 7a, expiration of a pre-set period of time, or any combination of the foregoing; (k) whereby opening the discharge outlet 7c rapidly reduces the pressure in the reaction chamber 7a, the outer surface of the cellulose is broken down, and a liquefied slurry of cooked feedstock is discharged from the discharge outlet 7c.

An embodiment of the process of forming a plug 27 of compressed feedstock 15, comprises the steps of: (i) ramming, at high pressure, a downstream end the compressed feedstock 15 into an inlet 25a of a transition segment 25, against an upstream end of the compressed feedstock 15 in the transition segment 25, and out an outlet 25b of the transition segment 25, the outlet 25b having a size larger than the inlet 25a; (ii) ramming, at high pressure, the downstream end of the compressed feedstock 15 from the outlet 25b of the transition segment 25 against the upstream end of the compressed feedstock 15 in the inlet 7b of the reaction chamber 7a; (iii) holding the compressed feedstock 15 in the reaction chamber 7b for a pre-set period of cook time to allow conversion of the cellulose to a liquefied slurry; (iv) opening, at the end of the pre-set period of cook time, a discharge outlet 7c that is smaller than the inlet 7b of the reaction chamber 7a to discharge the liquefied slurry; and (v) whereby the reaction chamber 7a is cyclically filled with compressed feedstock. The downstream pressure on the plug 27 is monitored as is the back pressure in the reaction chamber 7b. The downstream and back pressures are compared to determine if they are equal and equalized if they differ.

Embodiments of the process comprise the steps of: (i) pressurizing the cooking feedstock 15 by ramming 4 the cooking feedstock 15 downstream in the reaction chamber 7a; (ii) heating the cooking feedstock 15 by the means selected from the group consisting of injecting steam directly into the reaction chamber 7a, indirectly heating the cooking feedstock 15 by heating the outer surface of the reactor 7, flowing a heated substrate through a jacket surrounding the outer surface of the reactor 7, or any combination of the foregoing; and (iii) injecting steam or acid from the outer surface to the inner surface of the reactor 7 and into the cooking feedstock 15.

An embodiment comprises the steps of subjecting (i) the feedstock 15 to a pressure of up to about 2000 psi and (ii) the reaction chamber 7a to a temperature of up to about 1000° Fahrenheit.

Embodiments comprise the steps of (i) receiving feedstock 15 in a feed hopper 14, the feed hopper having an open top and an open bottom; (ii) receiving the feedstock 15 from the feed hopper in a charging chamber 2, the charging chamber 2 having an open top in-line with the open bottom of the hopper 14 and an open bottom in-line with an opening 5c in the pumping chamber 5a; and (iii) receiving the feedstock 15 from the charging chamber 2 in the opening 5c of the pumping chamber 5a.

The process also comprises the steps of (i) extending a ram 4 on the downstream end of cylinder 13 against feedstock 15 in the pumping chamber 5a to compress the feedstock 15 against a closed gate 6; (ii) opening the gate 6 upon the occurrence of an event selected from the group consisting of expiration of a pre-set time period, reaching a pre-set level of pressure on the upstream face of the gate 6, and extension of the ram 4 to a pre-set position; (iv) reducing the speed of the ram 4 as the gate is opening, and continuing the reduced speed after the gate 6 is opened; (v) continuing extension of the ram 4 until the occurrence of an event selected from the group consisting of expiration of a pre-set time period and extension of the ram 4 to a pre-set position; (vi) retracting the ram 4 after the occurrence of a selected event; and (iv) continuing retraction of the ram 4 until the occurrence of an event selected from the group consisting of expiration of a pre-set time period and retraction of the ram 4 to a pre-set position.

An embodiment of the feedstock is mixed by the steps of: grinding the cellulose; mixing acid with water to form an aqueous solution of about 0.5% to about 10% acid; mixing the cellulose, the aqueous solution of acid, and additional water to form feedstock; selecting the cellulose from the group consisting of wood, logs, wood chips, lumber, newspaper, cardboard, corn fiber, corn cob, sugar cane, straw, switch grass, or any combination thereof, (v) selecting the acid from the group consisting of sulfuric, hydrochloric, ammonium, or any combination thereof, and granulating the formed feedstock 15. The feedstock may be formed by mixing about 20% to about 50% by weight of granular cellulose with about 78% to about 48% by weight of water, and about 2% by weight of acid. Acid can be added to the feedstock after it is fed into the reactor pump 1.

Another embodiment of the reactor pump is comprises of a means for compressing cellulose into a reactor and a means for catalyzed hydrolytic splitting of the compressed cellulose in the reactor. The means for compressing cellulose material is a pump comprising (i) a pumping chamber having an opening for receiving the cellulose; (ii) a ram configured to compress the cellulose within the pumping chamber and the reactor during an extension stroke; (iii) the ram configured to retract to allow cellulose to fill the pumping chamber; and (iv) continuation of the extension and retraction of the ram. The reactor comprises (i) an inlet and a discharge outlet each of which has a smaller cross-sectional area than the cross-sectional area of the interior of the reactor; (ii) the cellulose formed into a plug by compression of the cellulose in the reactor; (iii) the cellulose plug forced downstream within the reactor by compression on the cellulose in the reactor; (iv) the pressure and heat within the reactor progressively cooking the cellulose plug to a liquid slurry during its downstream movement towards the discharge outlet; (v) the liquid slurry discharged out the discharge outlet. Inputs to the reactor are selected from the group consisting of (i) pressure for maintaining plug density, moving the plug downstream, and breaking the plug down to a liquid slurry, (ii) acid and/or steam for breaking the plug down to a liquid slurry, (iii) water for reducing friction between the interior walls of the reactor and the plug, or (iv) any combination of the foregoing. The liquefied slurry is discharged from the reactor when pressure in the reactor reaches a pre-set level and there is a means for changing the time that the cellulose plug cooks.

DRAWINGS

Figure 4:
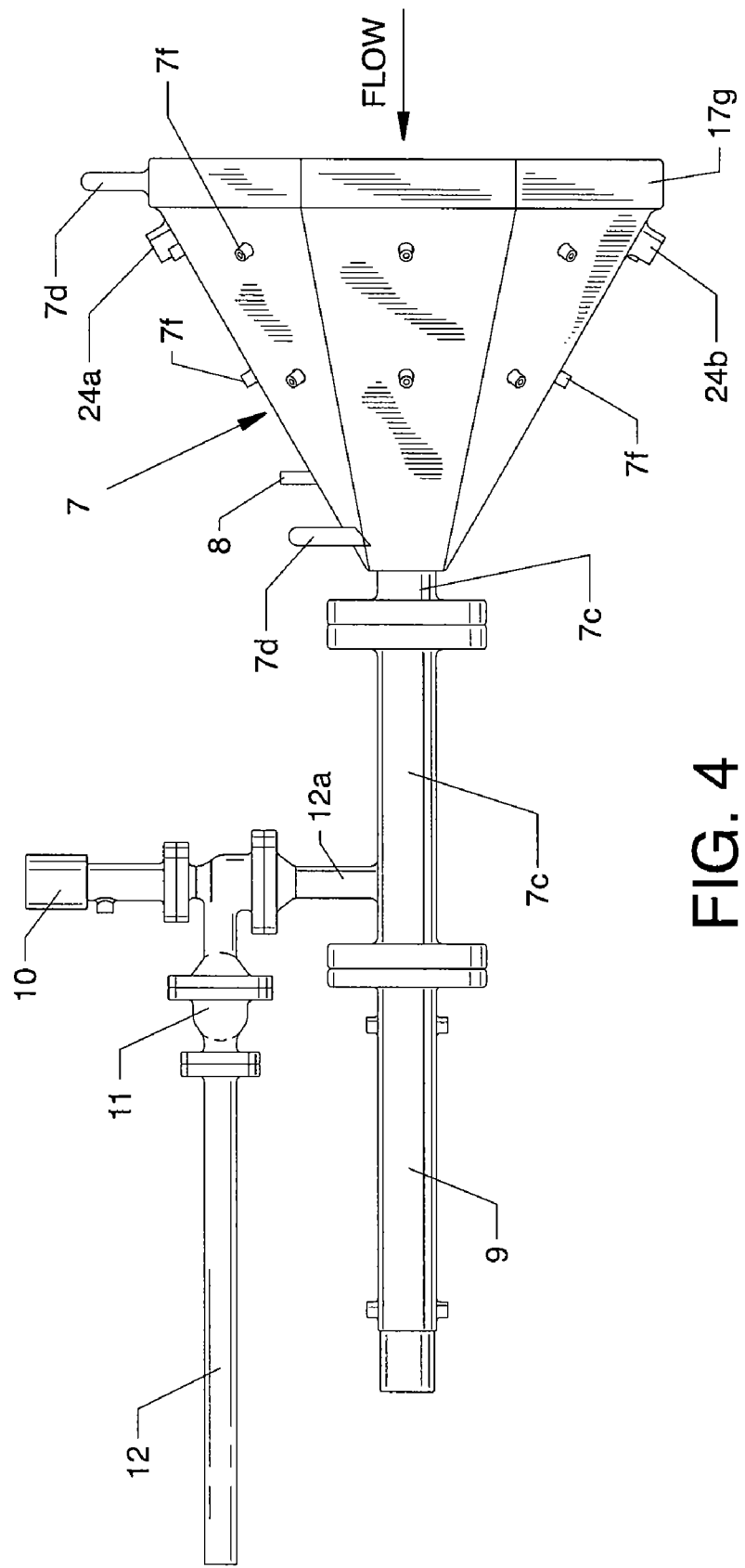

FIG. 4 is a side view of a reactor 7 illustrating the steam jacket inlet 24a and the steam jacket outlet 24b.

Figure 5:
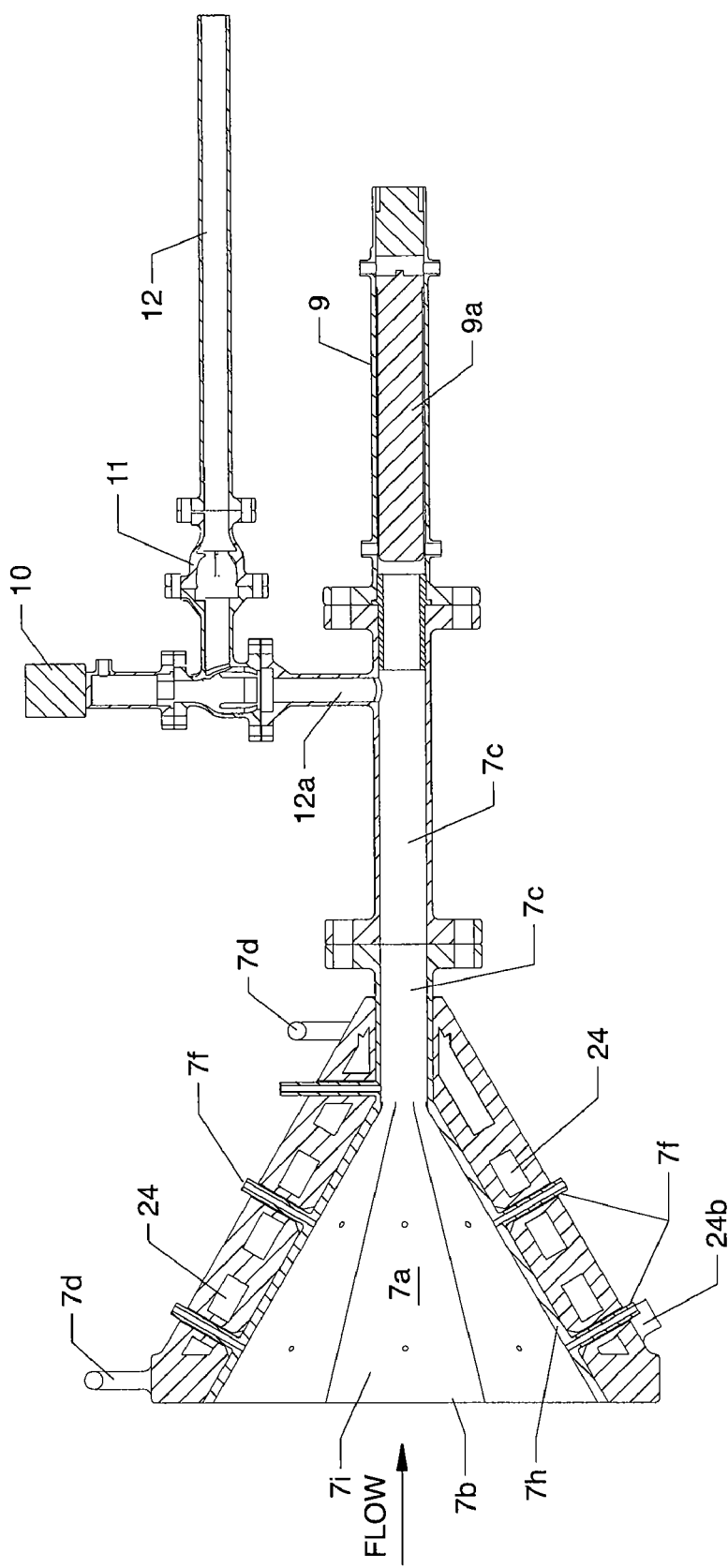

FIG. 5 is a cut-away view of a reactor 7.

Figure 6:
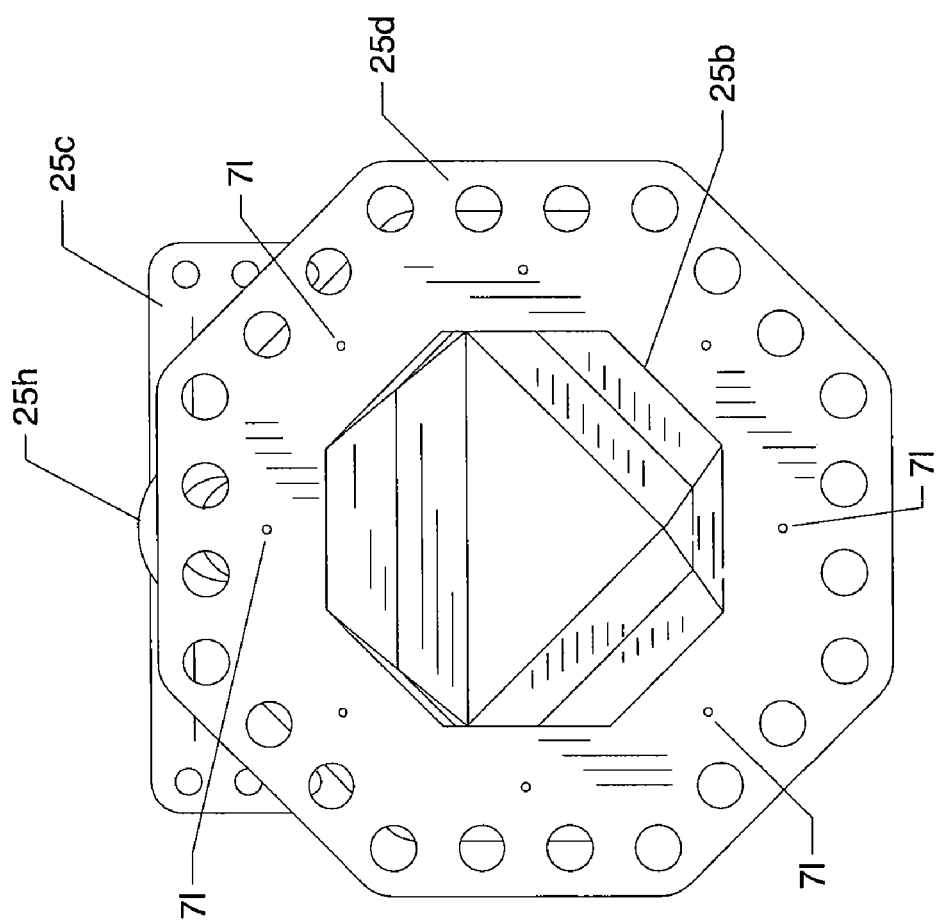

FIG. 6 is a view of the outlet 25b of a transition segment 25 of a reactor 7.

Figure 7:
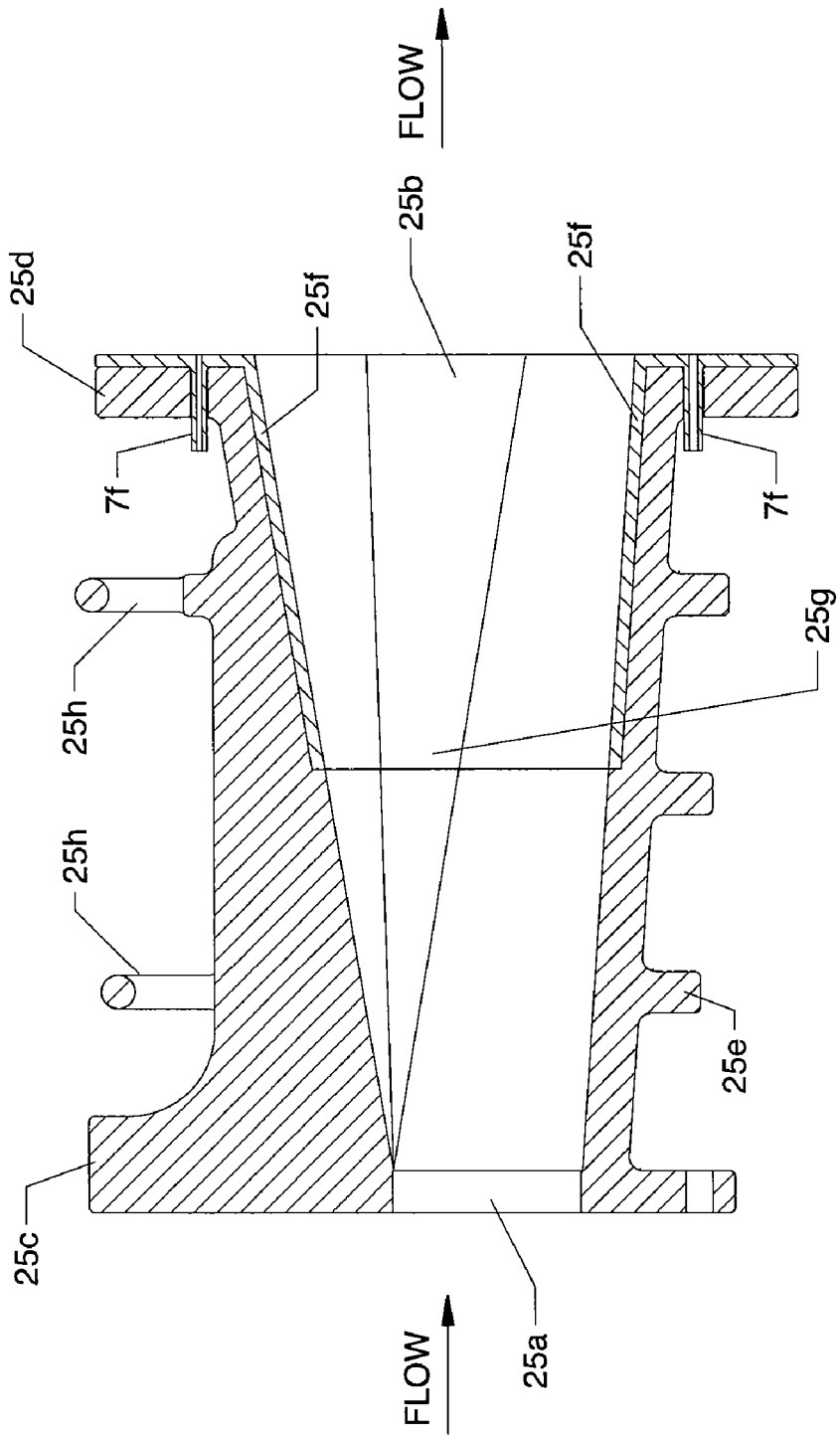

FIG. 7 is a cut-away view from the side of a transition segment 25.

Figure 8:
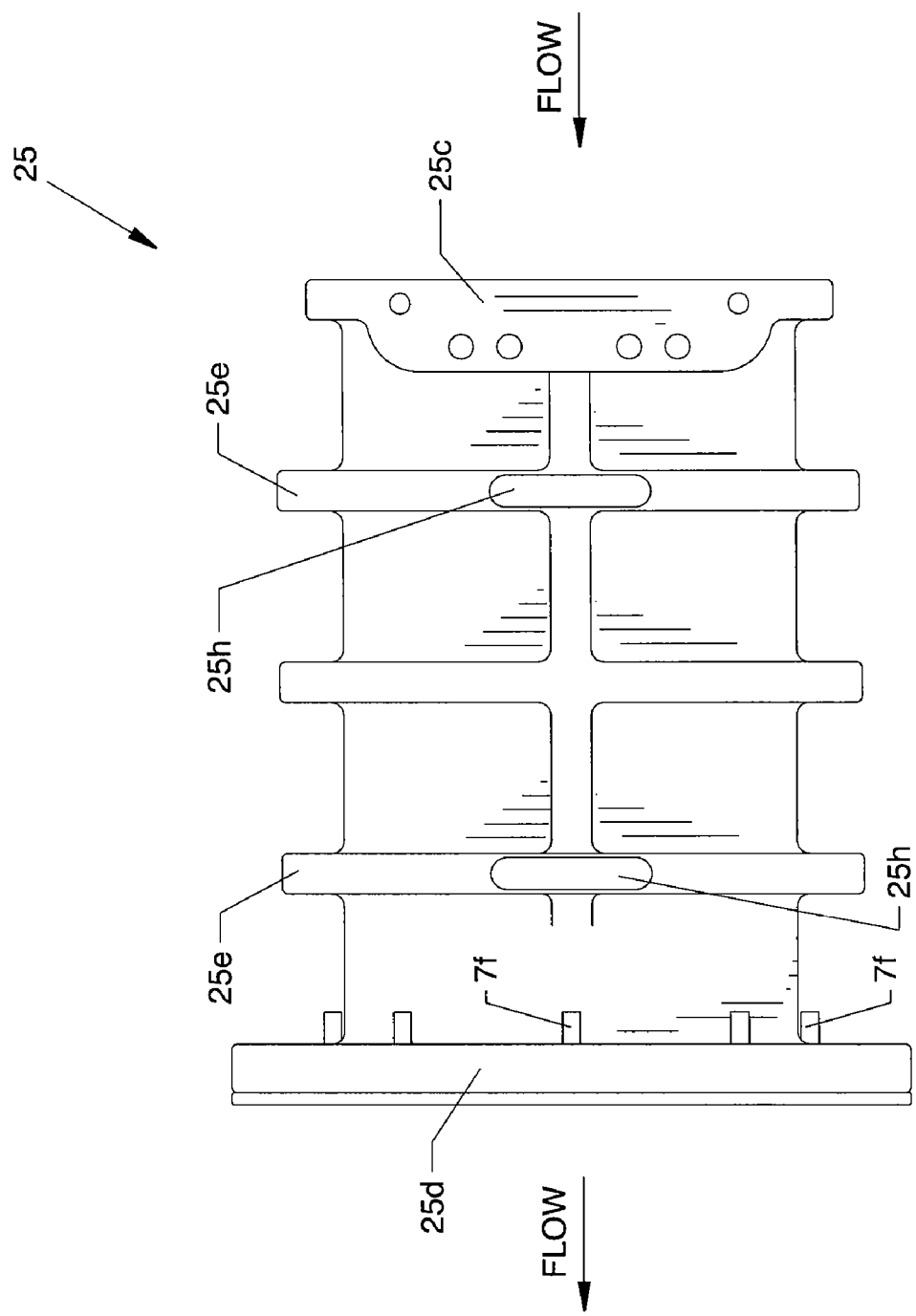

FIG. 8 is a top view of a transition segment 25.

Figure 9:
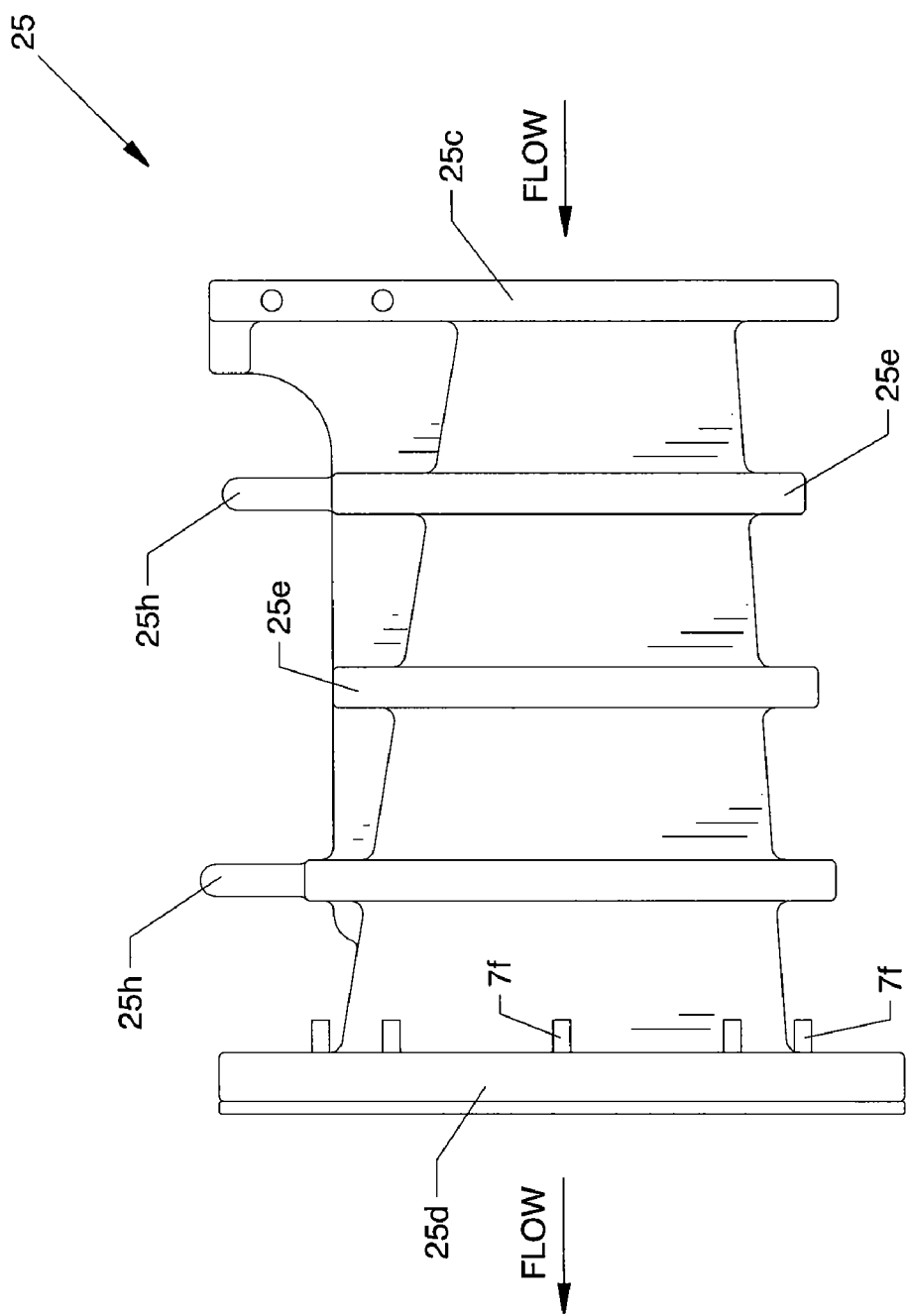

FIG. 9 is a side view of a transition segment 25.

Figure 10:
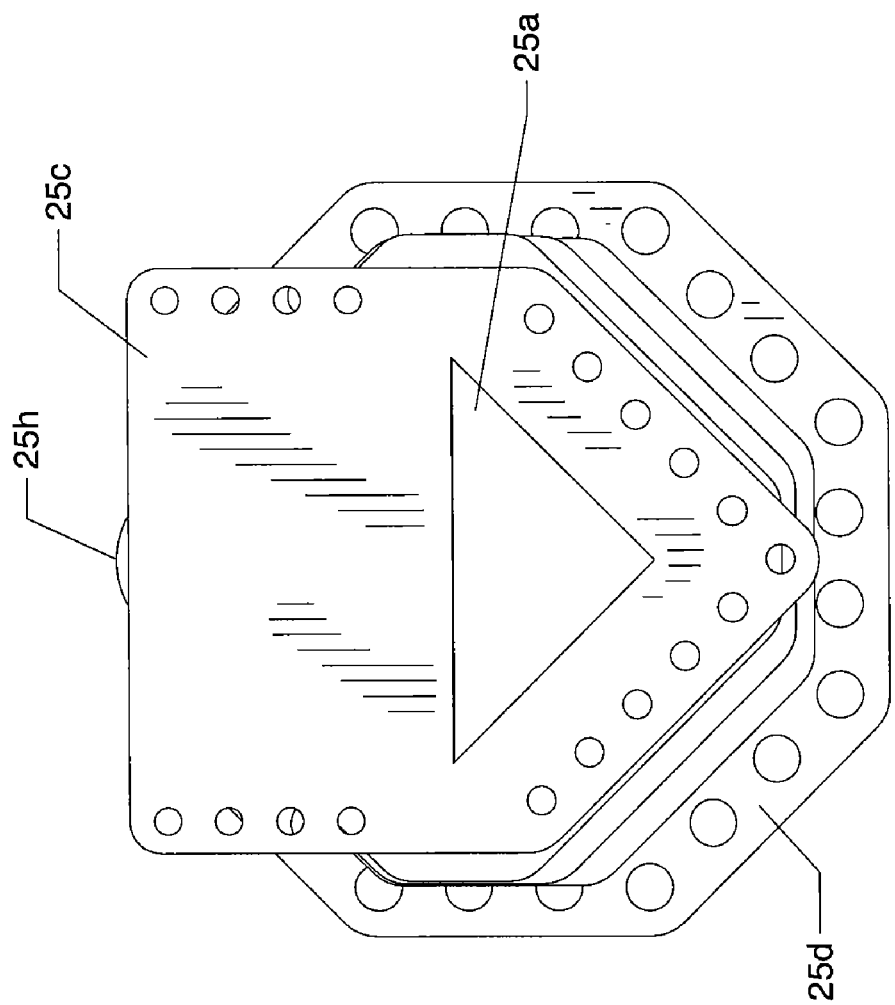

FIG. 10 is a view of the inlet 25a of a transition segment 25.

Figure 11:
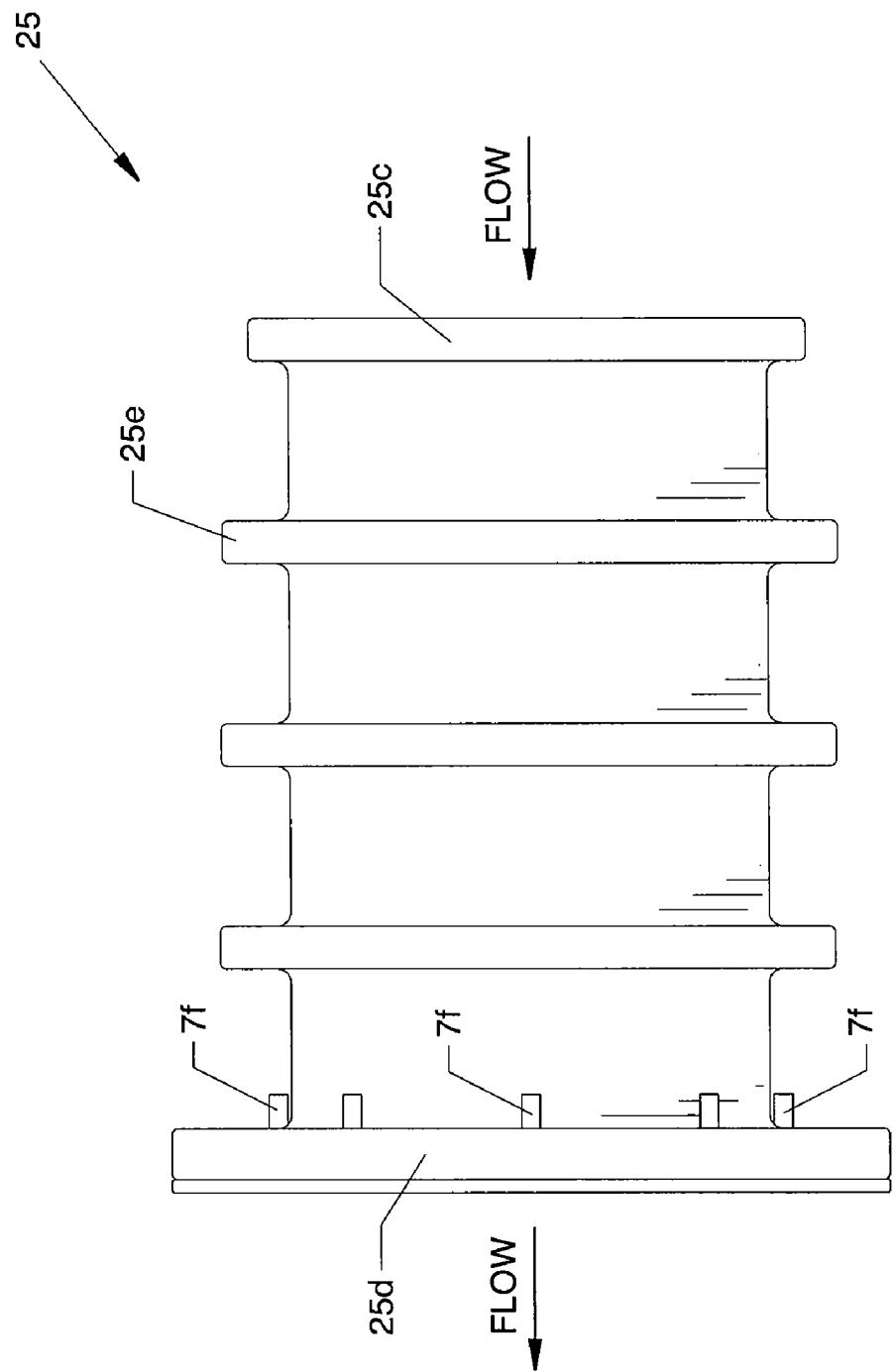

FIG. 11 is a bottom view of a transition segment 25.

Figure 12:
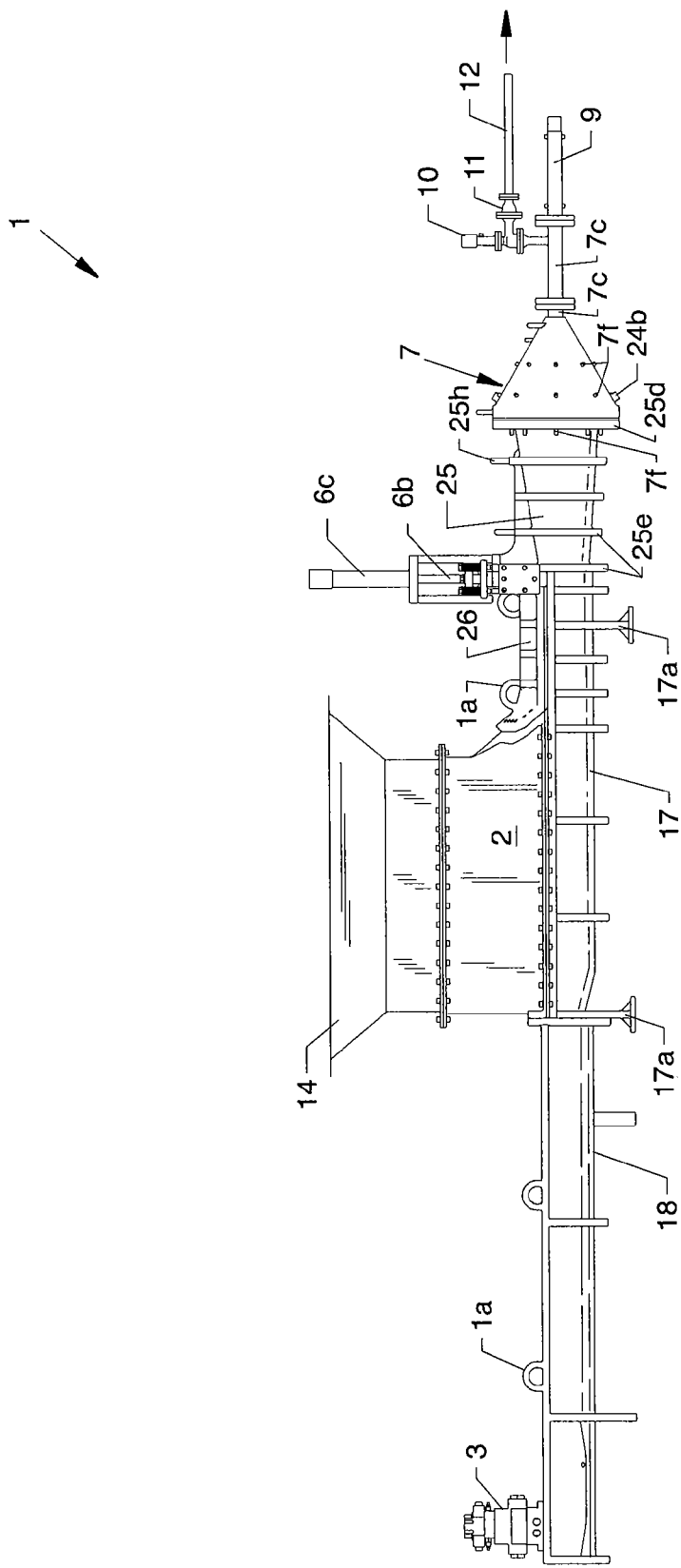

FIG. 12 is a view of the right side of a reactor pump 7.

Figure 13:
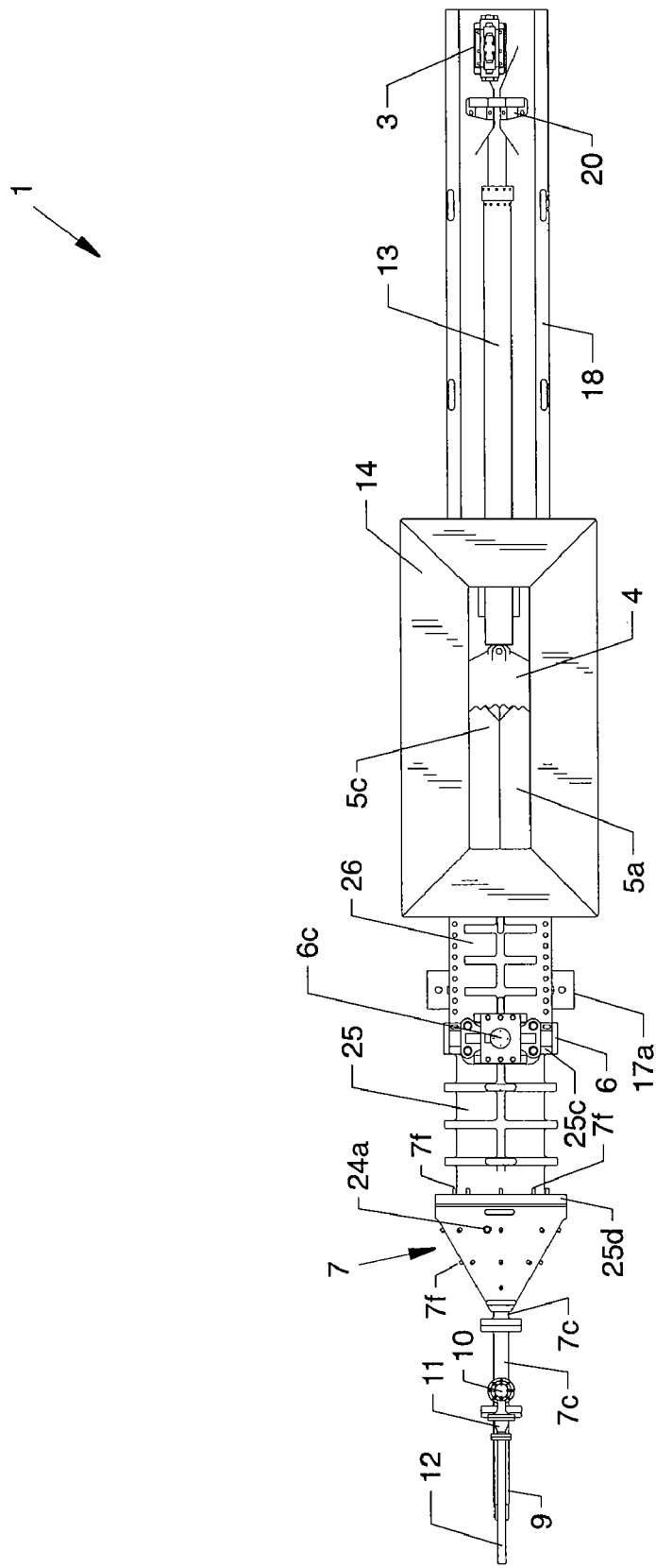

FIG. 13 is a top view of a reactor pump 7.

Figure 14:
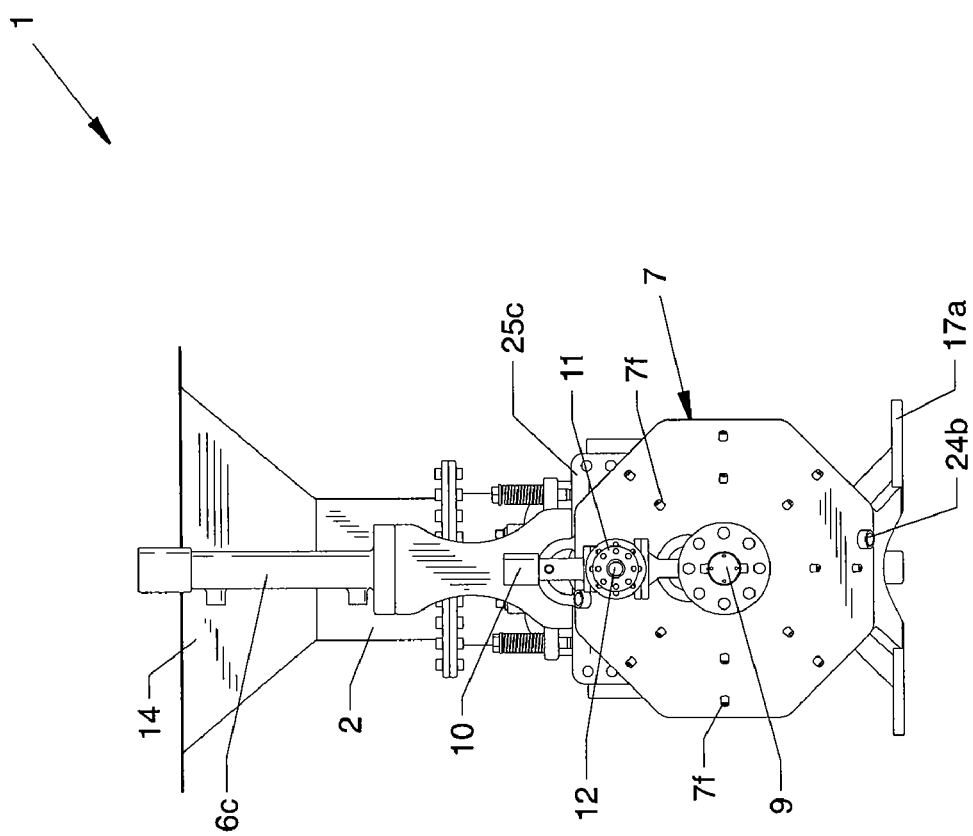

FIG. 14 is a view of a reactor pump 7 from the downstream/reactor end.

Figure 15:
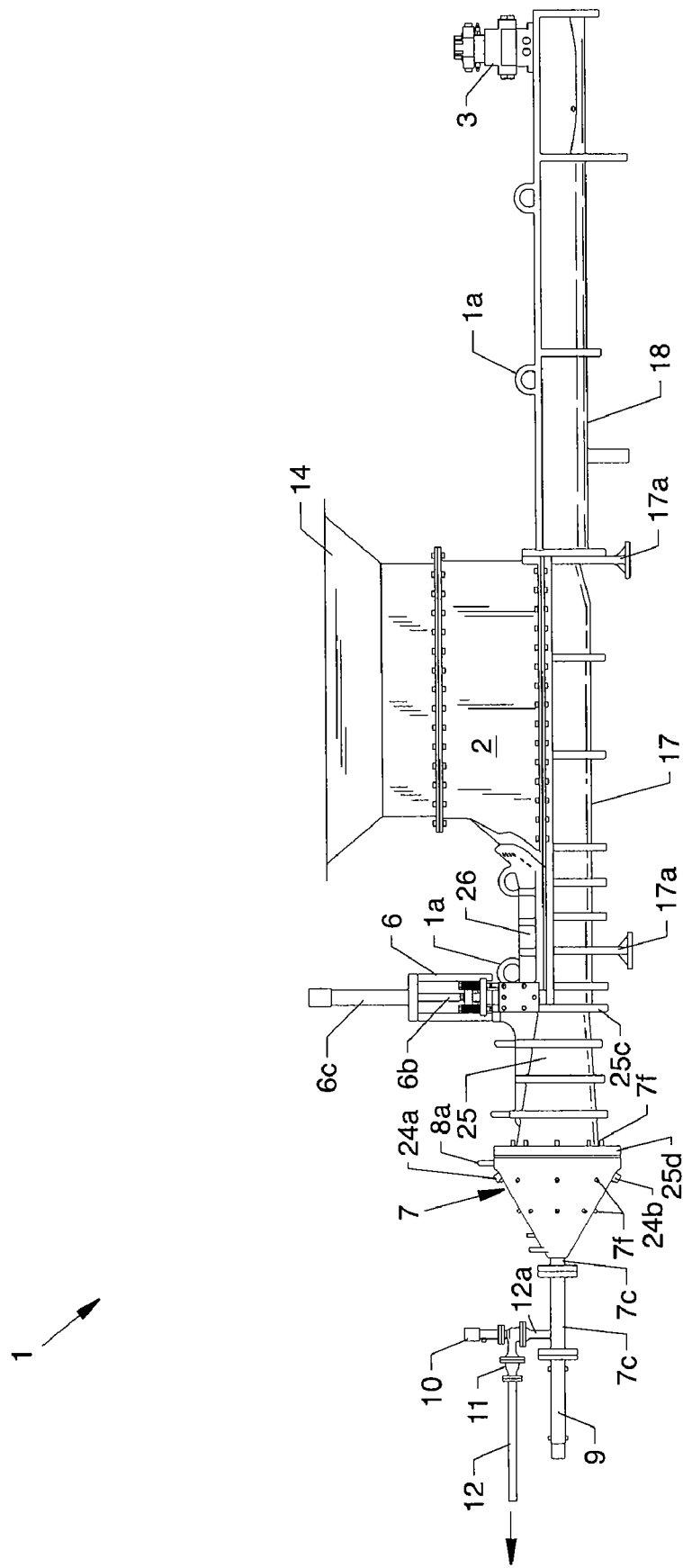

FIG. 15 is a view of the left side of a reactor pump 7.

Figure 16:
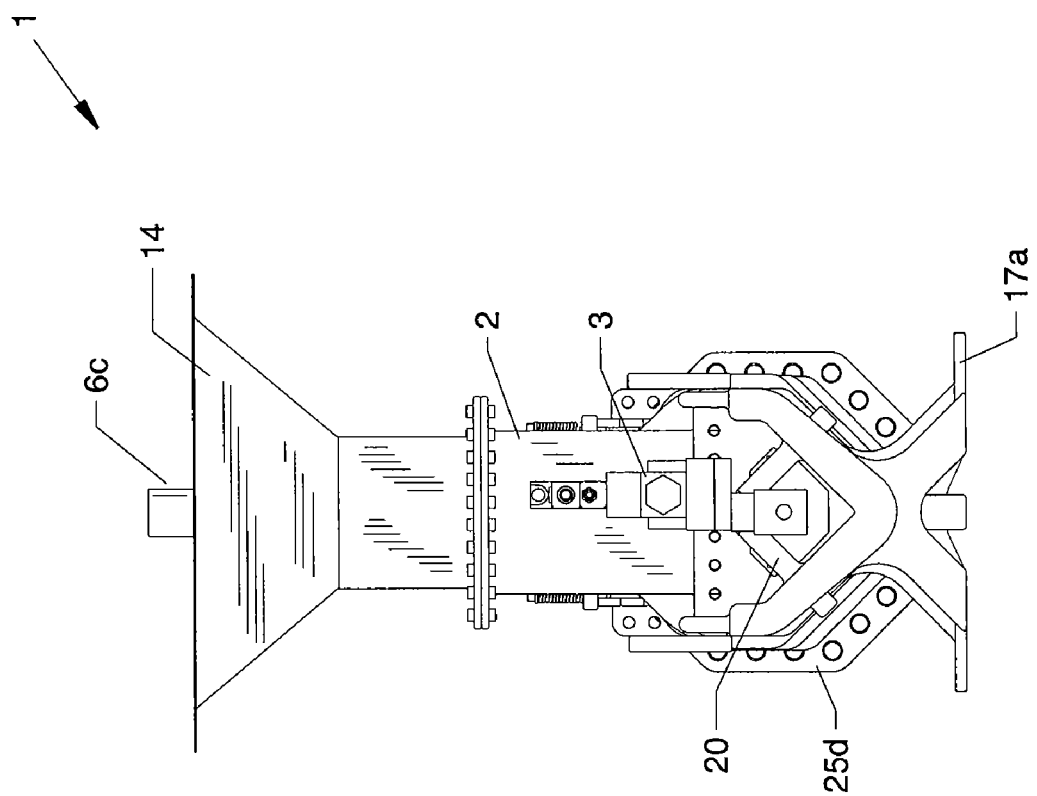

FIG. 16 is a view of a reactor pump 7 from the upstream/pump end.

Figure 17:
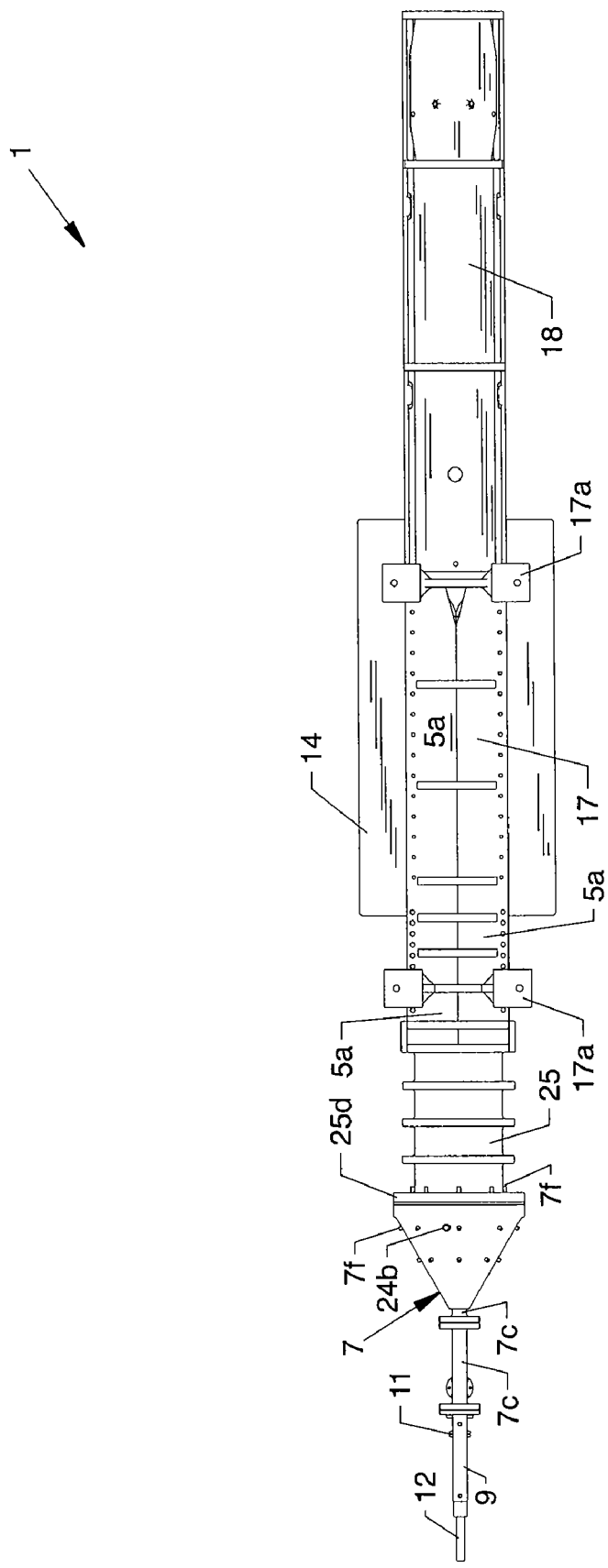

FIG. 17 is a bottom view of a reactor pump 7.

Figure 18:
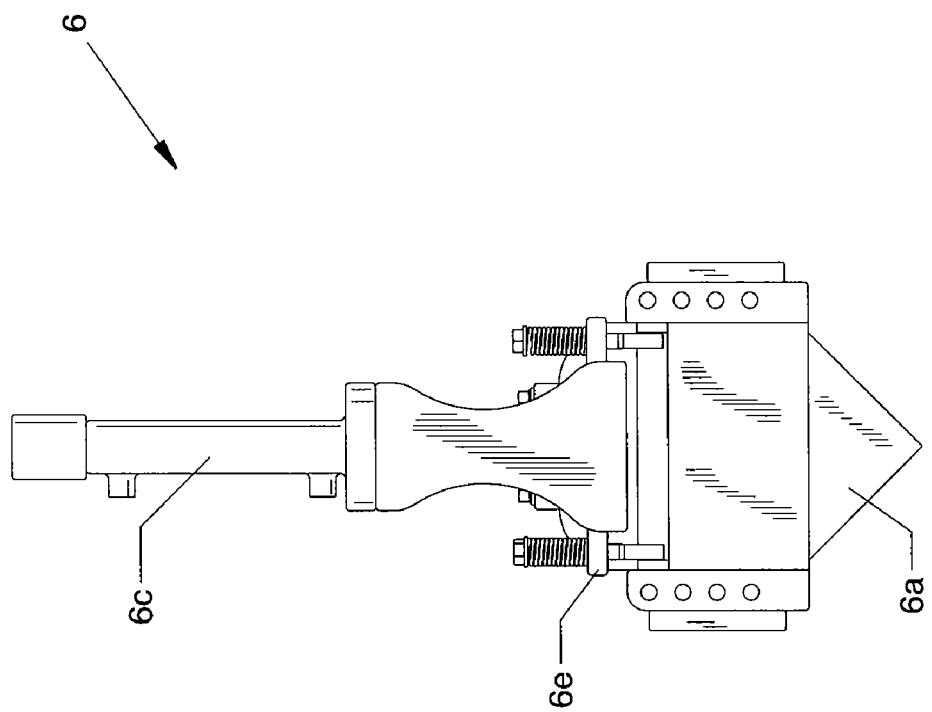

FIG. 18 is an elevation view of the downstream side of a knife gate 6.

Figure 19:
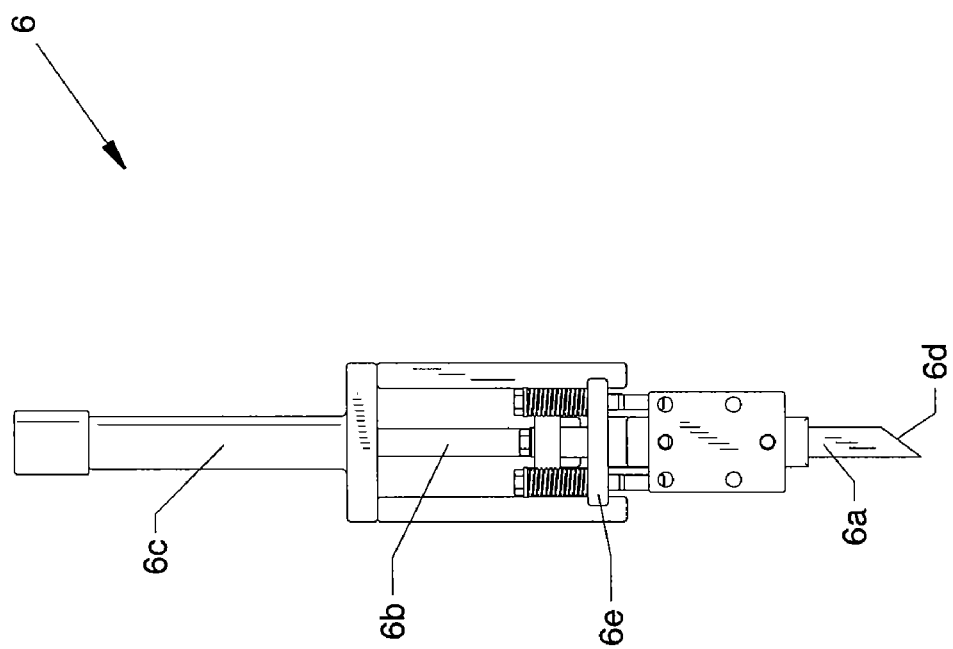

FIG. 19 is an elevation view of the side of a knife gate 6.

Figure 20:
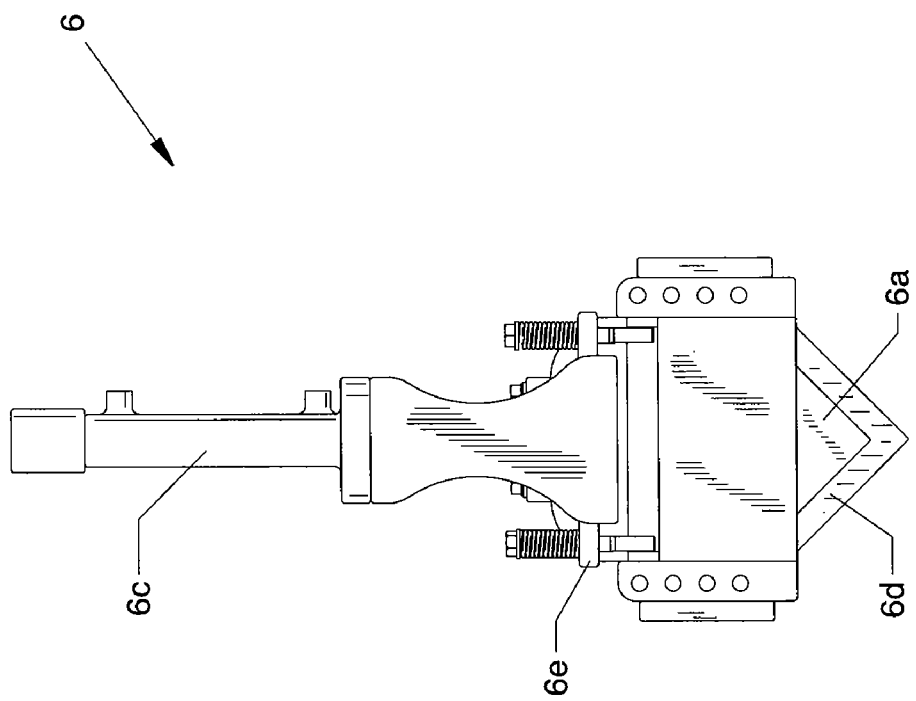

FIG. 20 is an elevation view of the upstream side of a knife gate 6.

Figure 21:
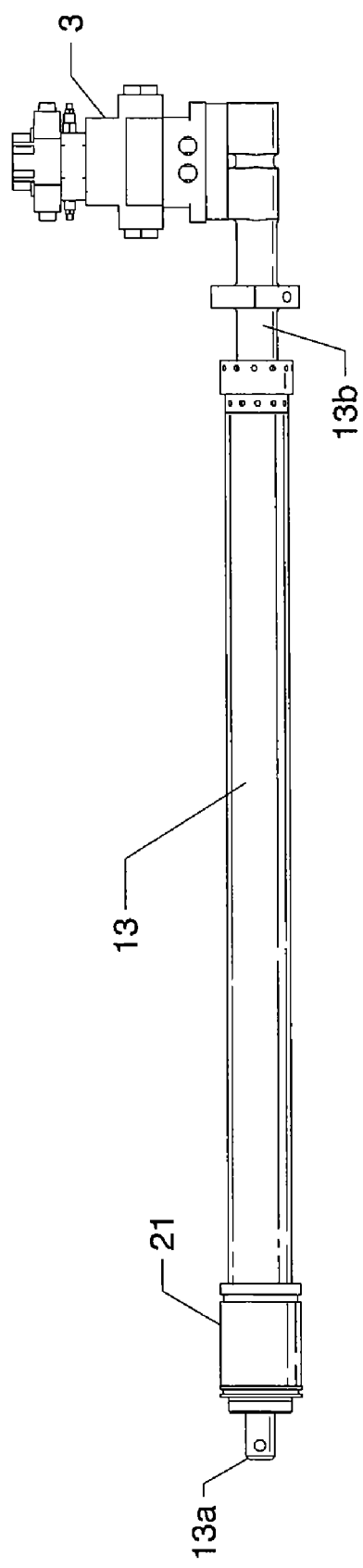

FIG. 21 is an elevation view of a hydraulic cylinder 13 for moving the ram 4.

Figure 22:
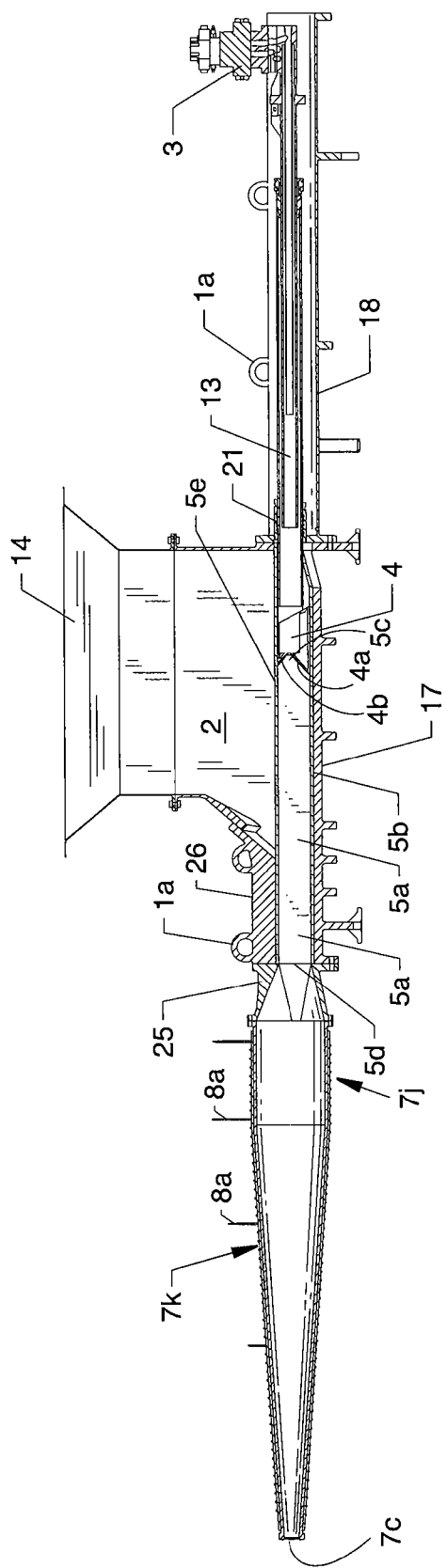

FIG. 22 is a view of a reactor pump 1 with a straight segment 7j connected to an adjoining inwardly tapered segment 7k.

Figure 23A:
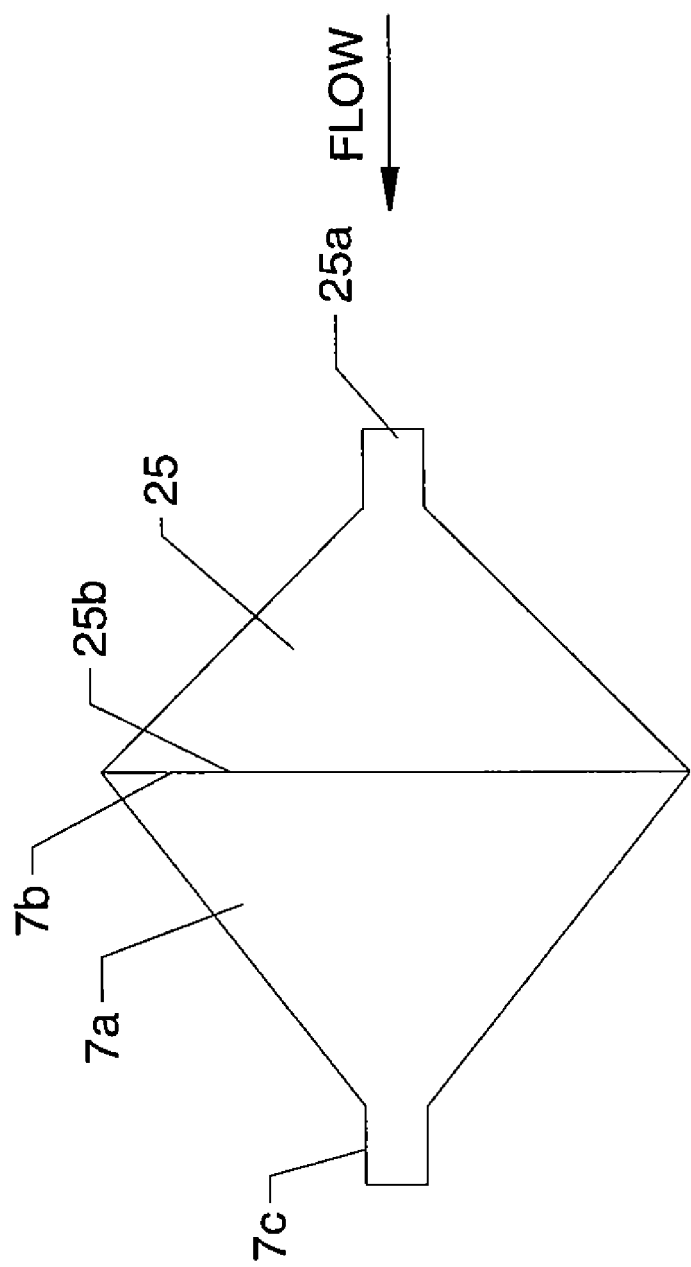

FIG. 23A is a schematic view of an embodiment of a transition segment 25 and a reaction chamber 7a.

Figure 23B:
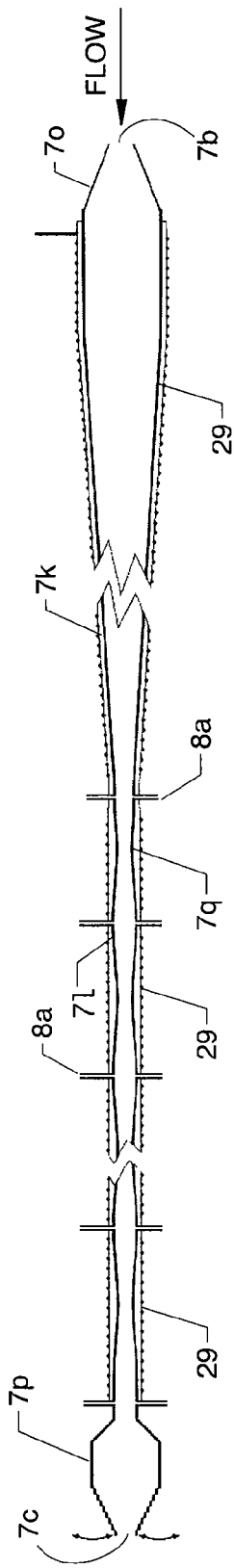

FIG. 23B is a view of an embodiment of a reaction chamber 7a having a configuration that varies along its length including an inlet 7b, an outwardly tapered segment 7o (a cone section 7n), an inwardly tapered segment 7k, a series of alternating concave 7q and convex 7l segments, and an exit plug segment 7p.

Figure 24:
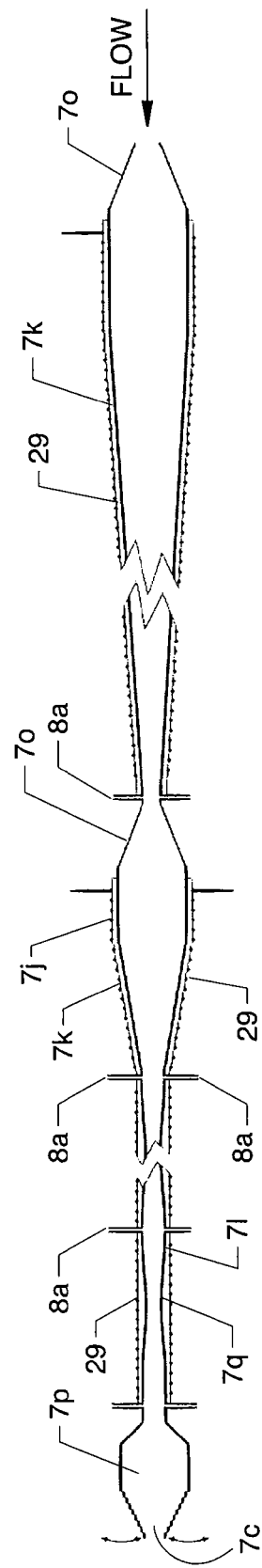

FIG. 24 is a view of an embodiment of a reaction chamber 7a having multiple plugs—inlet, intermediate, and exit plugs, including an inlet 7o, a straight segment 7j, an inwardly tapered segment 7k, a second inlet 7o, a straight segment 7j, an inwardly tapered segment 7k, a convex segment 7l, a concave segment 7q, an exit plug segment 7p, and a discharge outlet 7c.

Figure 25A:
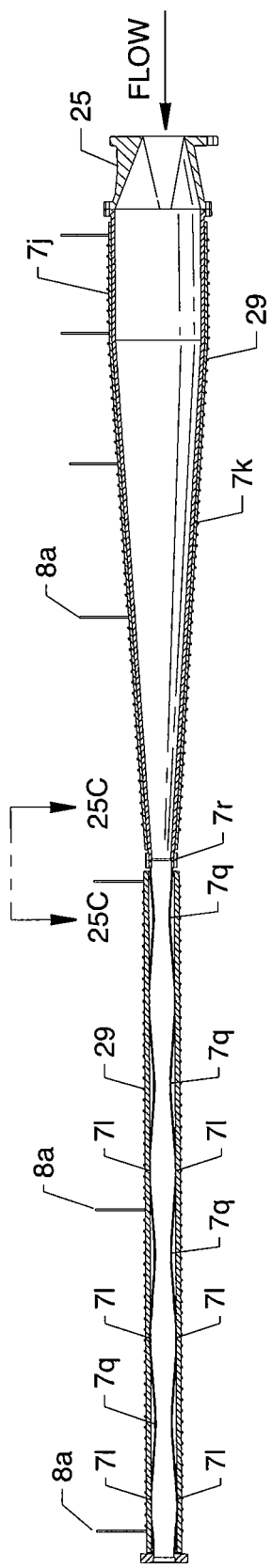

FIG. 25A is a cross-section view of an embodiment of a reaction chamber 7a having a transition segment 25, a straight segment 7j, an inwardly tapered segment 7k, a connector segment 7r, a concave segment 7q, and a convex segment 7l.

Figure 25B:
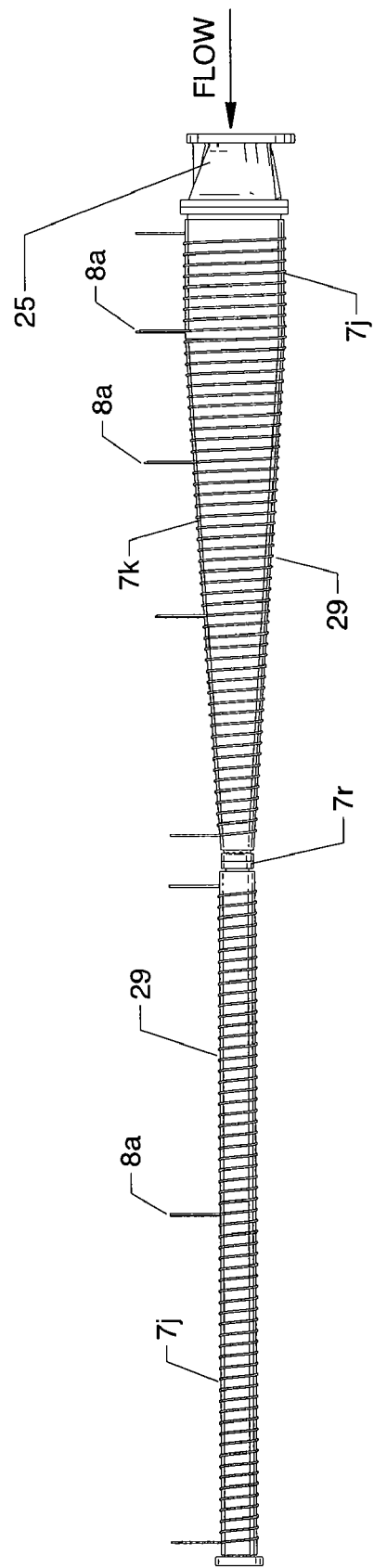

FIG. 25B is an elevation view of the embodiment of FIG. 25A.

Figure 25C:
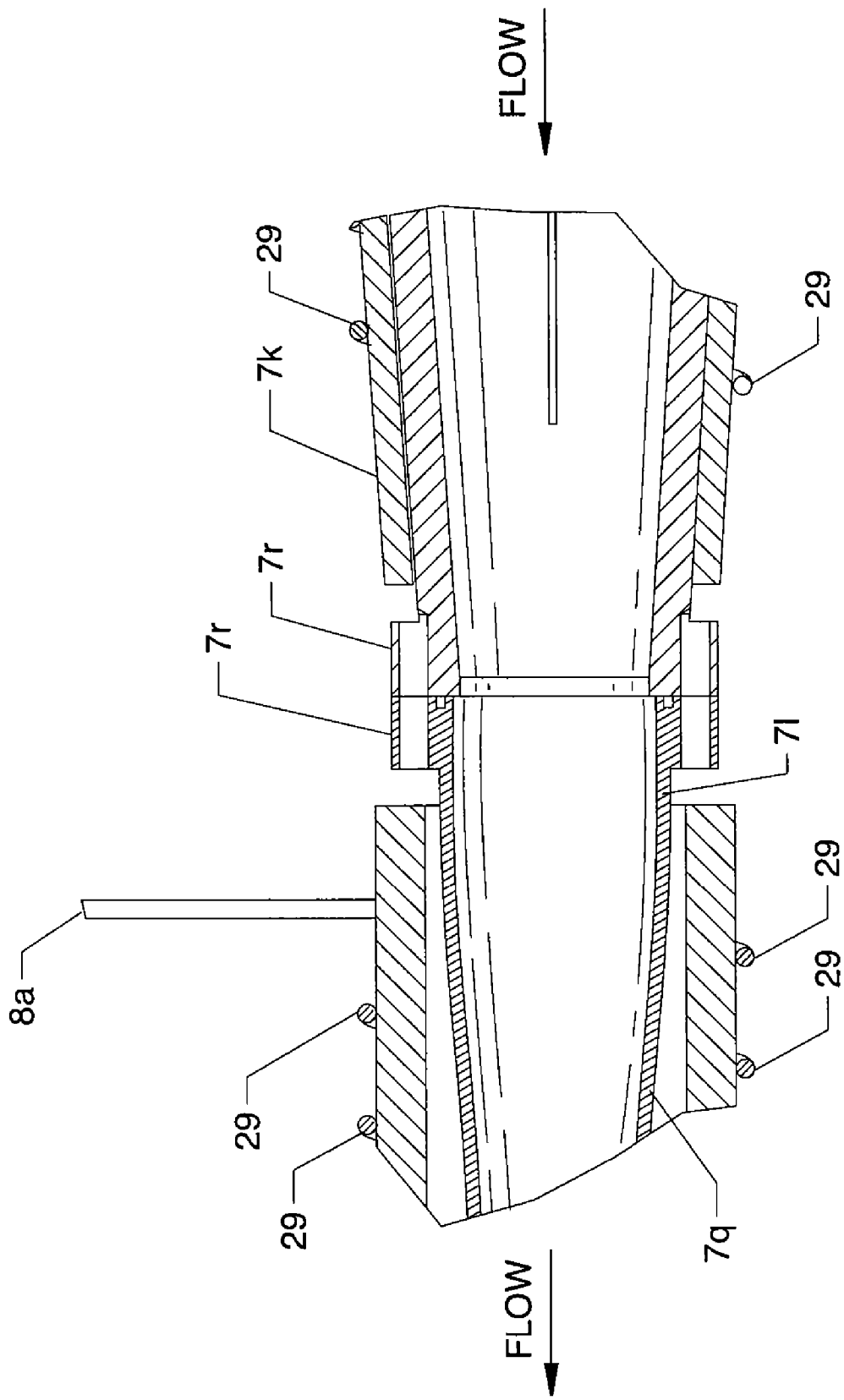

FIG. 25C is a view of the connector segment 7r between the inwardly tapered segment 7k and the segments having concave and convex shapes 7q and 7l.

Figure 26:
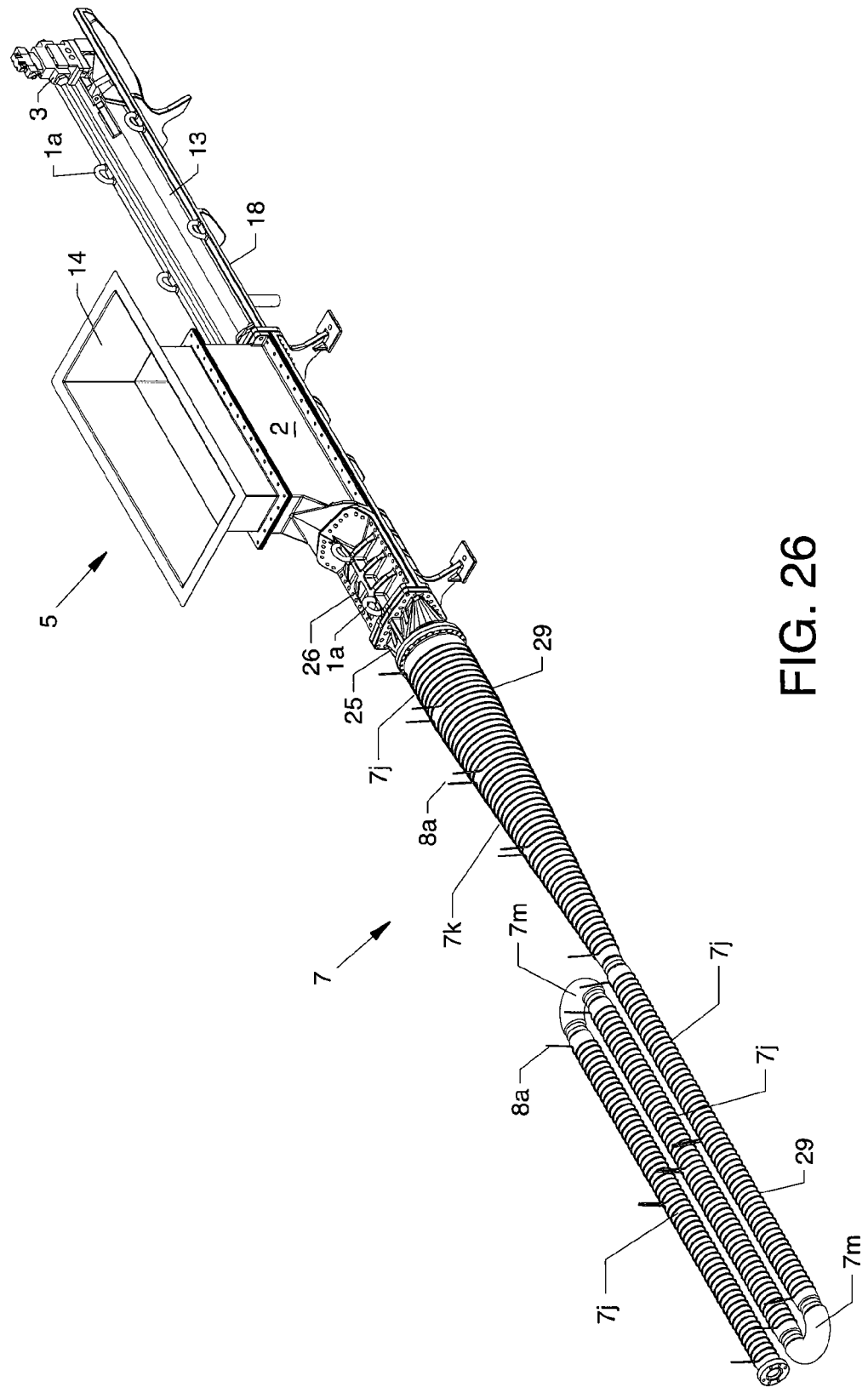

FIG. 26 is a view of a reactor pump 1 having a straight segment 7j, an inwardly tapered segment 7k, a second straight segment 7*j*, a first U-shaped elbow 7*m*, a third straight segment 7*j*, a second U-shaped elbow 7*m*, a fourth straight segment 7*j*.

Figure 27:
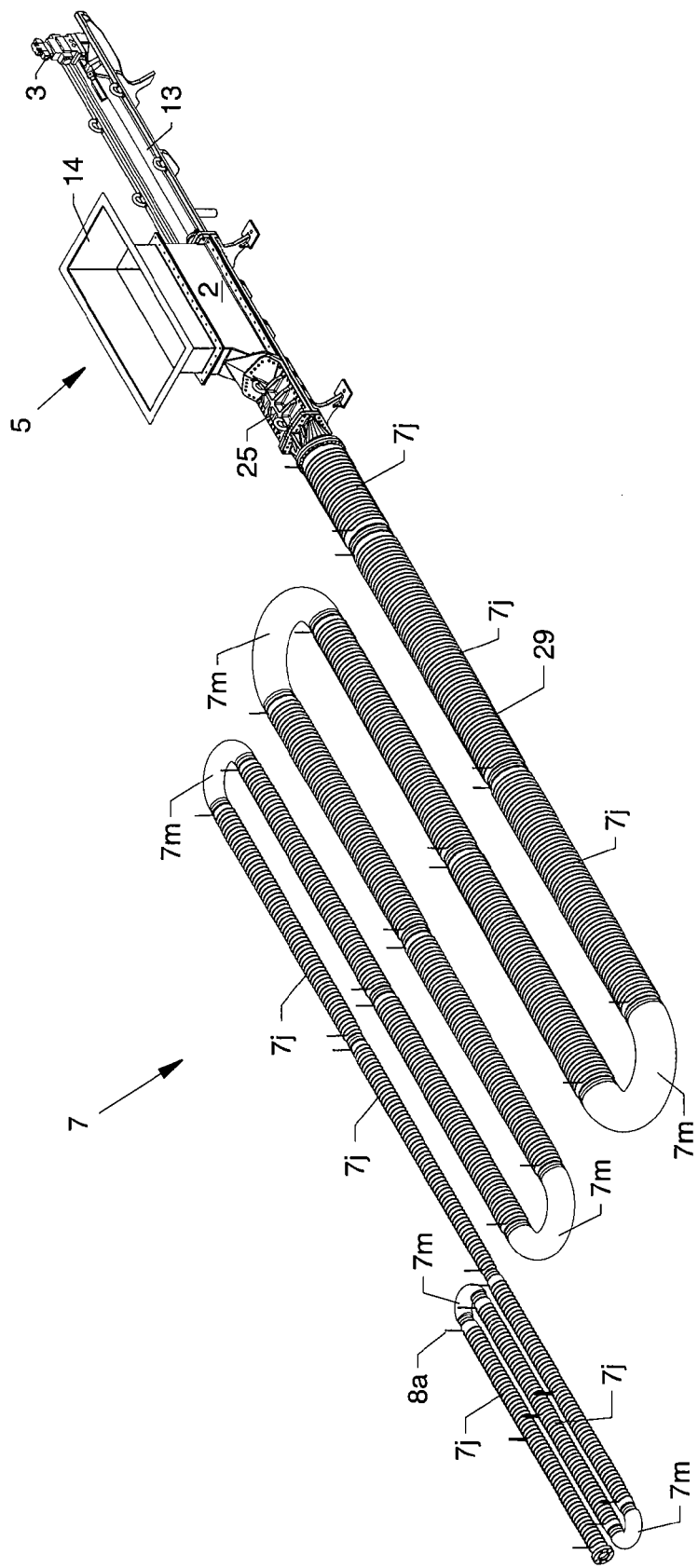

FIG. 27 is a view of a reactor pump 1 having multiple straight segments 7*j* with elbows 7*m* between the segments.

Figure 28:
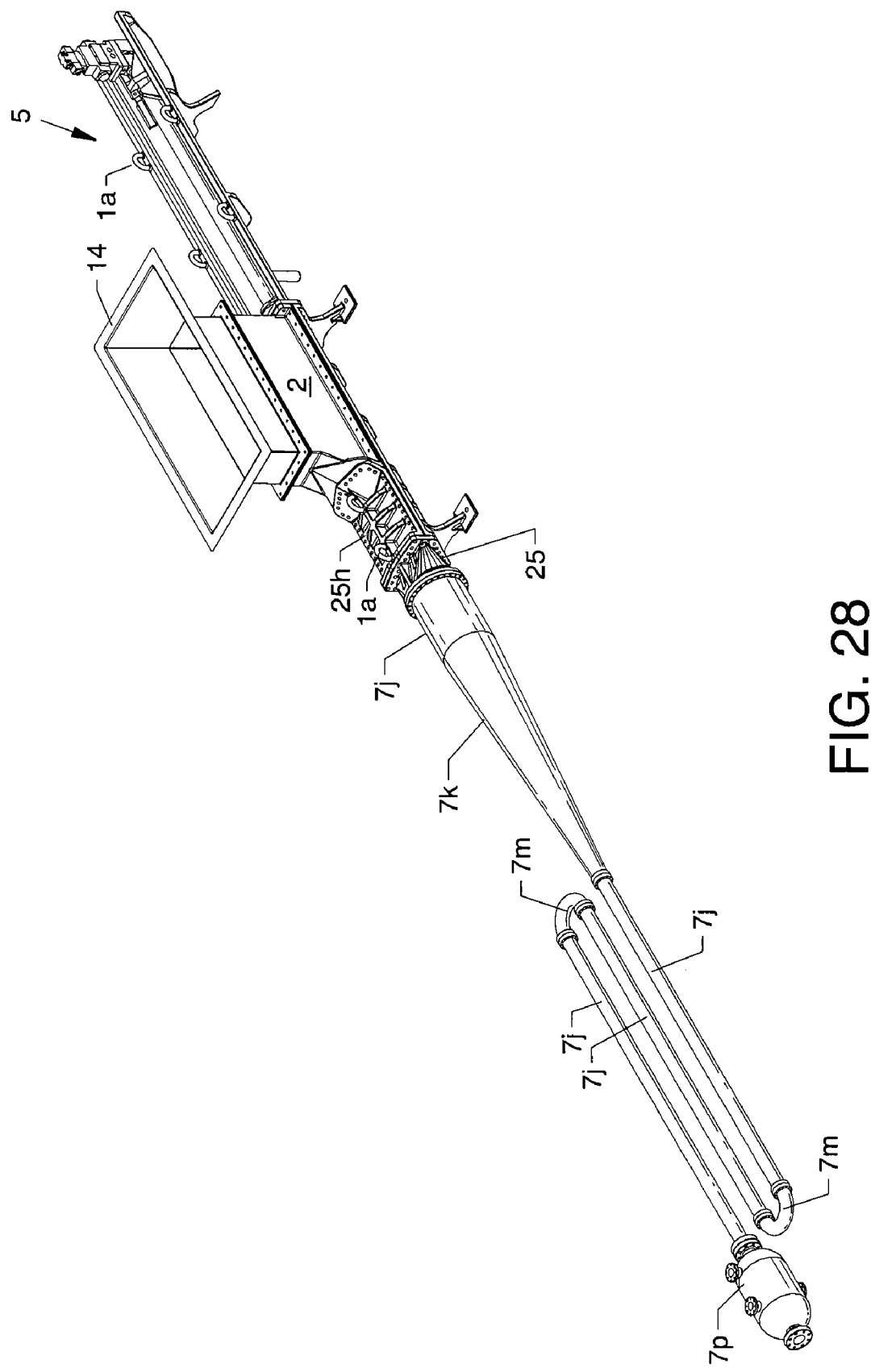

FIG. 28 is a view of a reactor pump 1 with multiple segments including a straight segment 7*j*; an inwardly tapered segment 7*k*, three straight segments 7*j*, two u-elbow segments 7*m*, and an exit plug segment 7*p*.

Figure 29:
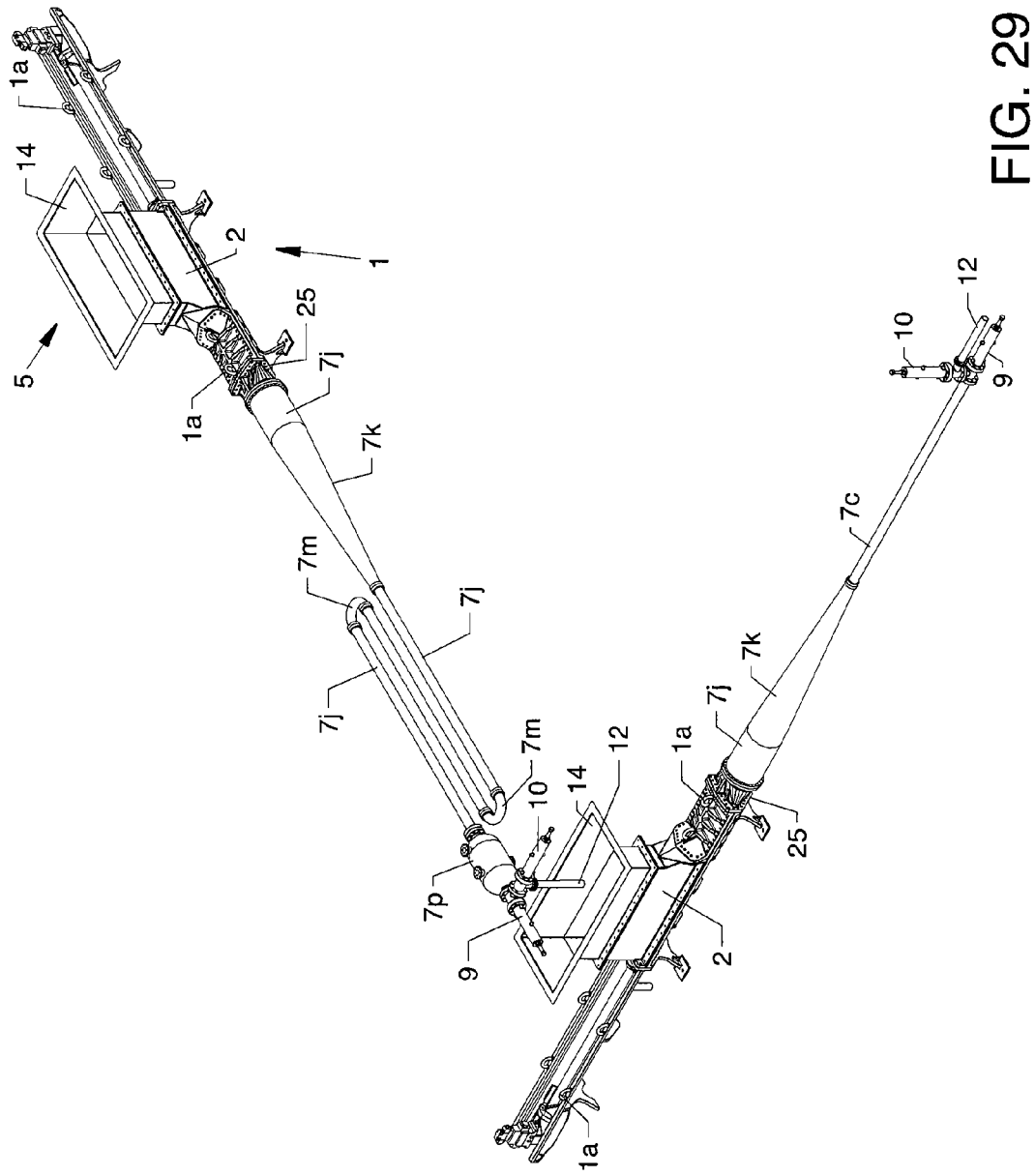

FIG. 29 is a view of a reactor pump 1 with multiple segments having a variety of configurations, lengths, and diameters, wherein the output of the reactor 7 is the input to another reactor pump 1.

Figure 30:
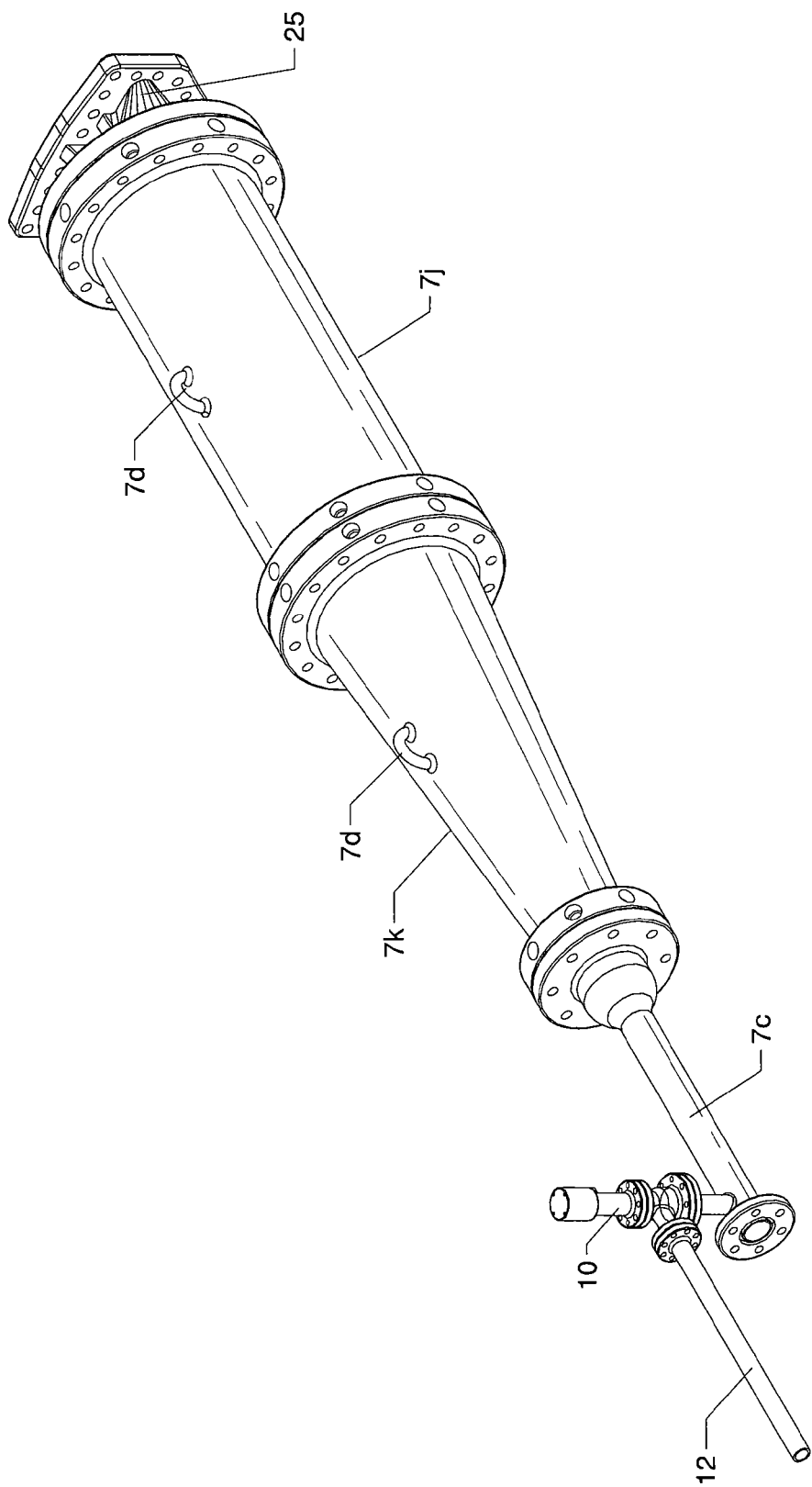

FIG. 30 is a view of a reactor 7 with a low volume exit valve.

Figure 31:
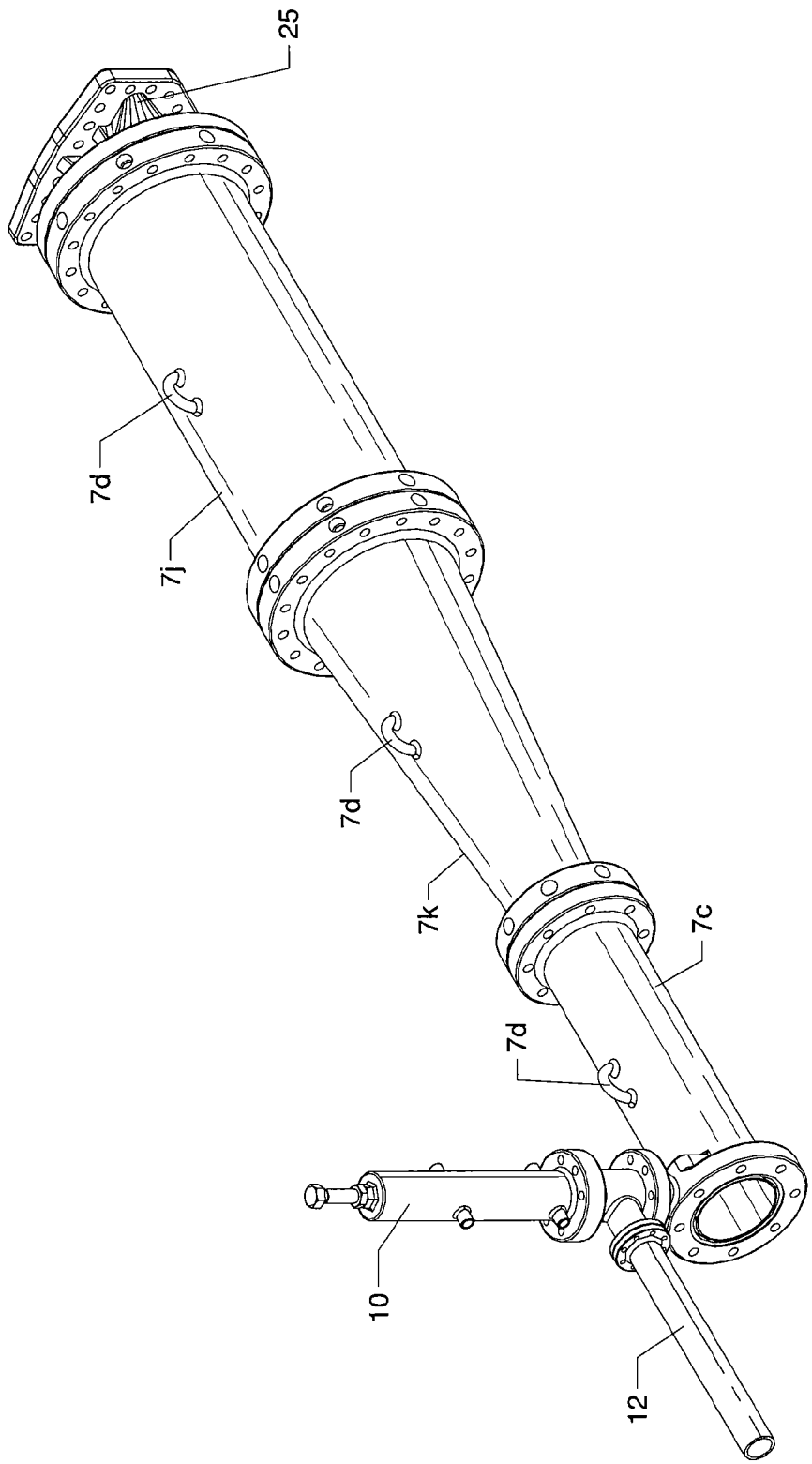

FIG. 31 is a view of a reactor 7 with a high volume exit valve.

Figure 32:
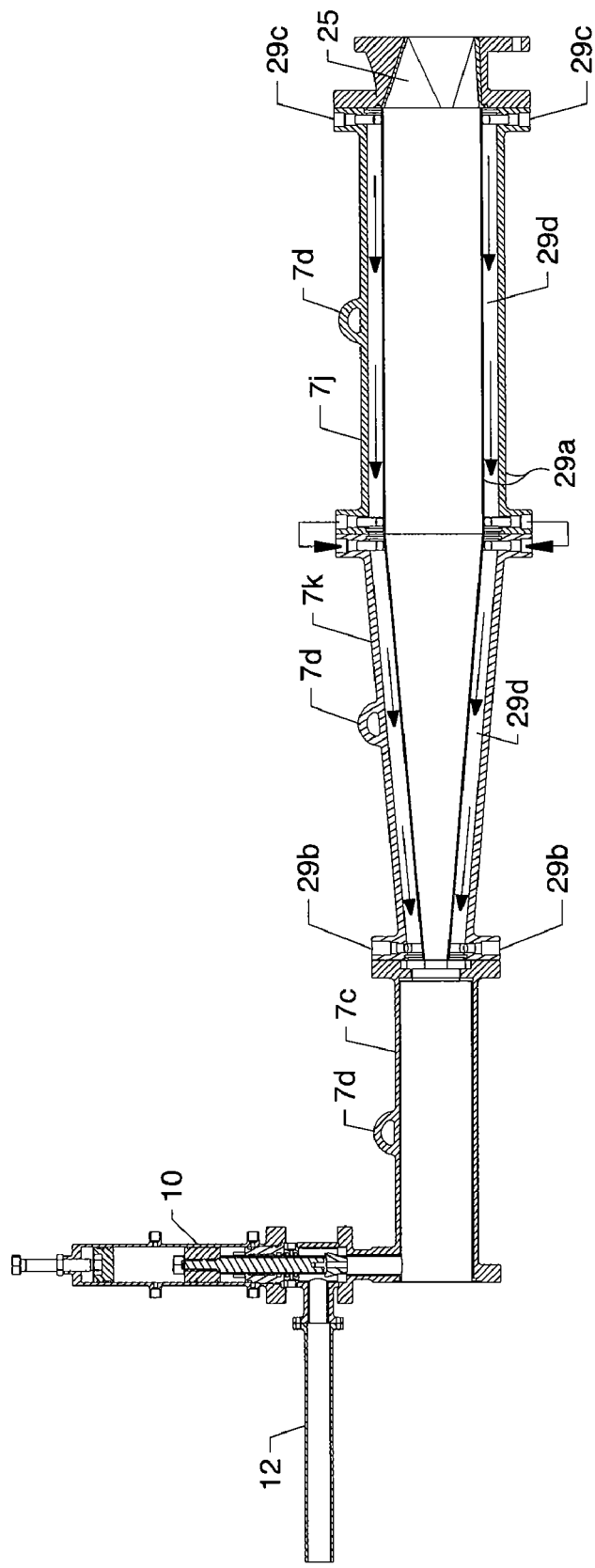

FIG. 32 is a view of a reaction chamber 7*a* with a zirconium liner 7*h* and a heat exchanger 29*a* that may be configured to use oil or steam.

DESCRIPTION OF EMBODIMENTS

Overview

Figure 1A:
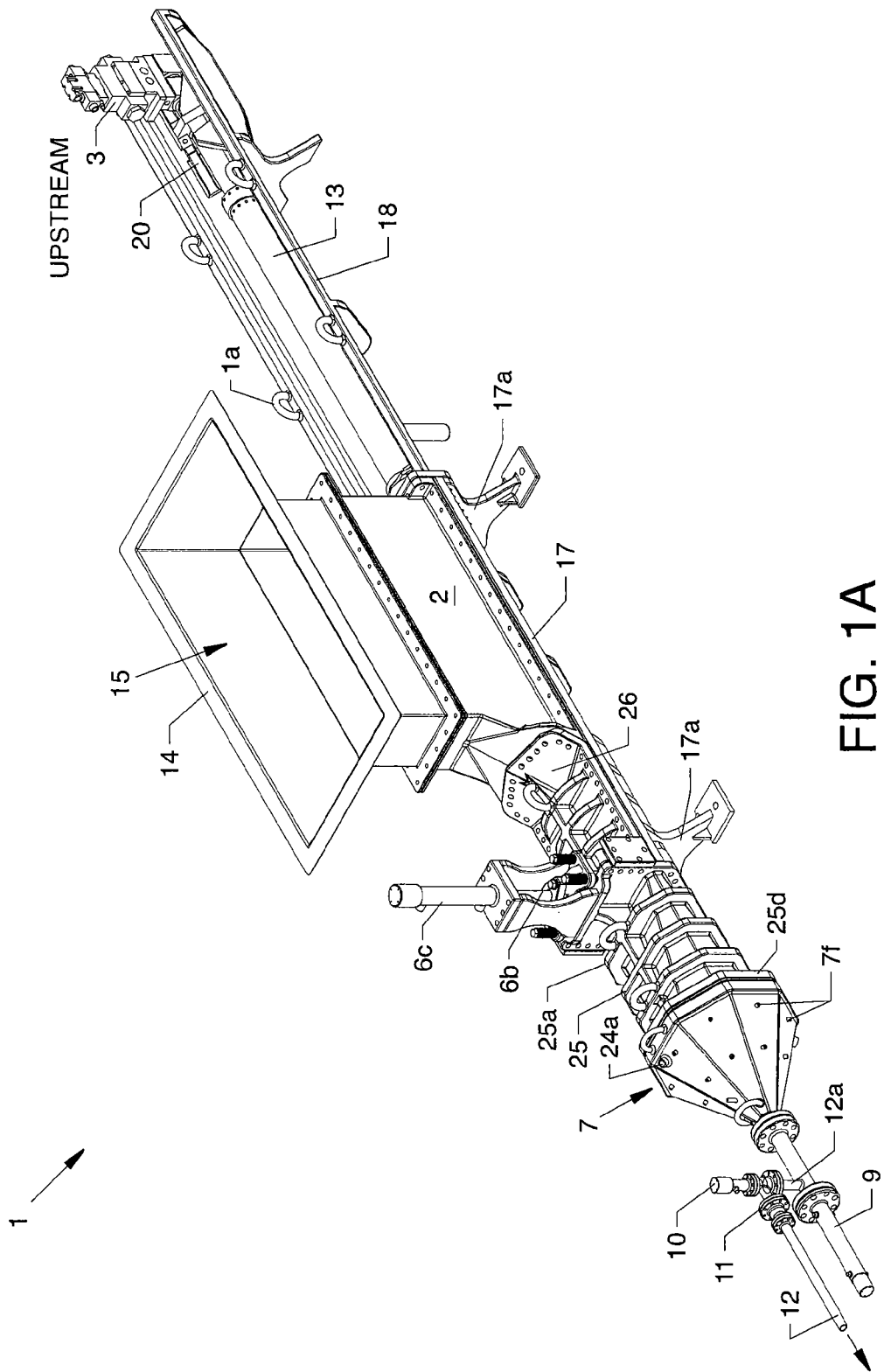
FIG. 1A is an isometric view of an embodiment of a reactor pump 1.
Figure 1B:
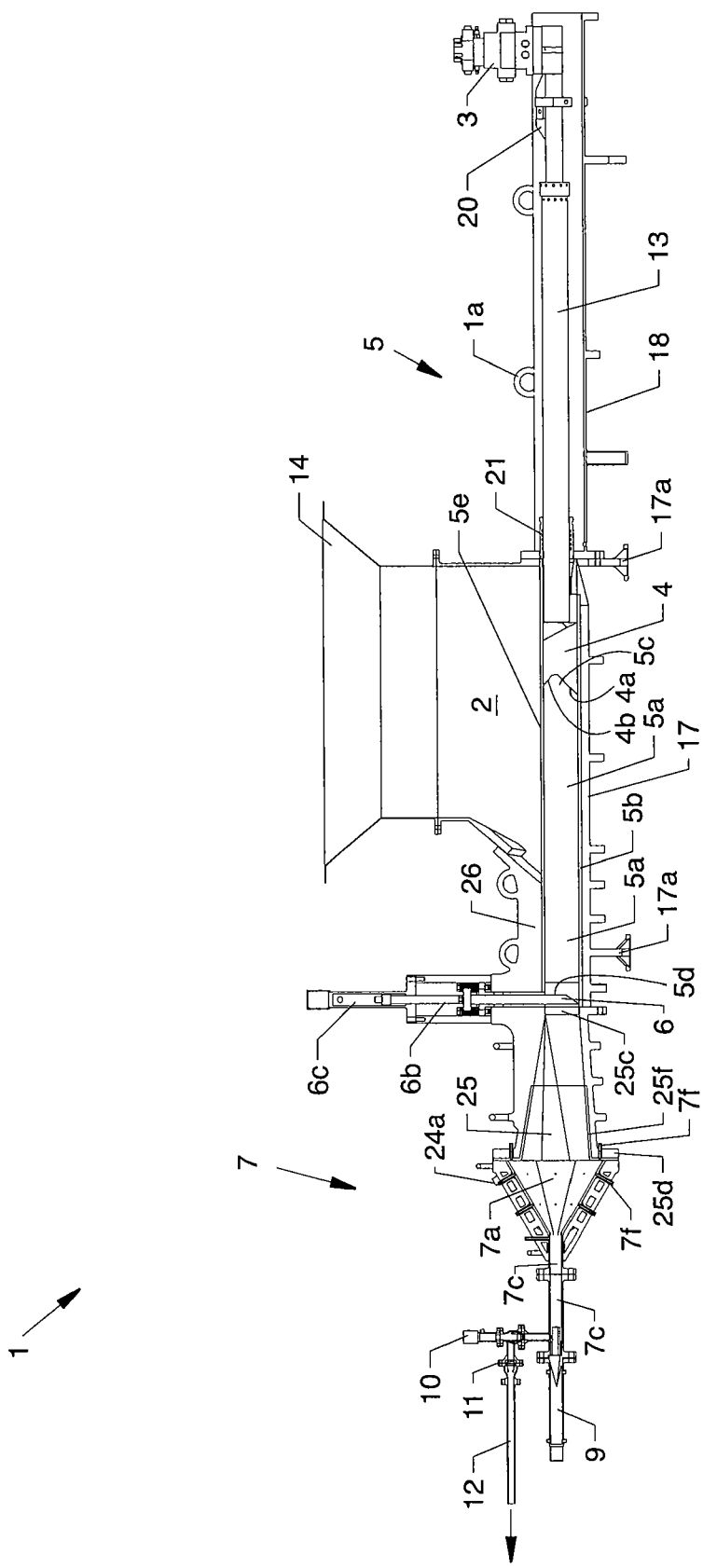
FIG. 1B is a cut-away view of an embodiment of a reactor pump 1.
Figure 2:
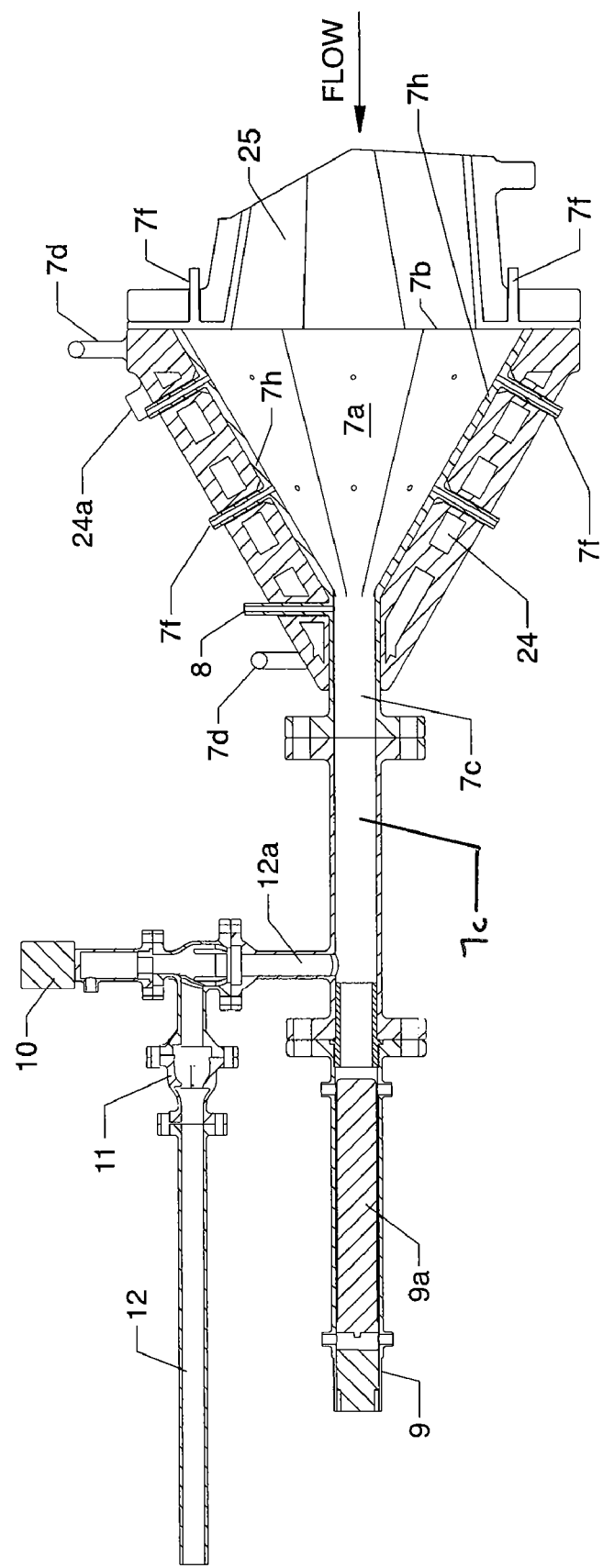
FIG. 2 is a cut-away view of a reactor 7.

FIGS. 1A and 1B illustrate the overall components of reactor pump 1 and provides a basis for the "Description of Embodiments" of reactor pump 1.

The pump portion of the reactor pump 1 is a piston pump. It is highly efficient and can exert pressure on the feedstock 15 ranging up to about 2000 psi. The pump's function is to move feedstock 15 to the reactor 7 inlet 7*b* and ram it into the reaction chamber 7*a* to create a feedstock plug 27 in the reaction chamber 7*a*. A screw pump can be used, but its efficiency and pressure inducing capacity are relatively low.

The reactor 7 portion of the reactor pump 1 functions to cook the feedstock plug 27 in the reaction chamber 7*a* and discharge the cooked feedstock plug 27 as an intermediate liquefied slurry product for ultimate conversion to ethanol. The reactor 7 is configured to routinely sustain a temperature in the reaction chamber 7*a* ranging up to about 1000° Fahrenheit. Embodiments of the reaction chamber 7*a* may be configured to have converging inside walls 7*i*, straight segments 7*j*, inwardly tapered segments 7*k*, outwardly tapered segments 7*o*, convex segments 7*l*, U-elbow segments 7*m*, cone or bell segments 7*n*, exit plug segments 7*p*, connector segments 7*r*, or any combination of the foregoing.

The reactor pump 1 is controlled by a program controller (a computing device such as a programmable logic controller—a PLC).

Feedstock 15 is comprised of a mix of cellulose, water and acid. The acid may, for example, be dilute sulfuric or ammonium acid depending upon the characteristics of the cellulose. The acid pre-treats the feedstock 15. The feedstock 15 may, for example, be mixed prior to its entry into a fine grinder 19. Or only the cellulose and the water may be mixed and fed into the fine grinder 19, which is equipped to impregnate the cellulose with acid during the grinding process. Either way, the fine grinder 19 granulates the feedstock 15.

The granulated feedstock 15 is fed into a hopper 14, which sits atop a charging chamber 2. The feedstock 15 drops from the hopper 14 into the charging chamber 2. The charging chamber 2 is open at its bottom to the pumping chamber 5*a* so that the feedstock 15 will continue to drop from the charging chamber 2 to a feedstock opening 5*e* in the pumping chamber 5*a*.

A ram 4 is attached to, and driven by, the main hydraulic cylinder 13. The ram 4 is directed to retract or extend by a directional control valve 3. When the ram 4 is retracting, feedstock 15 is dropped into the feedstock opening 5*e* in the pumping chamber 5*a*. The feedstock opening 5*e* is located between ram 4 when it is a fully retracted position and the upstream face of a vertically extending knife gate 6.

At the initial start-up of the reactor pump 1, the reaction chamber 7*a* is empty. The pumping chamber 5*a* is filled with feedstock 15, the hydraulic cylinder 13 is alternately extended and retracted to compresses the feedstock 15 into the pre-heated reaction chamber 7*a* until the reaction chamber 7*a* is filled with feedstock 15. After initial filling of the reaction chamber 7*a* the semi-continuous process of converting feedstock 15 to a liquefied slurry begins. For example, the process may begin when the hydraulic cylinder 13 is retracted. At the end of retraction of the main hydraulic cylinder 13, the cylinder 13 (or a ram 4 on the downstream end of the hydraulic cylinder 13) stops momentarily and then extends the ram 4 at a first pre-set speed towards the closed knife gate 6. In so doing, the ram 4 moves the feedstock 15 downstream and compresses it in the pumping chamber 5*a* against the closed knife gate 6. During the early stage of the ram's extension, the feedstock 15 continues to fill the pumping chamber 5*a*. When filling the pumping chamber 5*a* with feedstock 15, the PLC monitors the hydraulic pressure in the main hydraulic cylinder 13 and monitors the position of the ram 4 in the pumping chamber 5*a*. When the PLC determines that the pumping chamber 5*a* is full of feedstock 15 and the ram 4 has begun to compress the feedstock 15 against the knife gate 6, the PLC reduces the speed of the ram 4 to a second pre-set speed. The ram continues to extend towards the knife gate 6, but at the reduced speed. The ram 4 continues to pressurize the feedstock 15 in the pumping chamber 5*a* until the compressive hydraulic force exerted by the ram 4 on the upstream face of the knife gate 6 is about equal to the back pressure on the downstream face of the knife gate 6. At this point the feedstock 15 is fully compressed against the knife gate 6 and the knife gate 6 begins to open. Ram 4, nevertheless continues to press against the knife gate 6 during the time period in which the knife gate 6 is opening. During the opening time period, the ram speed may be further reduced to third pre-set speed that is less than the second pre-set speed. After the knife gate 6 is fully opened, the ram 4 continues its travel beyond the knife gate 6 and through the relatively short remaining portion of the pumping chamber 5*a*, but it does so at either the second or third pre-set speed, to maintain the volume of feedstock 15 in the reaction chamber 7*a*. The second and third pre-set speeds are available to allow the pump 5 to adjust to the characteristics of the feedstock 15. Compression of the feedstock 15 allows some water to be removed from the cellulose material. Water can be easily removed by gravity and drained out the liquid exits 8*a* in the pumping chamber 5*a*. During this stage of extension, ram 4 pushes the compressed feedstock 15 into the inlet 25*a* of the transition segment 25 to keep the reaction chamber 7*a* full of feedstock 15 so the volume of feedstock in the reaction chamber 7*c* is always at a pre-set level. Ram 4 does not stop at any point during its extension phase other than at the end of its stroke, which is at the inlet 25*a* of the transition segment 25. Ram 4 does not extend into the transition segment 25. The PLC also monitors the position of the ram 4 to determine when the ram 4 reaches the end of its pumping stroke. At the end of the ram's stroke it momentarily stops and then retracts to its fully retracted position. The PLC signals the knife gate 6 to close when the ram 4 retracts past the knife gate's 6 position. The ram 4 continues its retraction to the end of its stroke. At the end of its stroke, the ram 4 continues its endless cycles until reactor pump 1 is shut down.

The PLC continuously monitors the downstream pressure of the ram 4 on the compressed feedstock 15 as it is driven against the compressed feedstock plug 27 that is already in the reaction chamber 7a. The PLC continues to monitor the internal back pressure on the feedstock plug 27 to determine if these opposing forces need to be equalized. In an embodiment of the reactor pump 1, the pressures can be equalized by bleeding the pressure off through a pressure relief valve or increasing the pressure by injecting steam in the reaction chamber 7a through steam ports 7f, depending upon whether the pressure in the reaction chamber 7a is too high or too low.

Injection of steam into the reaction chamber 7a also serves the purpose of cooking the feedstock plug 27 by heating it. The steam heat and the pressure in the reaction chamber 7a cooks that portion of the feedstock plug 27 that is proximate the interior walls of the reaction chamber 7a to a nearly uniform state. The cook process eventually breaks down almost the entire feedstock plug 27.

At all times, the reaction chamber 7a may subject the feedstock 15 to heat and pressure, and in some cases acid. Moreover, the hydraulic pressure of ram 4 against the feedstock 15 entering the reaction chamber 7a creates additional heat in the reaction chamber 7a. Accordingly, this semi-continuous process of downstream movement of the feedstock 15 from the inlet 7b of the reaction chamber 7a to the discharge outlet 7c of reaction chamber 7a subjects, for a given period of time (the "cook time 16"), all portions of the feedstock 15 to nearly uniform hydrolytic action. As the feedstock 15 breaks down it flows downstream to the discharge end of the reaction chamber 7a and is constantly replenished with the new feedstock entering the reaction chamber 7a. During the period of ramming the feedstock 15 through the transition segment 25 there may be a small pressure drop in the reaction chamber 7a, but in short order the reaction chamber 7a pressure returns to the pre-set discharge release pressure of a discharge valve 10 and converted feedstock 15 flows out a discharge pipe 12 into, for example, a stage 2 reactor where it is further converted. The combination of steam, water, highly compressed feedstock 15, high temperature, and the rapid drop in pressure when the discharge pipe 12 opens, breaks down the cellulose and converts it into a high solid pumpable material, i.e., a flowable slurry. Under certain circumstances acid may be introduced into the reactor 7 to assist the break down process.

If pressure in the reaction chamber 7a cannot be raised by turning on steam ports 7f, the PLC can advance the throttle valve 9 to allow the feedstock plug 27 to remain in the reaction chamber 7a so it can cook for a longer time period. Furthermore, steam can be (i) injected during the time the knife gate 6 is open, (ii) injected during the time the knife gate 6 is closed, (iii) injected continuously, or (iv) shut off. The duration of steam injection and its volume are, among other factors, a function of the composition of the feedstock plug 27, which can vary a great deal.

In some cases water and acid can be added to the feedstock plug 27 by injecting one or both into the reaction chamber 7a through the steam ports 7f. Alternatively, separate independent ports for acid can be utilized, as well as for additional water if needed.

Heating the biomass in the reaction chamber 7a by steam injection is but one way of cooking the feedstock plug 27 to convert it to, and discharge it as, a liquefied slurry. The biomass can be indirectly heated by heating the surface of the reactor 7 and allowing the heat to transit into the reaction chamber 7a walls and be absorbed by the biomass. Indirect heating may, for example, be accomplished using induction heating or by flowing hot oil or water through a jacket 24 surrounding the reactor 7.

The various segments of the reactor 7 are each independently heated by external means and are monitored for temperature excursions, which are quickly corrected. The reaction chamber 7a is configured so that the characteristics of the feedstock at any given point can be altered.

The PLC—program control—is based upon pre-set parameters, such as for example: (i) the level of pressure on the knife gate 6 and in the reaction chamber 7a; (ii) the level of temperature in the reaction chamber 7a; (iii) the position of the cylinder 13 in the pumping chamber 5a; (iv) the pre-set speeds of cylinder 13; (v) the vertical position of the knife gate 6 during opening and closing; (vi) the pre-set cook time; (vii) the pre-set levels of pressure at which the discharge outlet 7c of the reaction chamber 7a will open and close; (viii) the length of time between full retraction of the cylinder and full extension of the cylinder 13; (ix) the condition of the feedstock 15 in the reaction chamber 7b at which acid may begin to be injected into the reaction chamber 7a and the condition of the feedstock 15 at which injection ends; (x) the time at which acid begins to be injected into the reaction chamber 7a and time at which injection ends; (xi) the time at which steam begins to be injected into the reaction chamber 7a and the time at which injection ends; (xii) the time at which water, if any, begins to be injected into the reaction chamber 7a and the time at which injection ends; and (xiii) the condition of the feedstock 15 at which water, if any, begins to be injected into the reaction chamber 7a and the condition of the feedstock 15 at which injection ends. Each of these parameters are loaded into the PLC. The program controller's function is to compare feedback conditions from sensors to the stored parameters to, among other things (i) maintain steady state conditions in the reaction chamber 7a when feedback from sensors on the reactor pump 1 so warrant and (ii) change the steady state conditions when feedback from sensors on the reactor pump 1 so warrant.

Embodiments of the reactor pump 1 increase the extension speed of the ram 4 from that of its initial rate when the hydraulic pressure reaches a pre-set level or the position of the ram 4 is at a pre-set distance from the knife gate 6. The pre-set parameters correspond to an amount of feedstock 15 in the pumping chamber 5a and are established to prevent opening the knife gate 6 when the amount of feedstock 15 is below a pre-set level in the pumping chamber 5a.

Hydrolytic Chemistry and Parameters

Reactor pump 1 implements the first stage of processing cellulose material into what is ultimately sugar. The sugar can be fermented and used to make ethanol. In a first step, reactor pump 1 breaks down the husk of the cellulose by splitting its fibers. An embodiment of the process begins with impregnating the cellulose with acid, which speeds up the breakdown of the husks, i.e., catalyzes them. The catalyzed husks are then compressed into the reactor 7 where they are subjected to high pressure, high temperature, highly heated steam, and sometimes acid. This hydrolization step further breaks down the husks into a slurry for further processing to sugar. The acid used for impregnating the cellulose can be dilute sulfuric or ammonium acid depending upon the characteristics of the cellulose. The acid pre-treats the feedstock 15. An embodiment of the feedstock 15 of the process is comprised of 2% by weight of acid, 20% by weight of granular cellulose, and 78% by weight of water, depending upon the type of cellulose used. The process is more efficient if the water is less than 78%. It has been found that if the water content is reduced to less that 50% of the mixture, the hydrolysis process is more efficient. An embodiment of the reactor pump 1 drives the feedstock 15 into reaction chamber 7a under a force of about 600 psi and the cooked feedstock is released through discharge pipe 12 at a pressure of about 200 psi. This depressurization from about 600 psi to about 200 psi further split the husks. The husks are broken down in part by pre-heating the incoming feedstock as it arrives in the reaction chamber 7a. The primary breakdown results from the high pressure injection of saturated steam into chamber 7a at a temperature of about 220° Celsius and a pressure of about 600 psi. In certain cases acid is introduced into chamber 7a to further catalyze the reaction. In an embodiment, the cook time 16 is about 15 seconds, but in other embodiments the cook time is in the range of about 12 to about 25 seconds. The maximum theoretical (i) discharge pressure is about 1,000 psi and (ii) the hydraulic pressure is about 3,000 psi. The reactor pump 1 is a closed loop system whereby all variables are sensed by a computing device, such as a PLC, that feeds back any corrections needed to stabilize the system in accordance with the pre-set parameters.

Feedstock

The primary material in the feedstock 15 is cellulose containing material such as for example, wood products in the form of logs, wood chips, or lumber; newspaper and cardboard; sugar cane, and straw. The cellulose material is granulated. It is then mixed with acid and water. Suitable acids are dilute sulfuric or ammonium acid, which may, for example, be an aqueous solution of about 0.5% to about 10% acid. The acid can also be mixed with the material in a dry form. Different acids can also be used and each would be impregnated into the cellulose in a different amount. The strength of the acid may also depend upon the nature of the cellulose material chosen for the feedstock 15. Furthermore, the cellulose material used may be a mixture of different cellulose material, each of which may require more or less acid in the feedstock 15. Reaction pump 1 is enabled to add more or less supplemental acid to the feedstock during processing to adjust for the varying types and mixtures of cellulose material, as well as varying process parameters encountered during processing. The cellulose acid mixture is loaded into feed hopper 14 and is dispensed through charging chamber 2 into pumping chamber 5a. The feedstock 15 begins to be dispensed when ram 4 is in its retraction phase and near the downstream end of the feedstock opening 5e.

Pump

Reactor pump 1 is an integral, unitary combination of a material moving pump 5 and a reactor 7 for the first stage conversion of cellulose to a material suitable for making sugar. Although reactor 7 and pump 5 form an integral unit, they perform distinct functions. Pump 5 essentially moves feedstock 15 into the reactor 7.

Pump 5, as shown in FIGS. 1A-1B, 12-13, 15-17, 22, and 26-29, is upstream from reactor 7. Pump 5 is comprised of a V-shaped trough 18 and a V-shaped main housing 17 each of which is linearly aligned with the other and connected together. V-shaped trough 18 is open on its top. Directional control valve 3 is situated adjacent the upstream end of the trough 18 as shown in FIGS. 1A and 1B. It directs ram 4 to either extend or retract and change its speed in accordance with the program controlled reactor pump 1.

FIG. 21 illustrates a hydraulic cylinder 13 for moving ram 4. The cylinder shown is a reverse hydraulic cylinder 13 in that the cylinder 13 is the movable member and the internal piston 13b is the fixed member. The cylinder 13 is controlled by directional control valve 3. The cylinder 13 is mounted at the upstream end of trough 18 by mounts 20 and aligned with pumping chamber 5a at the downstream end of trough 18 by chamber gland 21. FIG. 21 shows hole 13a for connecting the ram 4 to the cylinder 13 with a pin.

The V-shaped main housing 17 is partially closed on its top by top plate 26. The remainder of the top of main housing 17 is covered by charging chamber 2. Connected at the top of the charging chamber 2 is feed hopper 14. Feed hopper 14 has a flared out top section for collection of feedstock 15 and the charging chamber 2 directs the flow of feedstock 15 to the pumping chamber 5a. From its fully retracted state, ram 4 extends downstream against feedstock 15 and compresses the feedstock against the knife gate 6. The lower face 4a of the ram is angled upward from the bottom portion of a stainless steel liner 5b to assist scouring feedstock 15 from the bottom of the liner 5b during its extension. The upper face 4b of the ram 4 is angled downward from the top of the liner 5b so that the top portion of the stainless steel liner 5b puts downward pressure on ram 4 to avoid upward lifting of the ram. Main housing 17 is lined with stainless steel 5b to resist acid reduction from the feedstock 15. It is also equipped with height adjustable feet 17a for leveling reactor pump 1.

Knife Gate

FIGS. 18-20 best show the knife gate 6, in isolation from the reactor pump 1. The knife gate 6, in its context within the reactor pump 1, is shown in FIGS. 1A-1B and 12-17. In FIG. 1B, the knife gate 6 is in a down position. On the upstream side of the knife gate 6 is a relatively long segment of the pumping chamber 5a. A relatively short segment of the pumping chamber 5a continues from the downstream side of the knife gate 6 and terminates at the inlet 25a of the transition segment 25. The pumping chamber 5a collects the feedstock 15 as it drops out of the charging chamber 2. The collected feedstock is driven downstream by ram 4 against the upstream side of the knife gate 6.

FIG. 18 is an elevation view of the downstream side of knife gate 6 in a closed position. Knife gate 6 is constructed of zirconium to resist corrosion by the acid in the feedstock 15. The downstream face of knife 6a is planar.

FIG. 19 is an elevation view of the side of the knife gate 6. Knife gate piston 6b can be seen in this view. The piston 6b extends and retracts within the hydraulic cylinder 6c. The piston 6b may be constructed of carbon steel. The bottom of knife 6a has a bevel 6d on its upstream side to make positive contact upon closure of the knife gate 6 with the stainless steel liner 5b in pumping chamber 5a.

FIG. 20 is an elevation view of the upstream side of the knife gate 6 wherein it is shown that the bottom edge of the knife 6a is V-shaped. The V-shaped knife 6a seats in the V-shaped pumping chamber 5a. Each of the figures shows spring loaded packing glands 6e that act as shock absorbers when the knife 6a closes on the V-shaped stainless steel liner 5b. Opening and closing of the knife gate 6 may be actuated by, for example, hydraulic or pneumatic pressure.

FIGS. 22 and 26-29 illustrate another embodiment of the reactor pump 1. In this embodiment, there is no knife gate 6. The reactor pump 1 directly compresses feedstock 15 against feedstock 15 already in the reaction chamber 7a. This process is also done in a semi-continuously manner.

Reactor

Reactor 7 is comprised of a transition segment 25, a reaction chamber 7a, and a valve cluster comprised of throttle 9, discharge 10, and check 11 valves. As shown in FIGS. 1B and 6-11, the transition segment 25 begins at the end of the pumping chamber 5a and ends at the inlet 7b to the reaction chamber 7a. The valve cluster is downstream of the discharge outlet 7c of the reaction chamber 7a. An embodiment of the transition segment 25 is eight sided to smoothly transition from the relatively small inlet 25a to the larger outlet 25b. An embodiment of the interior of the transition segment 25 is a cone 25g shaped segment with the small inlet 7b coned outwardly to meet the larger outlet 25b.

The inlet 25a, as shown in FIG. 10, is triangular shaped with the "V" end positioned downward to match the V-shaped lower portion of the main housing 17. Inlet flange 25c is attached to main housing 17. Transition segment 25 has strengthening gussets 25e along its length, as well as rings 25h for hoisting the transition segment 25 in place between the pumping chamber 5a and the reaction chamber 7a. FIG. 6 shows the outlet 25b of the transition segment 25 with an outlet flange 25d for attachment to the reaction chamber 7a inlet flange 7g. FIG. 7 shows that the area of the inlet 25a of the transition segment 25 is small as compared to the larger area of the outlet 25b. When feedstock 15 enters the transition segment 25 it is packed into the transition segment 25 and against the feedstock in the reaction chamber 7a by ram pressure. The feedstock 15 already in the reaction chamber 7a has been formed into a plug 27 due to the necking down of the reaction chamber 7a from a larger inlet 7b area to a smaller discharge outlet 7c area. The smaller discharge outlet 7c of the reaction chamber 7a will not allow all of the feedstock 15 to be driven out the discharge outlet 7c. And the constant compression of the feedstock within the transition segment 25 and the reaction chamber 7b causes the feedstock to form the plug 27.

As ram 4 is retracted from feedstock 15, back pressure in the reaction chamber 7a wants to push feedstock 15 out of the reaction chamber 7a, out of the transition segment 25, and into the pumping chamber 5a. Movement of the compressed feedstock plug 27 out the inlet 25a of the transition segment 25 would allow high pressure in the reaction chamber 7a to escape into the pumping chamber 5a and then into the main hydraulic cylinder 13 where it could cause the pump 5 to seize. The knife gate 6, even when it is closed, does not provide an adequate seal to avoid this.

A portion of the cone 25g shaped interior of the transition segment 25, from about the midpoint of the cone 25g to the outlet 25b, is lined with zirconium 25f to withstand heat in the transition segment 25. The heat emanates from the reaction chamber 7b and is transferred back into the transition segment 25. The heat is generated by, for example, injected steam, hot water, induction heat, hot acid, or any combination of the foregoing. FIG. 7, shows steam/acid inlets 7f extending through the outlet flange 25d of the transition segment 25. When the transition segment 25 is connected to the reaction chamber 7a, inlets 7f in the transition segment 25 are positioned to allow steam and/or acid to be injected into reaction chamber 7a.

Figure 3:
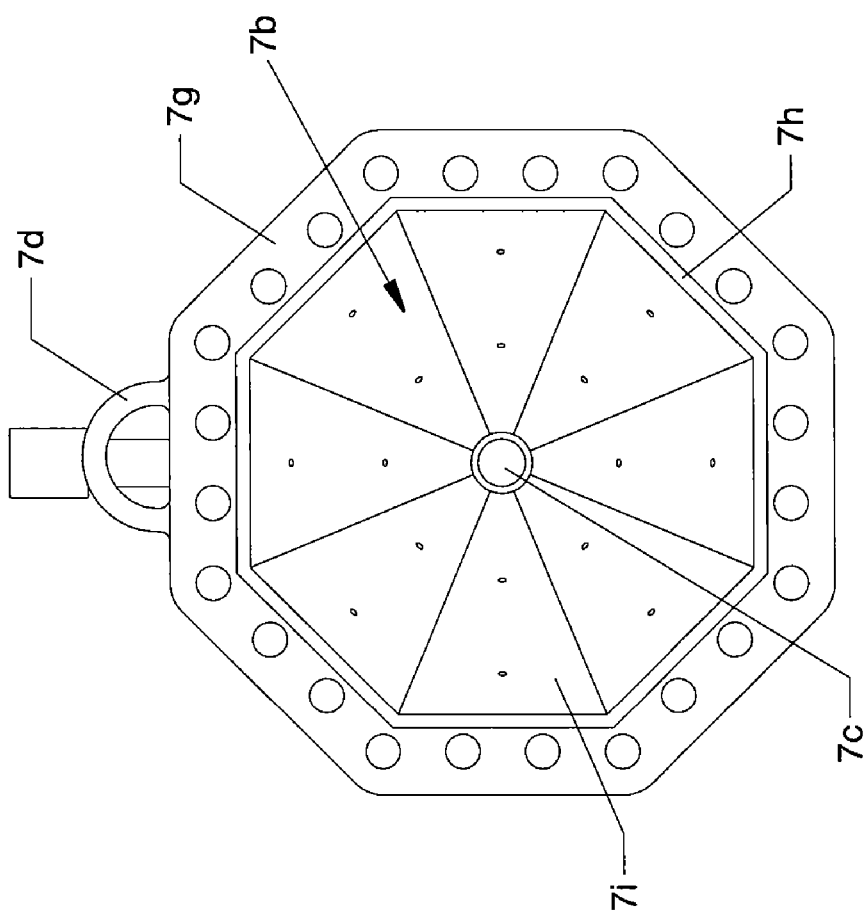
FIG. 3 is an end view of a reactor 7 from the inlet 7b end.

FIGS. 3-5 best show the reaction chamber 7a. Reaction chamber 7a is indirectly loaded with compressed feedstock 15 by ram 4 during a series of ram cycles. In an embodiment of the reaction chamber 7a its exterior is surrounded by a steam jacket 24 for preheating the feedstock 15. The interior of the reaction chamber 7a is lined with zirconium 7h to withstand the elements, for example, heat from injected steam, hot water, induced heat, hot acid, or any combination of the foregoing. Independently controlled steam/acid injector ports 7f perforate the interior of the reaction chamber 7a. They can (i) be turned on or off, (ii) increase or decrease the amount of steam and or acid injected into the reaction chamber 7a, or (iii) maintain the current level of steam and or acid injected into the reaction chamber 7a. The injected steam and/or acid changes or maintains the reaction rate of the feedstock 15 and adjusts the flow rate of the feedstock 15 as it moves from inlet 7b to discharge outlet 7c in the reaction chamber 7a during the cook time 16. An embodiment of the reaction chamber 7a has eight converging sides 7i. The sides 7i converge from the larger inlet 7a down to the smaller discharge outlet 7c. The inlet flange 7g attaches to the outlet flange 25d on the transition segment 25. Ring 7d is at the top of inlet flange 7g. It is used for lifting segments of, or the entire, reactor pump 1 during assembly, moving, and leveling.

Steam is injected from the inlets 7f into the reactor chamber 7a along its inside walls 7i. As ram 4 continues to move the feedstock 15 into the transition segment 25, the downstream end of feedstock 15 enters the reaction chamber 7a and encounters the injected steam. Because the incoming feedstock 15 has a somewhat lower temperature than the feedstock already in the reaction chamber 7a, the steam condenses and changes phase to water. After ram 4 completes loading the feedstock 15 into the transition segment 25 and retracts upstream past the position of the knife gate 6 in the pumping chamber 5a, the knife gate 6 closes. The feedstock 15 is then cooked in the reaction chamber 7a for a period of approximately 12 to 25 seconds. Although, depending upon the feedstock's composition, the optimal time is approximately 15 seconds. In one embodiment of the reaction pump 1, the feedstock 15 stays in the reaction chamber 7a during the entire cook time. By the end of the cook time 16, pressure has risen in the reaction chamber 7a to a pre-set level at which point a pressure relief valve—discharge outlet 10—opens and the cooked feedstock 15 exits the reaction chamber 7a through the discharge pipe 12. Discharge of the feedstock generally lowers the pressure in the reaction chamber 7a. The pressure rises to its pre-set level when the ram again compresses another charge of feedstock into the reactor 7.

In another embodiment, the pressure in the reaction chamber 7a is maintained at a level that is always equivalent to, or greater than, the pre-set pressure level. The outcome of this is that the discharge valve 10 will always remain open and there will be a constant flow of the product out the discharge pipe 12. To sustain the continuous output, the chamber 7a must be fed feedstock 15 quickly enough that the new feedstock will keep the reactor substantially full and thereby replace the discharged feedstock. To ensure that the pump 5 will accomplish its task, the timing of the pump cycle should be substantially the same as the timing of the cook cycle. Except for the fact that the contents in the reaction chamber 7a must reside in the reaction chamber 7a for the pre-set cook time 16, the process is continuous.

In both embodiments, each time the ram 4 reaches its pre-set extension stroke, directional control valve 3, under program control, retracts the ram 4. During the retraction phase the charging chamber 2 refills the pumping chamber 5a and the ram 4 begins its extension stroke again. Ram 4 drives the feedstock 15 downstream into the knife gate 6 and as it does so it compresses the feedstock 15 against the knife gate 6 into a highly compact material. At this point, the knife gate 6 opens (as it is directed to do under program control) because the pressure on the upstream side of the knife gate 6 is approximately equal to the back pressure generated in the reaction chamber 7*a* on the downstream side of the knife gate 6. The ram 4 continues pushing the feedstock 15 downstream to the end of the pumping chamber 5*a* and into the transition segment 25. And then the ram 4 again begins its retraction phase. When ram 4 retracts past the open knife gate 6, the knife gate 6 closes. When the ram 4 fully retracts, the program controller directs ram 4 to extend downstream to deliver another charge of feedstock 15 to the transition segment 25 and the reaction chamber 7*a*. The cycle time for retraction and extension of the ram 4 is pre-set to coincide with the cook cycle time (the cook time 16).

Too much pressure in the reaction chamber 7*a* means the feedstock 15 is not sufficiently reactive and too little pressure means it is overly reactive. Reactor pump 1 monitors the pressure in chamber 7*a* and makes adjustments to cook the feedstock appropriately during the cook time 16.

The ram 4 pressure on the feedstock plug 27 moves the plug 27 downstream in the reaction chamber 7*a* regardless of the divergence from the larger inlet 7*b* to the smaller discharge outlet 7*c*. As the cooking feedstock 15 moves downstream within the converging inside walls 7*i* of the reaction chamber 7*a*, the shear force between the converging inside walls 7*i* and the feedstock plug 27 increases and downstream movement of the feedstock plug 27 slows. Notwithstanding the somewhat slower movement of the plug 27, the less solid portion of the feedstock plug 27 is squeezed to the outside of the feedstock plug 27 by the converging inside walls 7*i* and water between the plug 27 and the converging inside walls 7*i* provides relatively low surface friction for the less solid portion of feedstock plug 27. At the same time heat, pressure, steam, and/or acid in the reaction chamber 7*b* liquefies the cellulose in the feedstock plug 27 along the shear plane between the converging inside walls 7*i* and the feedstock plug 27. Liquefaction tears open the outer husk of the cellulose, which makes the converted cellulose ready for conversion to sugar. The more solid portion of the feedstock plug 27 is away from the shear plane, but it continues to cook and in turn moves towards the converging inside walls 7*i* where it too is liquefied. It appears that surface moisture on the plug 27 and beneath the surface moves downstream along the shear plane of the converging inside walls 7*i* and "greases" the way for the feedstock plug 27 to travel to the discharge outlet 7*c*. The injected steam also softens the surface and sub-surface of the plug 27.

Numerous factors influence the configuration and efficiency of the reaction chamber 7*a*. Some of these factors include (i) the size and shape of the reaction chamber 7*a*, amount of heat in the reaction chamber 7*a*, amount of acid in the feedstock 15, amount of acid injected into the feedstock 15 residing in the reaction chamber 7*a*, volume of water in the feedstock 15, volume of water in the reaction chamber 7*a*, pressure in the reaction chamber 7*a*, temperature in the reaction chamber 7*a*, and the characteristics of the cellulose that make up the feedstock 15. Moreover, the desired characteristics of the output of the reaction chamber 7*a* will influence its configuration. Consequently, a single configuration of the reaction chamber 7*a* will not always be the most efficient solution for each set of conditions. Accordingly, other embodiments of the reaction chamber 7*a* are viable. Such embodiments may include multiple modular reaction chamber 7*a* segments that are capable of being connected to one another.

The process of hydrolization is a progressive conversion of raw feedstock 15 to an intermediate flowable product. The reaction chamber 7*a* continuously moves the feedstock 15 downstream to the discharge outlet 7*c* of the reaction chamber 7*a* and while doing so the feedstock 15 is progressively converted to the intermediate flowable product. The process employs sensors on the reactor 7 to indirectly sense the state of the conversion of the feedstock 15 at points along the length of the reactor—it does not rely on direct sampling of the feedstock 15 along the way, but it could. The pump 5 drives the feedstock 15 into the inlet 7*b* of the reaction chamber 7*a* where it is formed into a semi-solid plug 27. The downstream end of the plug 27 pushes against the abutting upstream end of the moving mass of the feedstock plug 27 that is already in the reaction chamber 7*a*. The feedstock plug 27 is subjected to high temperature and pressure and after it cooks for the pre-set cook time 16 a flowable product is discharged out the discharge outlet 7*c*. The flowable product can be further broken down during a second stage operation. The process is a continuum from the inlet 25*a* of the transition segment 25 to the discharge outlet 7*c* of the reaction chamber 7*a*. During the continuous process, solid matter—the feedstock plug 27—is enveloped by liquid, which forms a boundary layer—a shear plane—between the inside walls of the reaction chamber 7*a* and the outside surface of the plug 27. The quasi-converted outer layer of the plug moves downstream through the reaction chamber 7*a* faster than does the inner, more solid layer of the plug 27. As a natural consequence, the outer layer is converted more quickly than the inner layer. The converted feedstock may be incrementally drained off along the way or wholly drained off at the discharge outlet 7*c* of the reaction chamber 7*a*. As the conversion process progresses, the inner layer of the plug 27 becomes the outer layer and is in turn converted. The process is configured to maximally compress the feedstock 15 (using the pump 5 or some other device that is capable of adequately compressing the feedstock) entering the inlet 25*a* of the transition segment 25 and exiting the discharge outlet 7*c* of the reaction chamber 7*a*, without causing an undue pressure drop in the downstream end of the reaction chamber 7*a*. As the feedstock 15 hydrolyzes along its path from the inlet 25*a* to the discharge outlet 7*c*, there is a naturally occurring pressure drop and a concomitant increase in liquid within the reaction chamber 7*a*. The liquid is, for the most part, the flowable conversion product.

The purpose of the foregoing process steps is to cook the feedstock 15 during its downstream travel in the reaction chamber 7*a* so the output has the desired characteristics. The configuration of the reaction chamber 7*a* as opposed to the outer walls of the reactor 7 is of primary importance. The area of the transition segment inlet 25*a* and the area of the reaction chamber discharge outlet 7*c* are relevant factors. In particular, the cross-sectional area of the reaction chamber 7*a* must be larger than the cross-sectional area of inlet 25*a* and larger than the cross-sectional area of the discharge outlet 7*c*. The length of the reaction chamber 7*a* can also affect the characteristics of the output.

The configuration of a reaction chamber 7*a* module can be tailored to create a desired reaction at a chosen location within the chamber 7*a* in conjunction with adjustment of the temperature and pressure gradients along the length of the reaction chamber 7*a*. Temperature is increased primarily by the transfer of heat into the reaction chamber 7*a* and is decreased by lessening the heat transfer. Pressure is increased in the reaction chamber 7*a* primarily by (i) increasing the pumping force on the feedstock 15 and (ii) increasing the heat in the reaction chamber 7*a*. Pressure is decreased in the opposite manner. The structure necessary for making these changes are sensors liberally placed on the reactor 7 or in the reaction chamber 7*a*. They sense internal conditions that correlate to the state of the feedstock 15 at locations along the length of the reaction chamber 7a. The sensed conditions are fed back to the PLC, which has the stored pre-set parameters. The PLC compares the sensed conditions in the reaction chamber 7a to the pre-set parameters. Based upon the comparison, the PLC may (i) make no change, (ii) increase or decrease a variable such as the cook time 16, acid injection, steam injection, ram pressure, back pressure, temperature, or any combination of the foregoing, (iv) shut the reactor 7 down, (v) increase or decrease the speed of the ram, or (vi) increase or decrease the amount of feedstock fed into the reaction chamber 7. Many so-called passive sensors are interrogated continuously by the PLC. If the sensor is a so-called active device, the sensor on its own continuously reports the sensed condition to the PLC. Either sensor type can be used in conjunction with reactor pump 1.

FIG. 22 illustrates a reaction chamber 7a having a straight segment 7j connected to an adjoining inwardly tapered segment 7k. The reaction chamber 7a of FIG. 1B does not have the straight segment 7j, but has an inwardly tapered segment 7k—a cone shaped segment. The cone shaped segment is sometimes referred to as a bell shaped segment. The pump shown in FIG. 22 is similar to pump 5 shown in FIG. 1B. In both FIGS. 1B and 22, the pumping chamber 5a extends from an upstream opening 5c to a downstream opening 5d. However, the location of the downstream opening 5d is dependent upon the configuration of the reactor pump 1. In FIG. 1B, for example, the downstream opening 5d is coterminous with the upstream face of the knife gate 6. But in FIG. 22, the downstream opening 5d is coterminous with the inlet 25a of the transition segment 25. In another embodiment of the reactor pump 1 shown in FIG. 1B, the downstream opening 5d is coterminous with the inlet 25b of the transition segment. In FIG. 1B, the distance between the location of the knife gate 6 in the pumping chamber 5a and the downstream opening 5d can be short, long, or any length there between. Each of the foregoing configurations are separate embodiments of the reactor pump 1. And as shown in FIG. 22, a knife gate 6 is not present. The knife gate 6, among other things, transitions the pumping chamber 5a from the physical conditions within the reactor, such as heat, acid, and hot water. Other embodiments of the reactor pump are configured to perform their function of converting feedstock 15 to a liquefied slurry of product (i) without a knife gate 6 and/or (ii) without a transition segment 25.

FIG. 23A is a schematic of the cross-section of an embodiment of the reactor 7, which is comprised of the transition segment 25 and the reaction chamber 7a. The formation of a single unitary feedstock plug 27 in the tandem configuration of the transition segment 25 and the reaction chamber 7a is integral to the conversion of feedstock 15 to a liquefied slurry. The feedstock plug 27 in the transition segment 25 and the feedstock plug 27 in the reaction chamber 7a are merely portions of the overall, single unitary feedstock plug 27.

The relatively small inlet 25a of the transition segment 25, as compared to the combination of the larger outlet 25b of the transition segment 25 and the larger inlet 7b of the reaction chamber 7a, impedes upstream movement of the feedstock plug 27 out the small inlet 25a of the transition segment 25. Upstream movement is impeded because the feedstock plug 27 is essentially stuck in the small sized inlet 25a. The inlet 25a seals-off the backflow of pressure into the pump 5. If the relative sizes of the inlet 25a and the combination outlet 25b and the inlet 7b were reversed, the feedstock plug 27 would move upstream and allow high pressure to flow into pump 5.

The relatively small discharge outlet 7c of the reaction chamber, as compared to the combination of the larger inlet 7b of the reaction chamber 7a and the larger outlet 25b of the transition segment 25, impedes downstream movement of the feedstock out the small discharge outlet 7b of the reaction chamber 7b. Impediment of the downstream movement allows the feedstock time to cook in the reaction chamber. The downstream movement of the feedstock is impeded by the converging inside walls 7i of the reaction chamber 7a, as well as by the small sized discharge outlet 7c. If the relative sizes of the discharge outlet 7c and the combination of the inlet 7b and outlet 25b were reversed, the feedstock 15 would be easily ejected out the discharge outlet 7c and the feedstock would not get cooked.

FIG. 23B illustrates a high pressure, high temperature reaction chamber 7b. The embodiment has a configuration that varies along its length. The inlet 7b has a relatively small diameter. The outwardly tapered segment 7o (a cone section 7n) connects with an inwardly tapered segment 7k. The inwardly tapered segment 7k tapers to meet a series of alternating concave 7q and convex 7l segments. The segments 7q and 7l connect to an exit plug segment 7p. The alternating concave 7q and convex 7l segments cause turbulence in the reaction chamber 7a. The turbulence creates beneficial mixing of the feedstock 15.

At various points along the length of the reaction chamber 7b there are (i) liquid exits 8a for draining liquid from the reaction chamber 7b and (ii) steam/acid inlets 7f (not shown in FIG. 23B) for injecting steam and/or acid into the reaction chamber 7b. The liquid exits 8a and the inlets 7f are located at points best suited for assisting cooking of the biomass within the reaction chamber 7b. There may be a greater number of liquid exits 8a and inlets 7f than are necessary for any particular process run, but the unused liquid exits 8a and inlets 7f can be shut down.

The length, shape, taper, inlet, and outlet of each segment is chosen to fit the reaction conditions.

The amount of heat needed at any given point is adjustable depending upon the sensed characteristics of the plug 27 within the reaction chamber 7b. The reactor 7 is surrounded along its length by heat coils 29, which heat the feedstock 15 within the reaction chamber 7a.

In the reaction chamber 7a of FIG. 23B, feedstock 15 is rammed into the inlet 7b under high pressure. It is rammed against the already existing feedstock 15 in the reaction chamber 7a to create and maintain a dense feedstock plug 27 in the transition segment 25 and the reaction chamber 7a.

The outer portion of the feedstock plug 27 and the inner core of the feedstock plug are subjected to different conditions. The inner core is compressed by (i) pressure in the transition segment 25, (ii) pressure in the reaction chamber 7a, (iii) pressure driving the feedstock 15 into the transition segment 25 and into the reaction chamber 7a, and (iv) pressure squeezing the feedstock 15 out a relatively small discharge outlet 7c. The outer portion of the feedstock plug 27 is in contact with the converging inside walls 7i of the reaction chamber 7a. The very outer portion of the plug 27 is subjected to high heat on and near the inside walls 7i. The high heat and pressure in the reaction chamber 7a liquefies the outer portion of the plug 27. The liquefied feedstock creates a shear plane between the converging inside walls 7i and the feedstock plug 27 allowing the liquefied feedstock to move along the converging inside walls 7i and exit the discharge outlet 7c. The liquid—a slurry of converted feedstock—slips the feedstock plug 27 downstream. The inner core moves downstream more slowly. But as the outer portion of the feedstock plug 27 is liquefied the shear plane allows the inner solid core to move towards the inside walls 7i and in turn be liquefied.

Density of the feedstock plug 27 will vary along the length of the reaction chamber 7a depending upon the characteristics of the cellulose, configuration of the reaction chamber 7a, heat in the reaction chamber, pressure in the reaction chamber, and the stored process parameters. However, the density of the plug should not go below a pre-set level. Otherwise, solid portions of the feedstock plug 27 could exit through the discharge outlet 7c, allow liquid or gas to be entrained within the plug 27, and cause a loss of the liquefied conversion product. A loss of the conversion product could also occur if the density of the plug 27 were to fall to a level that allowed backflow of solids out the inlet 25a of the transition segment 25.

FIG. 24 is an embodiment of reaction chamber 7a having multiple plugs—an inlet 7o, a straight segment 7j, an inwardly tapered segment 7k, a second inlet 7o, a straight segment 7j, an inwardly tapered segment 7k, a convex segment 7l, a concave segment 7q, an exit plug segment 7p, and a discharge outlet 7c. The second inlet 7o may be located at a point proximate the center of the reactor 7. The second inlet 7o allows liquid and gas to exit the reactor, reaction chamber 7a, while allowing the solids to continue through the reaction chamber 7a.

FIG. 25A illustrates an embodiment of reaction chamber 7a that begins with a transition segment 25, connects to a straight segment 7j, an inwardly tapered segment 7k, and a straight segment 7j. The tapered and straight segments are separate modules all connected together. The tapered 7k and straight 7j segments are connected together by connector segment 7r. The segments can be used as stand-alone segments or other segments not shown in FIG. 25A. The use of modules allows for mixing and matching reactor segments to meet the needs of changing conditions, not the least of which is the wildly varying compositions of the feedstock 15 available for conversion. This embodiment shows heat coil zones 29. FIG. 25A is a cross-section of FIG. 25B. FIG. 25C is a detail of the connector segment 7r.

This specification has primarily disclosed heating the biomass by injection of steam into the biomass in the reaction chamber 7a. However, other methods of heating are also viable, such as heat transfer by flowing oil through a jacket 29d, induction heating, or combinations of steam, oil jacket heating, or induction heating. The induction heating method heats the outside surface of the reactor 7 and allows the heat to transfer through the reactor 7 and into the biomass. Induction heating can most efficiently be accomplished by wrapping induction coils 29 around all or part of the exterior of the reactor 7, covering the coils 29 with insulation to avoid heat loss, and feeding the coils with the requisite electric current. The combination of induction heating of the feedstock 15, formation of a feedstock plug 27 at the inlet 7b, and preservation of the plug 27 throughout the length of the reaction chamber 7a, is an efficient and efficacious method of hydrolization of the biomass feedstock.

FIG. 26 illustrates a reactor pump 1, wherein the reaction chamber 7a has multiple segments. The first segment is straight 7j, the second is cone shaped. The cone shaped segment 7n is connected to a second straight segment 7j. The second straight segment 7j is connected to a first U-shaped elbow 7m. The first U-shaped elbow 7m is connected to a third straight segment 7j that runs parallel to a second straight segment 7j. The third straight segment 7j is connected to a second U-shaped elbow 7m. The second U-shaped elbow 7m is connected to a fourth straight segment 7j that runs parallel to the third straight segment 7j. The reactor of FIG. 26 is wrapped with electric heating coils for heating the contents of the reaction chamber 7a by induction heating. The reactor 7 can also be used without a heater. The segments of the reaction chamber 7a are doubled backed upon one another in parallel to reduce the footprint of the reactor 7. The reactor segments can made in lengths commensurate with the feedstock 15 characteristics and the desired final product characteristics.

FIG. 27 illustrates a reactor pump 1, wherein the reaction chamber 7a has multiple segments. The cone shaped/tapered segment of FIG. 26 is not present in the reactor of FIG. 27. FIG. 27 has multiple straight segments 7j with elbows 7m between the segments. The reactor 7 terminates in a segment having a smaller diameter than that of some of the preceding segments.

FIG. 28 also illustrates a reactor pump 1 with multiple segments. In this embodiment there is a relatively long reaction chamber 7b, comprised of a short straight segment 7j; a long inwardly tapered segment 7k, three relatively small diameter straight segments 7j, two u-elbow segments 7m connecting the three relatively small diameter straight segments 7j, and an exit plug segment 7p.

FIG. 29 shows a reactor pump 1 with multiple segments of a variety of configurations, lengths, and diameters. In this embodiment the output of the reaction chamber 7a is the input into another reactor pump 1.

FIG. 30 illustrates a reaction chamber 7a attached to the transition segment 25. The reaction chamber 7a is comprised of a relatively large diameter straight segment 7j, an inwardly tapered segment 7k, a discharge outlet 7c, a discharge valve 10, and a discharge pipe 12. This discharge outlet 7c of this embodiment provides a low discharge volume. In other words the discharge outlet 7c has a relatively small diameter as compared to a high volume discharge outlet 7c.

FIG. 31 illustrates a reactor 7 having a high volume discharge outlet 7c in that the discharge outlet 7c is large compared to a reactor 7 with a low volume discharge outlet 7c.

FIG. 32 shows a reaction chamber 7a having a transition segment 25, a straight segment 7j, a discharge outlet 7c, a heat exchanger 29a to heat feedstock 15 in the reaction chamber 7a, a discharge pipe 12, and a discharge valve 10. The reaction chamber 7a is lined with zirconium 7h. The heat exchanger 29a may use, for example, oil or steam as the heat transfer medium. The inlets and outlets for the heat transfer medium are respectively at 29b and 29c. If oil is used as the heat transfer medium, it flows through the heat exchanger jacket 29d and does not enter the reaction chamber 7a. If steam is used it is injected into the reaction chamber 7a through steam ports 7f.

Valving

The discharge valve 10 is an adjustable, positive control pressure relief valve that can be set to specific pressure levels over a range of pressure levels. A set pressure level corresponds to a specific pressure at which the reaction chamber 7a will discharge the cooked feedstock. The specific pressure may be changed from time to time depending, for example, upon (i) the reaction parameters for a specific type of feedstock 15 in reaction chamber 7a, (ii) changes in the downstream stages of the conversion process, and (iii) aging of the reactor pump 7.

The check valve 11 is a one way valve that allows feedstock 15 to leave the reaction chamber 7a through discharge pipe 12, but does not allow the feedstock to backflow into the reaction chamber 7a.

The throttle valve 9 provides the ability to change the cook time 16 of feedstock 15 in reaction chamber 7a. An internal piston 9a can be moved within the throttle valve 9 to increase or decrease the cook time 16 of the feedstock 15 by moving the end of the piston 9a within the discharge outlet 7c of the reactor 7.

Reactor Pump Control

A general purpose computer or a PLC may be used for monitoring sensors located at various places on the reaction pump 1, such as sensors for sensing the (i) positions of the knife gate 6 and the ram 4, (ii) hydraulic pressure on the feedstock, (iii) steam temperature in the reaction chamber 7a, (iv) open or closed position of the check valve 11, and (v) temperature in the heat jacket 24.

The computing device also (i) controls movement of the hydraulic cylinders, (ii) opens and closes the knife gate 6, (iii) sets the pressure of discharge valve 10, (iv) sets the throttle valve 9, (v) regulates the steam input, (vi) regulates the acid input, (vii) regulates the temperature of the substrate in heat jacket 24, (viii) synchronizes all moving parts and inputs according to a pre-set timing chart, (ix) sets electro-hydraulic proportional valves, and (x) controls movement of linear transducers.

All of the components of reactor pump 1 are manufactured by Olson Manufacturing Company of Albert Lea, Minn., with the exception of some of the off-the-shelf valves, sensors, computing devices, and the like—all of which are readily available from many sources.

CONCLUSION

The embodiments of the reactor pump described in this specification, including the drawings, are intended to be exemplary of the principles of the reactor pump. They are not intended to limit the reactor pump to the particular embodiments described. Moreover, any equivalents of the embodiments described herein, whether or not the equivalents be recognized by those skilled in the art, are intended to be encompassed by the claims set forth below.

I claim:

1. A reactor pump for catalyzed hydrolytic splitting of cellulose, comprising:
   (a) a pump comprised of (i) a pumping chamber having a feedstock opening for receiving feedstock; (ii) a cylinder configured to extend from an upstream opening to a downstream end of the pumping chamber; (iii) the extending cylinder configured to compress the feedstock in the pumping chamber against compressed feedstock in a reactor; (iv) the cylinder, upon reaching the downstream end, configured to retract from the downstream end to the upstream opening; and (v) the cylinder configured to cyclically continue its extension and retraction;
   (b) a reactor comprised of a transition segment and a reaction chamber, (i) the transition segment located between the downstream end of the pumping chamber and the inlet of a reaction chamber; (ii) the transition segment having an inlet smaller than the outlet; (iii) the reaction chamber having an inlet substantially the same size as the outlet of the transition segment and a discharge outlet smaller than the inlet of the reaction chamber; (iv) the reactor having a means for heating the compressed feedstock in the reaction chamber; and
   (c) whereby the compressed feedstock in the transition segment and the reaction chamber forms a feedstock plug, the feedstock plug cooks as the plug moves downstream under pumping pressure of the pump, and the cooked portion of the plug exits the discharge outlet as a liquefied slurry.

2. The reactor pump of claim 1, also comprising a means for injecting a reagent into the feedstock and/or into the feedstock plug in the reaction chamber, the reagent selected from the group consisting of acid, steam, or a combination thereof.

3. A reactor pump for catalyzed hydrolytic splitting of cellulose, comprising:
   (a) a pump comprised of (i) a pumping chamber having a feedstock opening for receiving feedstock; (ii) a gate upstream from the downstream end of the pumping chamber, the gate configured to cyclically open and close; (iii) a cylinder configured to cyclically extend and retract from an upstream opening of the pumping chamber to the downstream end of the pumping chamber; (iv) the cylinder configured to compress feedstock in the pumping chamber against the closed gate; (v) the gate configured to open upon the occurrence of an event, the event selected from the group consisting of a pre-set level of pressure on the closed gate, a pre-set position of the extending cylinder within the pumping chamber, expiration of a pre-set period of time, or any combination of the foregoing; (vi) the cylinder configured to compress the feedstock against compressed feedstock in a transition segment and the reaction chamber; (vii) the cylinder configured to retract when the gate closes;
   (b) a reactor comprised of a transition segment and a reaction chamber, (i) the transition segment, located between the downstream end of the pumping chamber and the inlet of a reaction chamber; (ii) the transition segment having an inlet smaller than the outlet; (iii) the reaction chamber having an inlet substantially the same size as the outlet of the transition segment and a discharge outlet smaller than the inlet of the reaction chamber; (iv) the reactor having a means for heating the compressed feedstock in the reaction chamber; and
   (c) whereby the compressed feedstock in the transition segment and the reaction chamber forms a feedstock plug, the feedstock plug cooks as the plug moves downstream under pumping pressure of the pump, and the cooked portion of the plug exits the discharge outlet as a liquefied slurry.

4. The reactor of claim 3, wherein the interior of the reactor is comprised of one or more segments selected from the group consisting of a straight segment, inwardly tapered segment, outwardly tapered segment, convex segment, U-elbow segment, concave segment, exit plug segment, or any combination of the foregoing segments.

5. The reactor pump of claim 3, comprising a charging chamber opening into the feedstock opening.

6. The reactor pump of claim 3, wherein the feedstock is comprised of (a) cellulose material selected from the group consisting of wood, logs, wood chips, lumber, newspaper, cardboard, corn fiber, corn cob, sugar cane, straw, switch grass, or any combination thereof, (b) water; and (c) acid.

7. The reactor pump of claim 3, comprising an adjustable pressure relief valve on the reaction chamber discharge outlet for automatic discharge of cooked feedstock when a pre-set pressure level within the reaction chamber is reached.

8. The reactor pump of claim 3, comprising a throttle valve for changing the cook time 16 of the feedstock.

9. The reactor pump of claim 3, also comprising a means for injecting a reagent into the feedstock plug in the reaction chamber, the reagent selected from the group consisting of acid, steam, water, or a combination thereof.

10. The reactor pump of claim 3, configured for continuous discharge of a liquefied slurry of conversion product.

11. A reactor for catalyzed hydrolytic splitting of cellulose, comprising:
  (a) a means for high pressure pumping of feedstock into a reactor; and
  (b) a reactor comprised of a transition segment and a reaction chamber, (i) the transition segment, located between the downstream end of the pumping chamber and the inlet of a reaction chamber; (ii) the transition segment having an inlet smaller than the outlet; (iii) the reaction chamber having an inlet substantially the same size as the outlet of the transition segment and a discharge outlet smaller than the inlet of the reaction chamber; (iv) the reactor having a means for heating the compressed feedstock in the reaction chamber;
  whereby the compressed feedstock in the transition segment and the reaction chamber forms a feedstock plug, the feedstock plug cooks as the plug moves downstream under pumping pressure of the pump, and the cooked portion of the plug exits the discharge outlet as a liquefied slurry.

12. A reactor pump, comprising a means for compressing cellulose into a reactor and a means for catalyzed hydrolytic splitting of the compressed cellulose in the reactor, wherein
  (a) the means for compressing cellulose material is a pump comprising (i) a pumping chamber having an opening for receiving the cellulose; (ii) a ram configured to compress the cellulose within the pumping chamber and the reactor during an extension stroke; (iii) the ram configured to retract to allow cellulose to fill the pumping chamber; and (iv) continuation of the extension and retraction of the ram;
  (b) the reactor comprises (i) an inlet and a discharge outlet each of which has a smaller cross-sectional area than the cross-sectional area of the interior of the reactor; (ii) the cellulose formed into a plug by compression of the cellulose in the reactor; (iii) the cellulose plug forced downstream within the reactor by compression on the cellulose in the reactor; (iv) the pressure and heat within the reactor progressively cooking the cellulose plug to a liquid slurry during its downstream movement towards the discharge outlet; (v) the liquid slurry discharged out the discharge outlet; and
  (c) the reactor comprises a reaction chamber having a discharge outlet smaller than the inlet of the reaction chamber.

13. The reactor pump of claim 12, comprising inputs selected from the group consisting of (i) pressure for maintaining plug density, moving the plug downstream, and breaking the plug down to a liquid slurry, (ii) acid and/or steam for breaking the plug down to a liquid slurry, (iii) water for reducing friction between the interior walls of the reactor and the plug, or (iv) any combination of the foregoing.

14. The reactor pump of claim 12, wherein the liquefied slurry is discharged when pressure in the reactor reaches a pre-set level.

15. The reactor pump of claim 12, comprising a means for changing the time that the cellulose plug cooks.

\* \* \* \* \*

UNITED STATES PATENT AND TRADEMARK OFFICE
CERTIFICATE OF CORRECTION

| | | |
|---|---|---|
| PATENT NO. | : 7,815,876 B2 | Page 1 of 1 |
| APPLICATION NO. | : 11/931436 | |
| DATED | : October 19, 2010 | |
| INVENTOR(S) | : David A. Olson | |

It is certified that error appears in the above-identified patent and that said Letters Patent is hereby corrected as shown below:

At Col. 26, line 63, claim 8: The number "16" should be removed from the text of claim 8.

Signed and Sealed this
Twenty-sixth Day of July, 2011

David J. Kappos
*Director of the United States Patent and Trademark Office*